United States Patent
Kawashima et al.

(10) Patent No.: US 6,187,897 B1
(45) Date of Patent: Feb. 13, 2001

(54) VINYL-GROUP-CONTAINING DENDRIMER AND CURABLE COMPOSITION

(75) Inventors: Miki Kawashima; Minoru Nakamura; Hiroaki Tanaka, all of Tokyo (JP)

(73) Assignee: Toyo Ink Manufacturing Co., Ltd. (JP)

( * ) Notice: Under 35 U.S.C. 154(b), the term of this patent shall be extended for 0 days.

(21) Appl. No.: 09/121,868

(22) Filed: Jul. 24, 1998

(30) Foreign Application Priority Data

| Sep. 1, 1997 | (JP) | 9-235743 |
| Sep. 8, 1997 | (JP) | 9-242261 |
| Oct. 28, 1997 | (JP) | 9-295966 |
| Oct. 28, 1997 | (JP) | 9-295967 |
| Nov. 4, 1997 | (JP) | 9-301458 |
| Nov. 4, 1997 | (JP) | 9-301459 |

(51) Int. Cl.⁷ .................... C08G 63/00; C08G 73/00
(52) U.S. Cl. .................... 528/310; 528/332; 528/363; 528/373; 525/410; 525/418; 525/419; 524/252; 424/DIG. 16
(58) Field of Search .................... 528/332, 363, 528/373, 310; 525/410, 418, 419; 524/252; 424/DIG. 16

(56) References Cited

U.S. PATENT DOCUMENTS

| 4,694,064 | * | 9/1987 | Tomalia et al. | 528/332 |
| 5,530,092 | * | 6/1996 | Meijer et al. | 528/363 |
| 5,610,268 | * | 3/1997 | Meijer et al. | 528/363 |
| 5,705,602 |   | 1/1998 | Kawashima et al. | 528/310 |

FOREIGN PATENT DOCUMENTS

| 2164175 | 6/1996 | (CA) . |
| 0 234 408 | 9/1987 | (EP) . |
| 0 716 103 | 6/1996 | (EP) . |
| 0 735 076 | 10/1996 | (EP) . |
| WO93/14147 | 7/1993 | (WO) . |
| WO96/07688 | 3/1996 | (WO) . |
| WO97/06201 | 2/1997 | (WO) . |

OTHER PUBLICATIONS

N. Moszner et al., *Macromol. Chem. Phys.*, 197(2), 621–631 (1996).
W. Shi et al., *J. Appl. Poly. Sci.*, 59(12), 1945–1950 (1996).
M. Niggemann et al., *Acta Polymer*, 47, 351–356 (1996).

* cited by examiner

*Primary Examiner*—P. Hampton-Hightower
(74) *Attorney, Agent, or Firm*—Wenderoth, Lind & Ponack, L.L.P.

(57) ABSTRACT

A vinyl-group-containing dendrimer useful in coating and printing and is curable by any one of conventional triggers such as heating, ultraviolet light, infrared light, electron beams and γ rays, the composition comprising a vinyl-group-containing dendrimer (A) comprising a core portion, branching portions, branches and at least 4 terminal portions and having a vinyl group as a terminal portion and a long-chain group and a curable unsaturated-group-containing compound (B), and the composition comprising a vinyl-group-containing dendrimer (A) obtained by reacting a polyfunctional compound (a) having at least three active-hydrogen-containing groups in a terminal per molecule and having at least five active hydrogen atoms per molecule with a long-chain-group-containing compound (b) having a functional group reactive with an active hydrogen atom so as to leave part of the active hydrogen atoms, thereby obtaining a long-chain-group-containing multi-branched compound (X), and reacting the long-chain-containing multi-branched compound (X) with a vinyl-group-containing compound (c) having a functional group reactive with an active hydrogen atom and a curable unsaturated-group-containing compound (B).

20 Claims, 7 Drawing Sheets a minimum-size dendrimer numbers of branches bonding to a core ; 3 number of branching portions ; 1 numbers of branches ; 5 numbers of terminal portions ; 4 a standard-size dendrimer:

numbers of branches bonding to a core ; 4 numbers of branching portions ; 4 numbers of branches ; 12 numbers of terminal portions ; 8 a core portion a branching portion a branch a terminal portion

⟨a third generation dendrimer⟩

- ●    a core portion
- ○    a branching portion
- ───    a branch
- ▲    a terminal portion numbers of branches bonding to a core ; 4 numbers of branching portions ; 12 numbers of branches ; 28 numbers of terminal portions ; 16

VINYL-GROUP-CONTAINING DENDRIMER AND CURABLE COMPOSITION

FIELD OF THE INVENTION

The present invention relates to a vinyl-group-containing dendrimer and a curable composition containing said dendrimer. More specifically, it relates to a curable composition containing a vinyl-group-containing dendrimer which can be used as a film-forming material such as a coating composition or an ink or as a raw material for a sealant, a molding material, an adhesive or a tackiness agent and which can be cured by heat or radiation to give a cured film. Further, the present invention relates to a curable composition which is a heat- or radiation-curable composition and can be applied to a vehicle for a printing ink or a coating composition or an adhesive.

PRIOR ART

Conventionally, resin solutions containing organic solvents are used as a coating composition, an adhesive, a tackiness agent, an ink, a filler and a molding material. The above resin solutions dissipate a large amount of the organic solvent in the steps of application, charging and curing. With increasing concerns about global and working environments, limitations have come to be imposed on the use of the above resin solutions. For this reason, there have been developed resin materials such as a water-soluble resin, a powder, a hot melt, and the like. A water-based resin composition requires a large amount of heat for evaporating water which is a dispersing agent, and further, since it often contains an organic solvent to some extent for improving its coatability, a waste liquid disposal remains to be solved. When used for coating or charging, a powder or a hot melt differ from conventional ones to a great extent in application and charging, and it is therefore newly required to introduce new equipment or facilities. For overcoming the above problems, the resin solution has been converted to a high solid or the water-based resin has been improved. Due to these efforts, it is considered that the use amount of the resin solutions tends to decrease further clearly. As a fundamental solution, however, it is strongly desired to develop a solventless liquid resin composition which is free of problems on environmental pollution, safety, hygiene, ignition, explosion, etc., and which can be widely applied and can be easily applied or charged.

Typical examples that can be referred to as a solventless liquid resin composition are radiation-curable resin compositions. Conventional radiation-curable resin compositions contain low-viscosity monomers such as various acrylic monomers, reactive oligomers such as urethane acrylate, epoxy acrylate or ester acrylate and optionally other resin component. The low-viscosity monomer is used mainly as a reactive diluent for controlling the viscosity of the composition. A composition containing a large amount of the low-viscosity monomer shrinks in volume when cured, and a cured film is fragile. Further, there is another problem that a residual monomer is odorous. It has been therefore desired to decrease the amount of the reactive diluent and increase the molecular weight thereof.

For improving a cured product in mechanical performance, it is preferred to incorporate a reactive oligomer, and it is further preferred to incorporate a resin material having a high molecular weight. Since, however, these materials have a high viscosity or are in a solid state, it is required to use a large amount of a reactive diluent in view of the fluidity of a composition before it is cured. The amount of the above materials is therefore limited. A cured product obtained by curing the conventional radiation curable resin composition is therefore poor in cured product properties such as hardness, toughness, mechanical properties and chemical resistance, and it is much inferior to a cured product obtained from a solvent-containing or water-based resin composition. For improving the film performance, there has been developed a radiation-curable resin composition containing a large amount of a reactive oligomer and a resin material having a large molecular weight. However, it contains a reactive diluent having a low molecular weight or an organic solvent for decreasing its viscosity to an applicable level, and under the circumstances, it cannot be said that it is improved in view of the environment.

Further, with developments in studies of polymers having hyper branched structures such as a comb-shaped polymer, a star-shaped polymer and dendrimers, studies of dendrimers terminated with a methacryl group are under way (Ref. Shi. W. et al., J. Appl. Polym. Sci. 59, 12, 1945 (1996)., Moszner N. et al., Macromol. chem. Phys., 197, 2, 621 (1996, JP-A-8-231864). However, known compounds are neither sufficient in curability as a radiation-curable material nor sufficient in adhesion to a substrate. Further, although it can be said that known compounds unquestionably have a low viscosity as compared with linear compounds having the same molecular weight, it cannot be said that the purpose in obtaining a low-viscosity resin composition by incorporating a large amount is fully achieved.

SUMMARY OF THE INVENTION

It is an object of the present invention to provide a vinyl-group-containing dendrimer which can serve to decrease the amount of a low-molecular-weight compound having safety and performance problems and which can give a resin composition having a high molecular weight but a low viscosity and having excellent performance as a coating (film).

It is another object of the present invention to provide a polyfunctional, solventless and curable resin composition containing the above vinyl-group-containing dendrimer.

It is further another object of the present invention to provide a vinyl-group-containing dendrimer which can give a resin composition capable of forming a film (coating) by a conventional coating method using a roll coater or knife coater or by a conventional printing method such as an offset printing method, a gravure printing method, a letterpress printing method or a screen printing method, and a curable resin composition containing the above vinyl-group-containing dendrimer.

It is still further another object of the present invention to provide a curable resin composition containing a vinyl-group-containing dendrimer, which can be cured by any one of conventional triggers such as heating, ultraviolet light, infrared light, electron beam and γ ray.

It is yet further another object of the present invention to provide a curable resin composition containing a vinyl-group-containing dendrimer, which is curable in the absence of a catalyst or a polymerization initiator when cured under irradiation with electron beams, γ rays, and the like.

Further, it is another object of the present invention to provide a curable resin composition containing a vinyl-group-containing dendrimer, which is suitable for use in a vehicle for a printing ink or a coating composition or in an adhesive.

According to the present invention, there is provided a vinyl-group-containing dendrimer comprising a core portion, branching portions, branches and at least 4 terminal portions, and containing, as the terminal portions, at least one long-chain group selected from the class consisting of the groups of the following formulae (1-1), (1-2) and (1-3), $$-C_nH_{2n}R^1 \quad (1\text{-}1)$$

$$-(C_xH_{2x}O)_mR^2 \quad (1\text{-}2)$$

$$-C_yH_{2y}O(COC_zH_{2z}O)_kR^2 \quad (1\text{-}3)$$

wherein $R^1$ is a phenyl group or a hydrogen atom, n is an integer of 4 to 25, x is an integer of 1 to 6, $R^2$ is a phenyl group or an alkyl group having 1 to 22 carbon atoms, y is an integer of 2 to 22, z is an integer of 2 to 15, m is an integer of 1 to 25 and k is an integer of 1 to 20, or at least one active-hydrogen-containing group selected from the class consisting of the following general formulae (2-1) to (2-5), $$-NHR^3 \quad (2\text{-}1)$$

wherein $R^3$ is a hydrogen atom or an alkyl group having 1 to 3 carbon atoms, $$-COOH \quad (2\text{-}2)$$

$$-OH \quad (2\text{-}3)$$

$$-Si(OR^4)_{3-h}(OH)_h \quad (2\text{-}4)$$

wherein $R^4$ is an alkyl group having 1 to 8 carbon atoms or a phenyl group and h is an integer of 1 to 3, $$-P=O(OH)_2 \quad (2\text{-}5)$$

and at least one vinyl group.

According to the present invention, there is provided a vinyl-group-containing dendrimer obtained by reacting a polyfunctional compound (a) having at least three active-hydrogen-containing groups in a terminal per molecule and having at least five active hydrogen atoms per molecule with a long-chain-group-containing compound (b) having a functional group reactive with an active hydrogen atom so as to leave part of the active hydrogen atoms, thereby obtaining a long-chain-group-containing multi-branched compound (X), and reacting the long-chain-containing multi-branched compound (X) with a vinyl-group-containing compound (c) having a functional group reactive with an active hydrogen atom.

According to the present invention, there is provided a vinyl-group-containing dendrimer obtained by reacting the above vinyl-group-containing compound (c) having a functional group reactive with an active hydrogen atom with at least one but not more than 95% of the total of the active hydrogen atoms of the above long-chain-group-containing multi-branched compound (X).

In the above vinyl-group-containing dendrimer, the polyfunctional compound (a) may be a dendrimer having 6 to 128 active hydrogen atoms derived from the active-hydrogen-containing groups.

In the above vinyl-group-containing dendrimer, the polyfunctional compound (a) may be a polyamino dendrimer containing a primary or secondary amino group.

In the above vinyl-group-containing dendrimer, the polyfunctional compound (a) may be a polyamino dendrimer of the formula (i) or (ii),

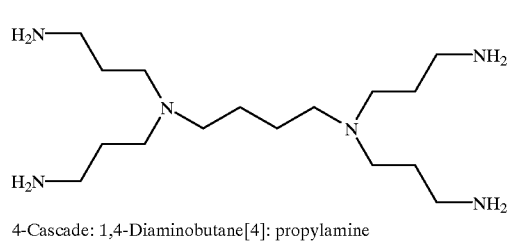

4-Cascade: 1,4-Diaminobutane[4]: propylamine (i)

-continued

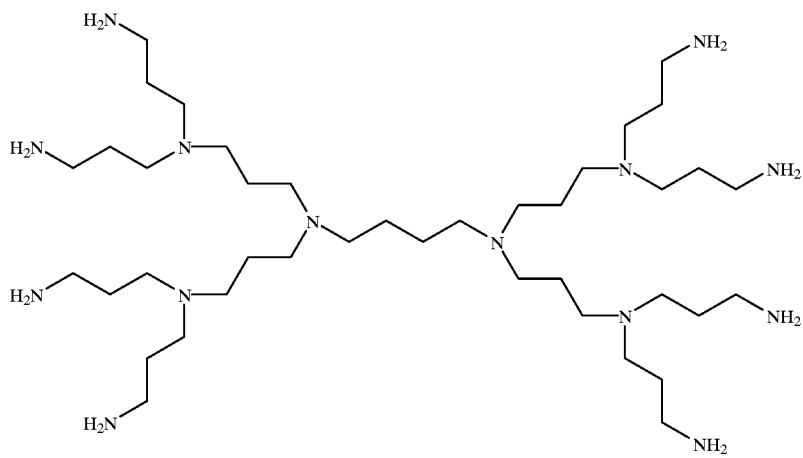

(ii)

8-Cascade: 1,4-Diaminobutane[4]: (1-azabutylidene)⁴proylamine

According to the present invention, there is provided a vinyl-group-containing dendrimer obtained by reacting a polyaimino dendrimer with a mixture of an active-hydrogen-containing (meth)acrylate compound (a-1) with a non-functional (meth)acrylate compound (b-1) of the general formula (3) in Michael addition reaction to form a long-chain-containing multi-branched compound (X-1) and reacting the long-chain-containing multi-branched compound (X-1) with an isocyanate-group-containing vinyl compound (c-1), $$CH_2=C(R^6)COO-R^5 \quad (3)$$

wherein $R^6$ is a hydrogen atom or methyl, $R^5$ is $-C_nH_{2n+1}$, $-(C_xH_{2x}O)_mR_2$ or $-C_yH_{2y}O(COC_zH_{2z}O)_kR^2$, $R^2$ is a phenyl group or an alkyl group having 1 to 22 carbon atoms, n is an integer of 4 to 25, x is an integer of 1 to 6, y is an integer of 2 to 22, z is an integer of 2 to 15, m is an integer of 1 to 25, and k is an integer of 1 to 20.

According to the present invention, there is provided a vinyl-group-containing dendrimer obtained by reacting the above active-hydrogen-containing (meth)acrylate compound (a-1) with the non-functional (meth)acrylate compound (b-1) in a (a-1):(b-1) molar ratio of from 1:99 to 99:1 and reacting the resultant long-chain-containing multi-branched compound (X-1) with the above isocyanate-group-containing vinyl compound (c-1).

According to the present invention, there is provided a vinyl-group-containing dendrimer obtained by reacting the vinyl-group-containing compound (c) having a functional group reactive with an active hydrogen atom with at least one but not more than 95% of the total of the active hydrogen atoms of the polyfunctional compound (a).

According to the present invention, further, there is provided a curable resin composition containing 5 of 99% by weight of the above vinyl-group-containing dendrimer (A) and 1 to 95% by weight of a polymerizable unsaturated-group-containing compound (B) other than the above vinyl-group-containing dendrimer (A).

According to the present invention, further, there is provided a curable ink containing the above curable resin composition which is radiation-curable.

According to the present invention, there is provided a coating composition containing the above curable resin composition which is radiation-curable.

DETAILED DESCRIPTION OF THE INVENTION

For overcoming the above problems, the present inventors have made diligent studies on a correlation between the structure and the viscosity with regard to various resins, and have found the following.

By changing the molecular structure of a polymer from a general linear polymer to a comb-shaped polymer and further to a hyper-branched polymer, the viscosity of the polymer decreases in spite of having a high molecular weight, and that the number of functional groups at a terminal such as vinyl groups that can be introduced increases.

Further, the polymer of the present invention has a hyper branched structure, and the expanding of chains thereof is therefore limited even in a reactive diluent which is a good solvent to the polymer. The polymer therefore has a lower compositional viscosity than a linear polymer having the same molecular weight.

The vinyl-group-containing dendrimer has an active-hydrogen-containing functional group in a terminal, and therefore, it exhibits excellent adhesion to various substrates, particularly to a plastic material with which a radiation-curing composition is hard to use. Further, by introducing a soft long-chain group having a proper chain length, both an increase in a molecular weight and the maintaining of a viscosity in a proper range before curing can be attained while maintaining curability, and a cured product is improved in mechanical properties and adhesion to a substrate.

Moreover, there has been found a curable composition which has a high molecular weight but has a viscosity in a range which permits the formation of a film by a conventional film-forming method, and which can be also cured at a high rate by a conventional curing method, particularly a method using electron beam as a trigger.

The term "dendrimer" has been generally used to refer to highly-branched hyper-regular multi-branched compounds. However, with a recent progress in studies on the method of synthesis of dendrimers, a variety of multi-branched compounds having a low regularity have been developed as a new type of dendrimers for the purpose of simplifying their synthesis methods, for example, as shown in the development of dendritic compounds by a one-step method, and at present, nothing has been concluded with regard to their nomenclature.

Figure 1:
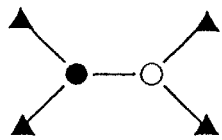
FIG. 1 is a model drawing of a dendrimer.
Figure 1:
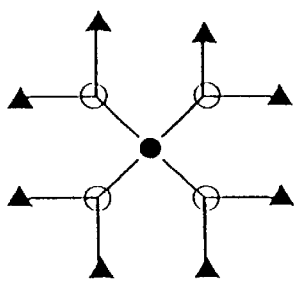
Figure 1:
Figure 1:
Figure 1:
Figure 1:

In the present invention, therefore, the term "dendrimer" refers to a three-dimensionally branched, multi-branched compound, and generally refers to all of hyper-branched polymer having a low regularity and dendrimers having a high regularity. The "dendrimer" in the present invention has a core portion, branches, branching portions and terminal portions as shown in FIG. 1. FIG. 1 further shows model figures of a minimum-size dendrimer and a standard-size dendrimer, numbers of branches bonding to a core of each dendrimer, numbers of branches, number of branching portions and numbers of terminal portions.

In the present invention, a core portion and branching portions have a structure in which at least three branches bond, and for example, the core portion and each branching portion formed of one atom include those of the following formulae (4-a) and (4-b), the core portion and each branching portion formed of a cyclic compound include those of the formulae (4-c), (4-d) and (4-e), and a structure and a metal atom of the formula (4-f) and (4-g) are also included in the core portion and the branching portion. Structures of the following formulae (4-h) to (4-k) are examples of structures corresponding to the core portion alone, and core portions of the following formulae preferably are able to have at least 4 branches. The core portion and the branching portion are distinguished depending upon the structure of a starting material for the synthesis of a dendrimer. In the following structural formulae, Rx is an alkylene group having 1 to 12 carbon atoms, preferably 1 to 6 carbon atoms.

(4-a)

(4-b)

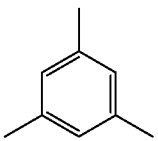
(4-c)

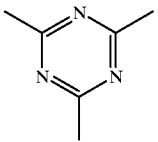
(4-d)

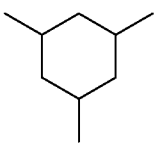
(4-e)

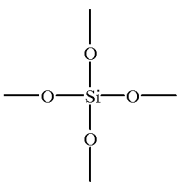
(4-f)

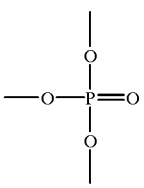
(4-g)

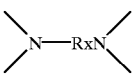
(4-h)

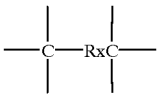
(4-i)

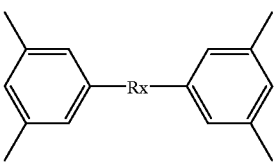
(4-j)

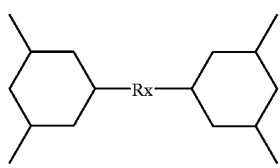

(4-k)

In the present invention, "branch" generally refers to a constituent portion connecting one core portion or a branching portion to an adjacent branching portion or an adjacent terminal portion. The structure of the branch is not specially limited. However, the branch is required to be formed of at least four atoms. Further, the number of branches per molecule of the dendrimer is at least 5, preferably 7 to 125, more preferably 9 to 100.

In the present invention, further, the terminal portion of the vinyl-group-containing dendrimer includes long-chain groups of the formulae (1-1) to (1-3), vinyl groups of the formulae (9-1) to (9-7) to be described later, and optionally the active-hydrogen-containing groups of the formula (2-1) to (2-5).

Figure 2:
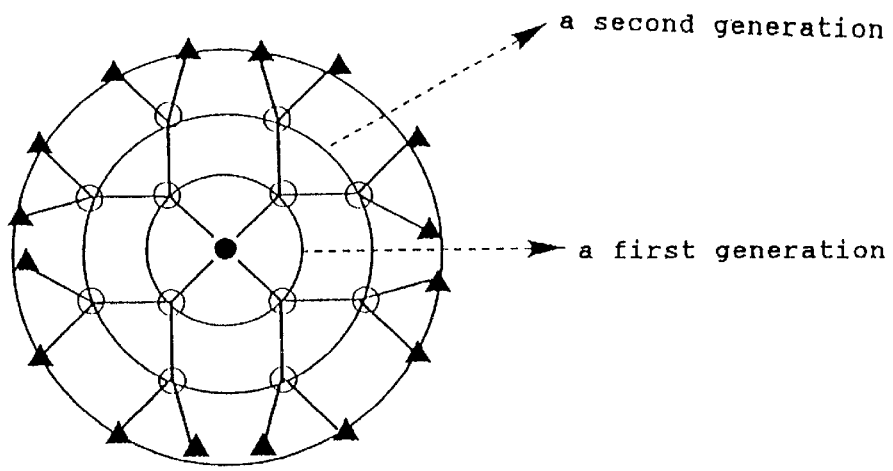
FIG. 2 is a model drawing of a dendrimer.

When the dendrimer has a regularity, generally, the size thereof is expressed in terms of a generation. In the present invention, a branched structure starting from the above-defined core compound is called a first-generation dendrimer, and a structure having branching structure branched from all the terminal portions of the first-generation is called a second generation. FIG. 2 shows a third-generation dendrimer having a core portion to which four branches bond and terminal portions, and FIG. 2 also shows each generation. This is defined to be generations in the present invention.

The long-chain group which the vinyl-group-containing dendrimer contains as terminal group is effective for compatibilizing an increase in molecular weight and a decrease in viscosity while the curing properties are maintained, and it is also effective for improving the solubility of the vinyl-group-containing dendrimer with other component. The above long-chain group has the following general formula (1-1), (1-2) or (1-3).

$$—C_nH_{2n}R^1 \tag{1-1}$$

$$—(C_xH_{2x}O)_mR^2 \tag{1-2}$$

$$—C_yH_{2y}O(COC_zH_{2z}O)_kR^2 \tag{1-3}$$

In the above formulae, $R^1$ is hydrogen atom or a phenyl group, n is an integer of 1 to 25, preferably 4 to 16, x is an integer of 1 to 6, preferably 2 to 4, $R^2$ is a phenyl group or an alkyl group having 1 to 22 carbon atoms, preferably 1 to 16 carbon atoms, y is an integer of 2 to 22, preferably 2 to 16, z is an integer of 2 to 15, preferably 3 to 5, m is an integer of 1 to 25, preferably 2 to 16, and k is an integer of 1 to 20, preferably 1 to 5. When n, x, m, y, z or k is outside the corresponding range, undesirably, the long-chain group is liable to undergo crystallization or the molecular weight is made higher than necessary, which results in an increase in viscosity.

In the present invention, further, the active-hydrogen-containing functional group, which is positioned in a terminal or in an intermediate, of the polyfunctional compound (a) or the long-chain-group-containing multi-branched compound (X) is a reaction site for introducing a vinyl group or optionally a long-chain group or works to improve the performance of a coating when it is in an unreacted state.

In the present invention, the polyfunctional compound (a) contains at least 3, preferably 4 to 64 active-hydrogen-containing functional groups per molecule, and contains at least 5, preferably 6 to 128 active hydrogen atoms derived therefrom. The above active-hydrogen-containing functional group includes, for example, active-hydrogen-containing organic residues of the following formulae.

$$—NHR^3 \tag{2-1}$$

wherein $R^3$ is a hydrogen atom or an alkyl group having 1 to 3 carbon atoms, $$—COOH \tag{2-2}$$

$$—OH \tag{2-3}$$

$$—Si(OR^4)_{3-h}(OH)_h \tag{2-4}$$

wherein $R^4$ is an alkyl group having 1 to 8 carbon atoms or a phenyl group and h is an integer of 1 to 3, $$—P=O(OH)_2 \tag{2-5}$$

While the active-hydrogen-containing functional group is not specially limited in kind, it is selected, basically, depending upon intended physical properties since the structure of a bonding portion has an influence on the performances of a coating. When a primary amino group, a seconary amino group, a hydroxysilyl group and a phosphoric acid group are used, it is possible to increase the number of vinyl groups that can be introduced.

In the present invention, it is preferred to use, as a polyfunctional compound (a), a dendrimer structure defined in the present invention since the balance between the viscosity and the curability is improved. For example, the polyfunctional compound (a) having the dendrimer structure, which can used in the present invention, includes dendrimers having an amino group, a hydroxyl group or a carboxyl group as a terminal portion.

Specifically, the polyamine dendrimer having terminal amino groups includes a propyleneimine dendrimer of the formula (i) or (ii) obtained by reacting butylenediamine with acrylonitrile to reduce a terminal nitrile group to amine in one step and repeating this step (WO93/14147, U.S. Pat. No. 5,530,092, JP-B-7-330631), an amidoamine dendrimer of the following structural formula (iv) obtained by reacting reacting ammonia or ethylenediamine with methyl acrylate in a Michael addition reaction and introducing a secondary amino group into a terminal in an ester-amide exchange reaction and repeating the reaction as required (WO84/02705, JP-B-6-70132) or its intermediate, and compounds having structures of the following structural formulae (iii) and (v).

The dendrimer having a carboxyl group in a terminal includes compounds of the formulae (vi) to (x).

The dendrimer having a hydroxyl group in a terminal includes compounds of the following formulae (xi) to (xv).

Further, the above dendrimer used in the present invention includes a polyester dendrimer (DEP44437021, JP-A-8-231864, WO93/17060), a polyphenylene dendrimer (S. C. E. Backson et al., Macromol. Symp. 77.1 (1994)), and a polyphenylene ester dendrimer (K. L. Wooley, et al., Polymer Journal, 26, 187 (1994)). The above dendrimers may be used in combination.

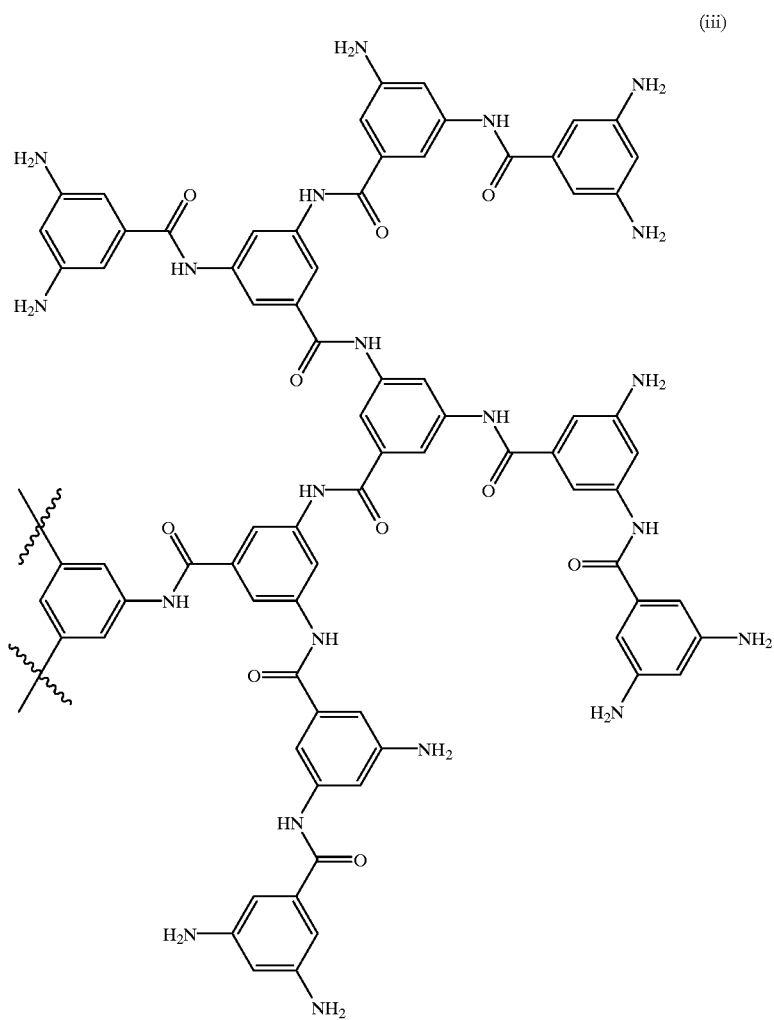
(iii)

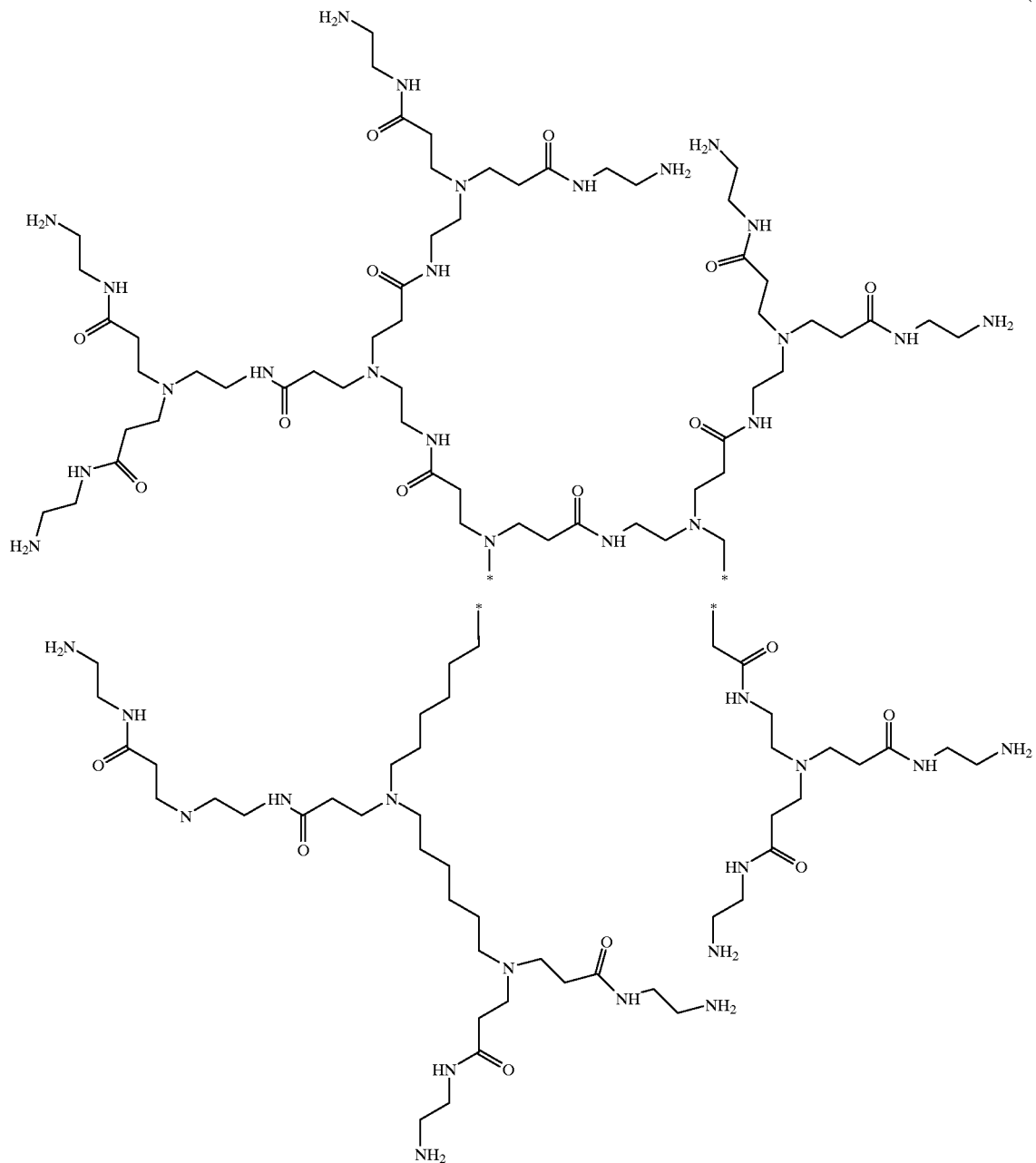
(iv)

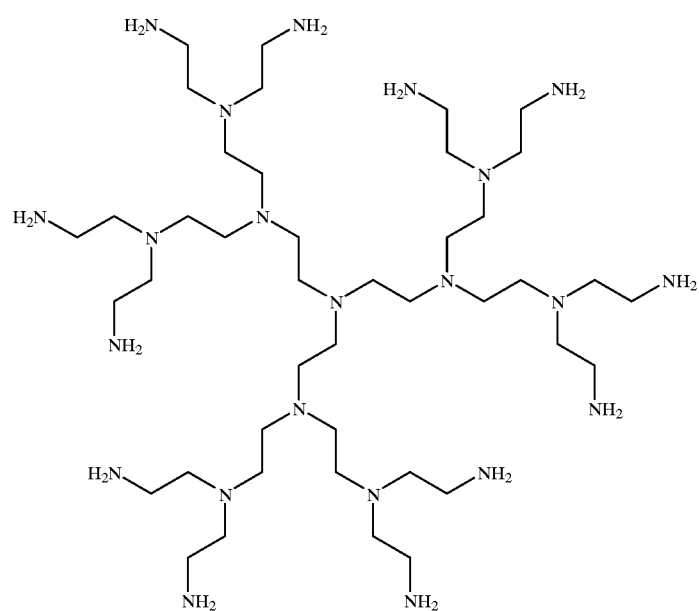
(v)
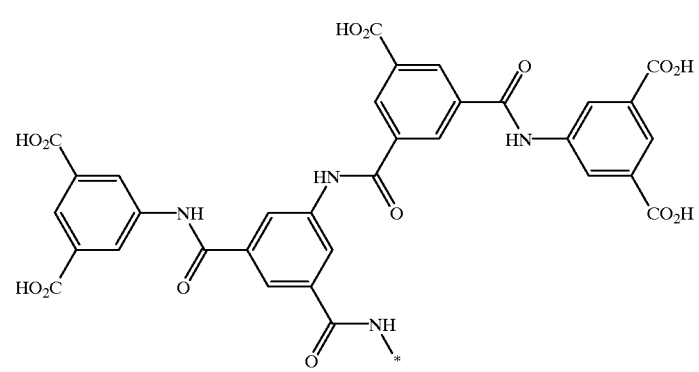
(vi)
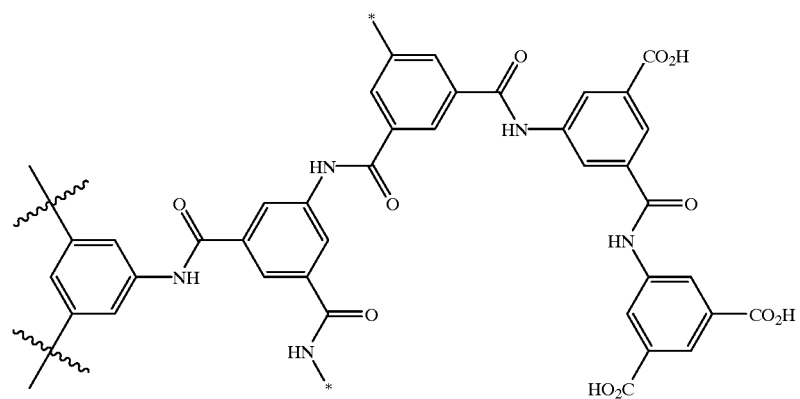

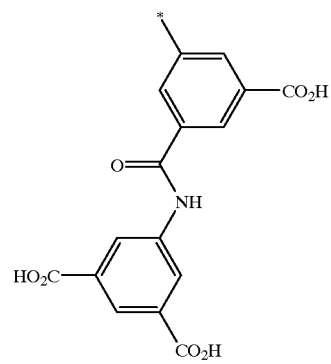
(vii)
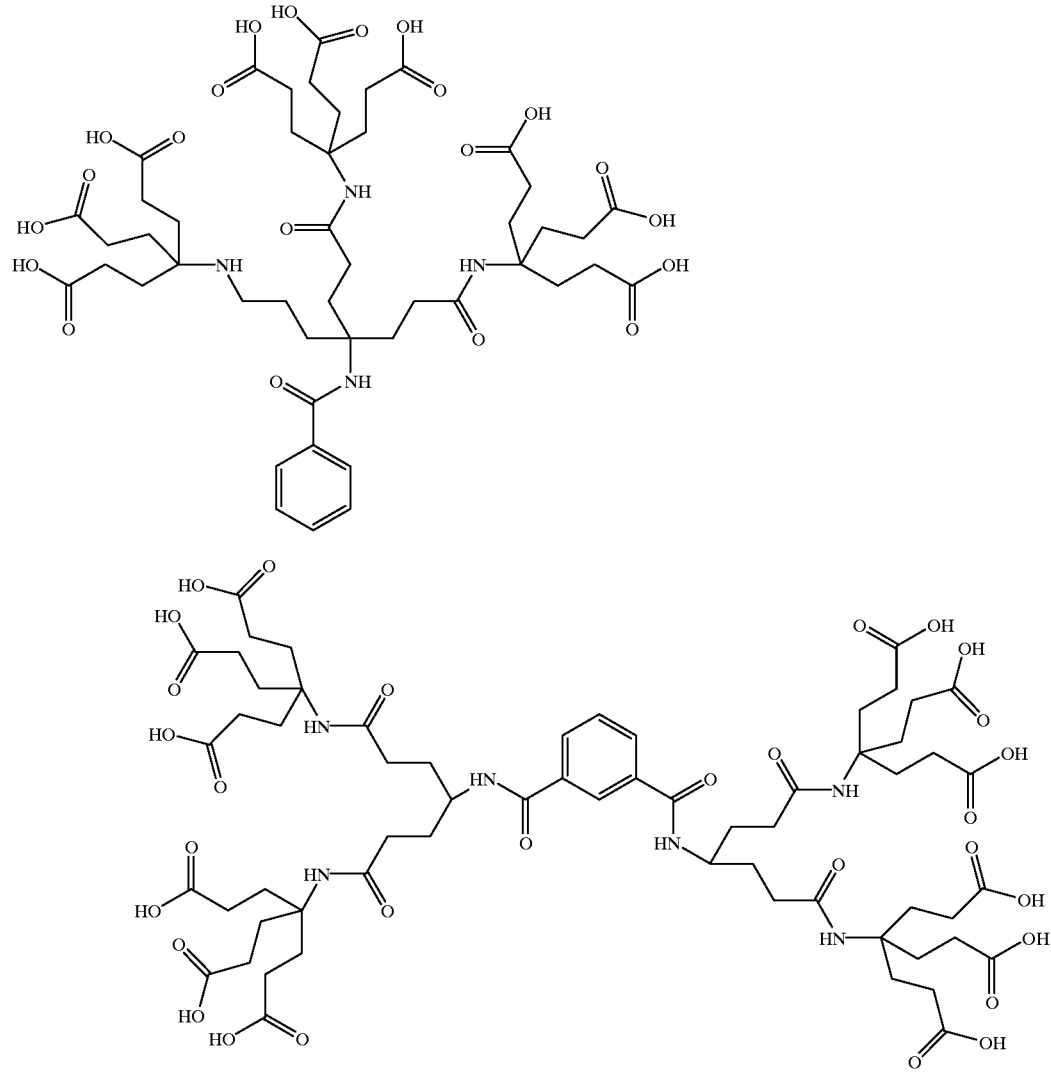

-continued
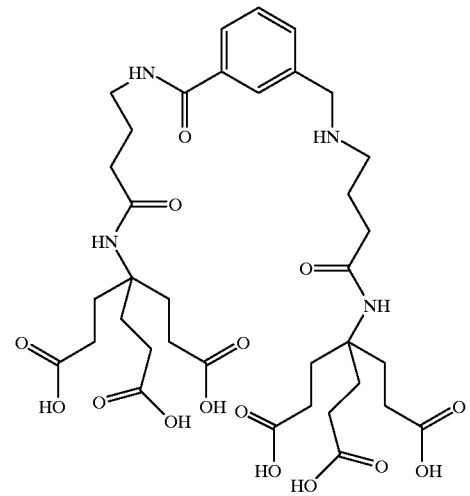
27-Cascade:benzene[3-1,3,5]:(3-oxo-2-azapropylidyne): (3-oxo-2-azapentylidyne):propanoic acid
(viii)
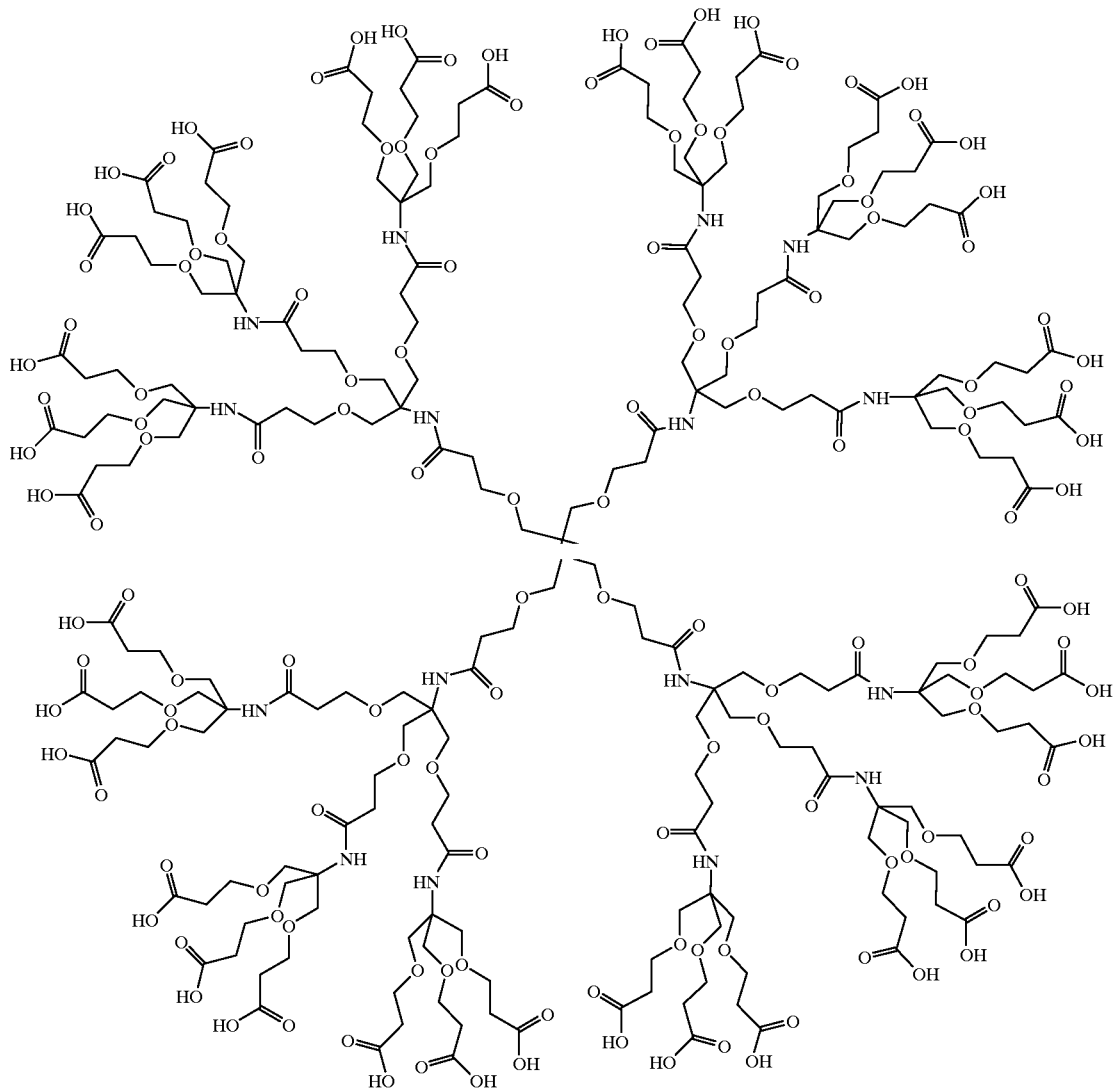
36-Cascade:methane[4]: (3-oxo-6-oxa-2-azaheptylidyne)$^2$:4-oxapentanoic acid (ix)
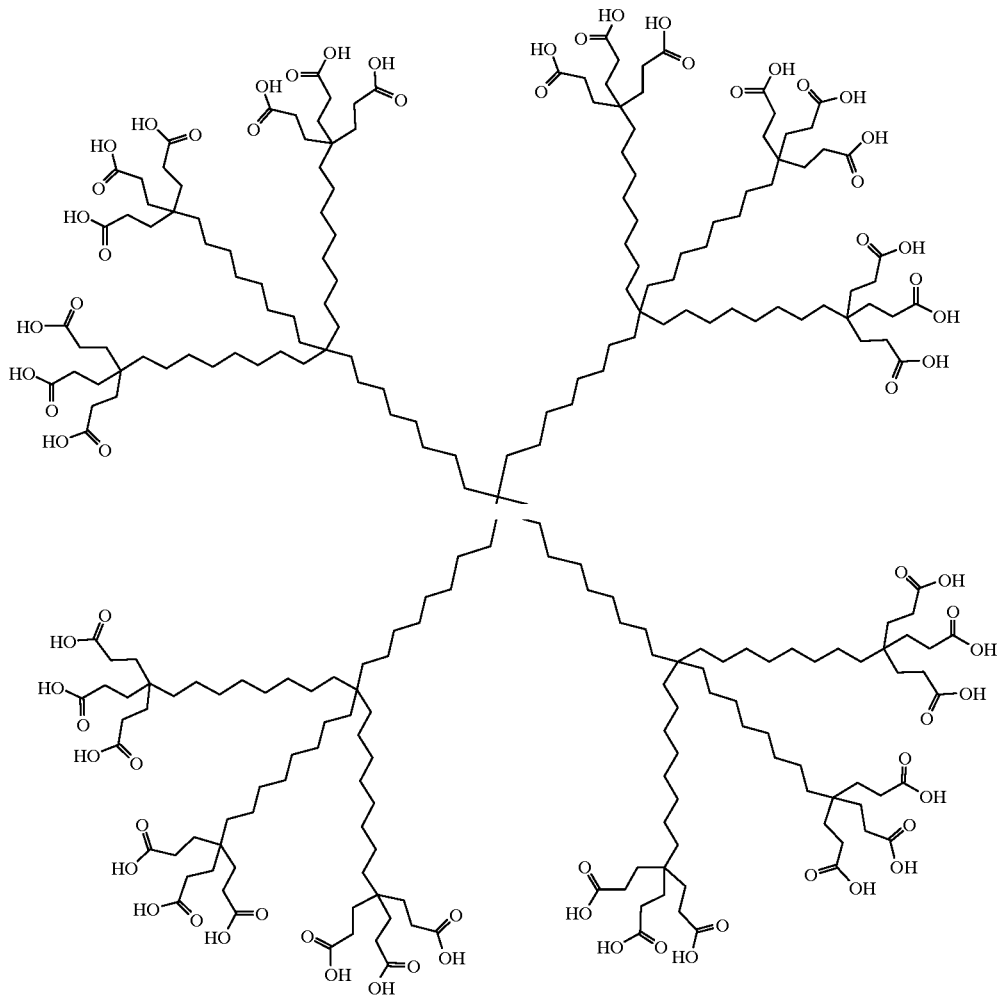
4,4,40,40-tetrakis(propylcarboxy)-13,13,31,31-tetrakis[12-carboxy-
9,9-bis(3-propylcarboxy)dodecyl]-22,22-bis[21-carboxy-
18,18-bis(propylcarboxy)-9,9-bis[12-carboxy-
9,9-bis(propylcarboxy)dodecyl]heneicosyl]tritetracontanedioicacid
(x)
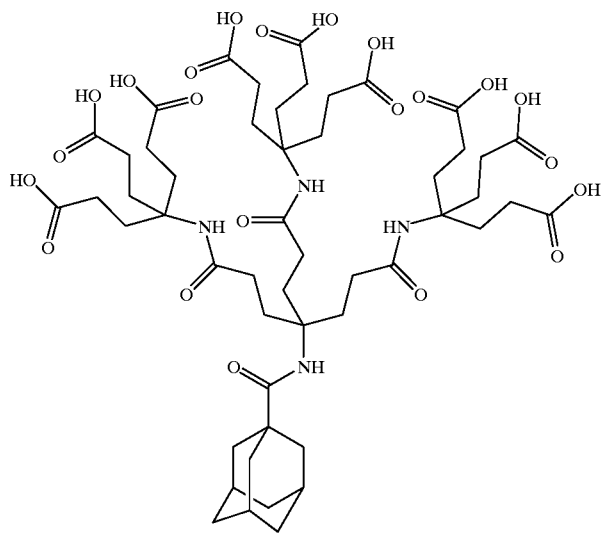

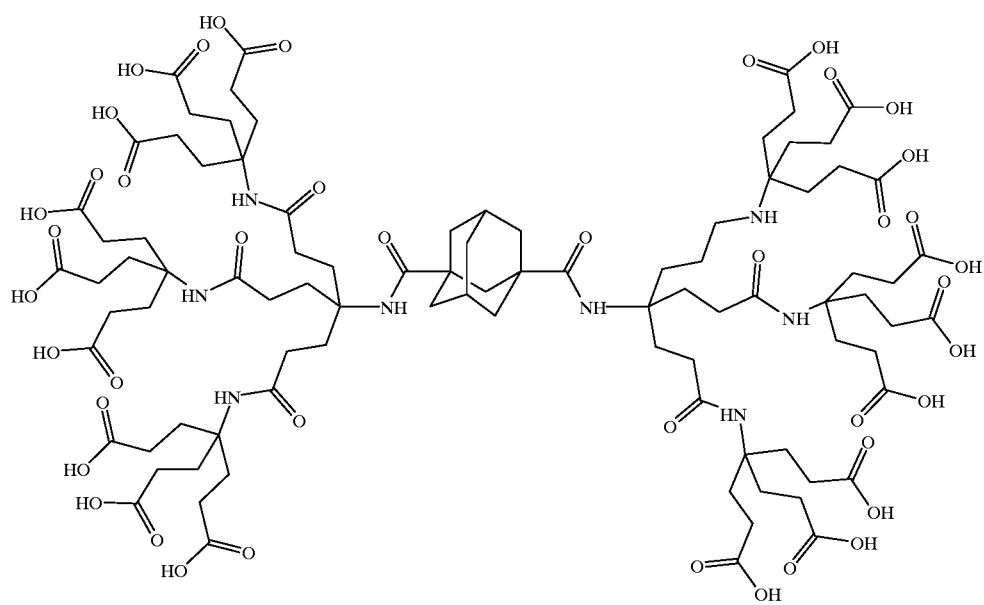
4,4′,4″,4‴-[tricyclo[3.3.1.1^{3,7}]decane-1,3,5,7-tetrayltetrakis(carbonylimino)]tetraki[4-(2-carboxyethyl)-heptanedioic acid
(xi)
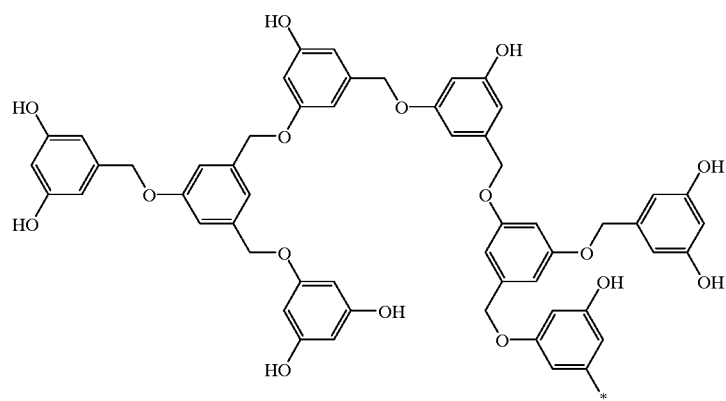

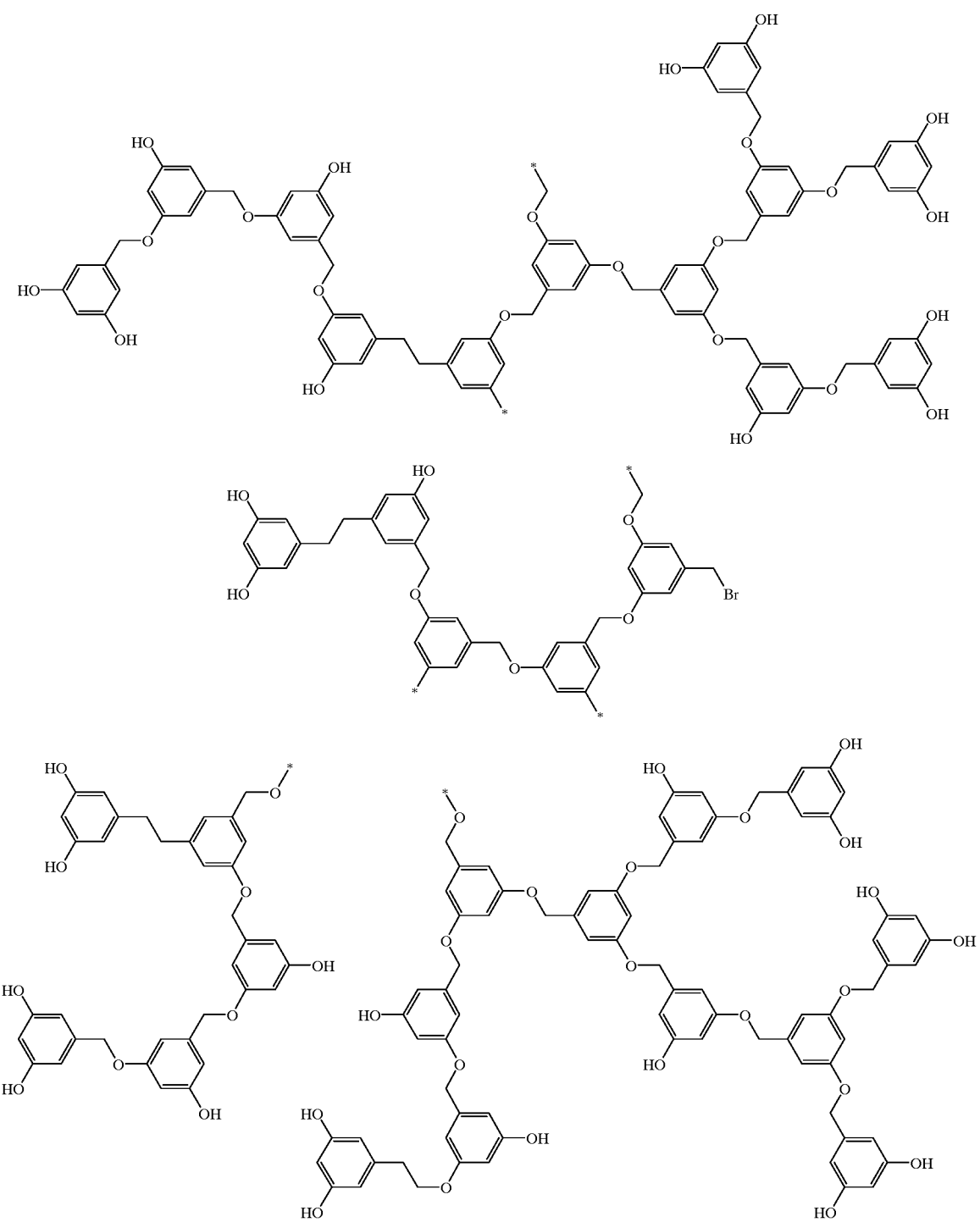

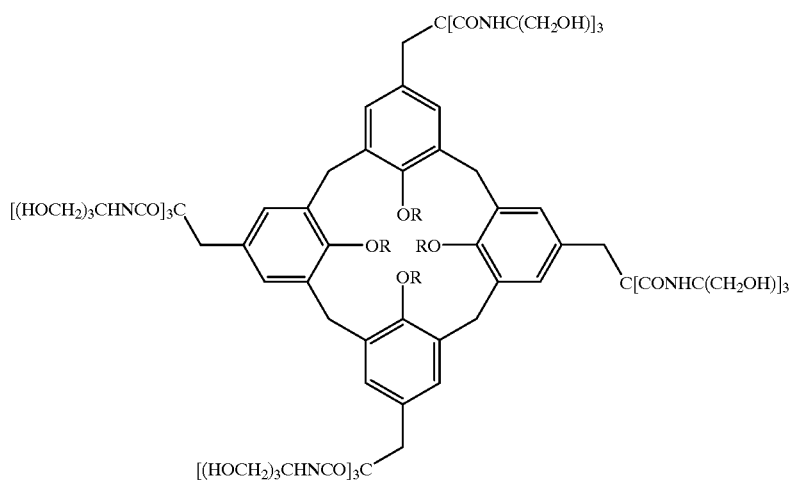
(xii)
(n = 1; R = Me)
(n = 5; R = Me)
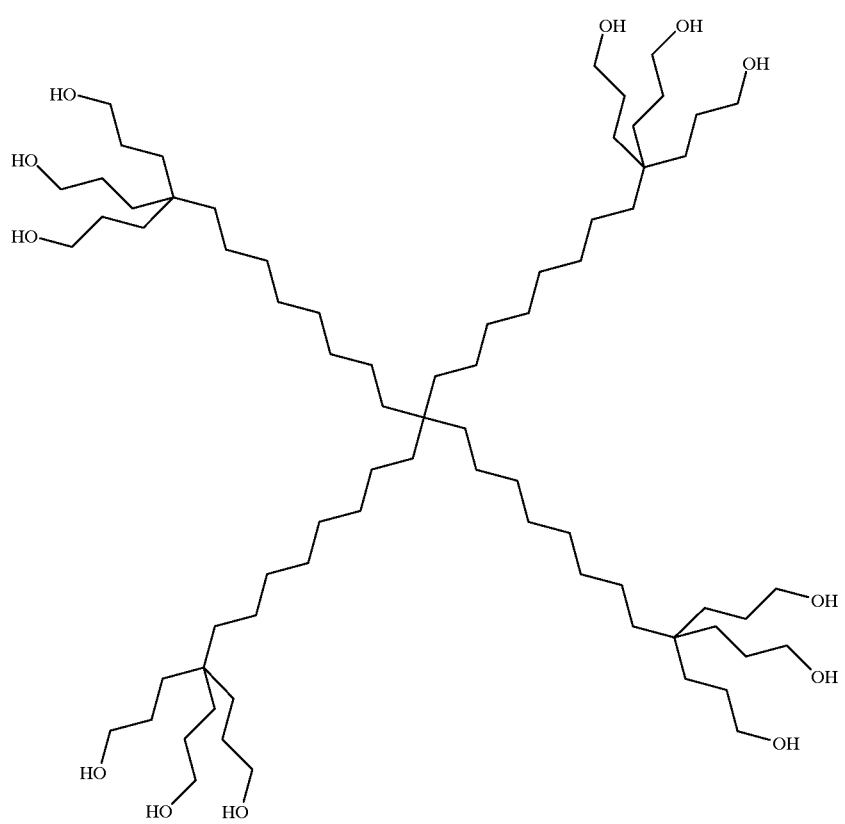
(xiii)
12-Cascade:methane[4]:(nonylidyne):propanol

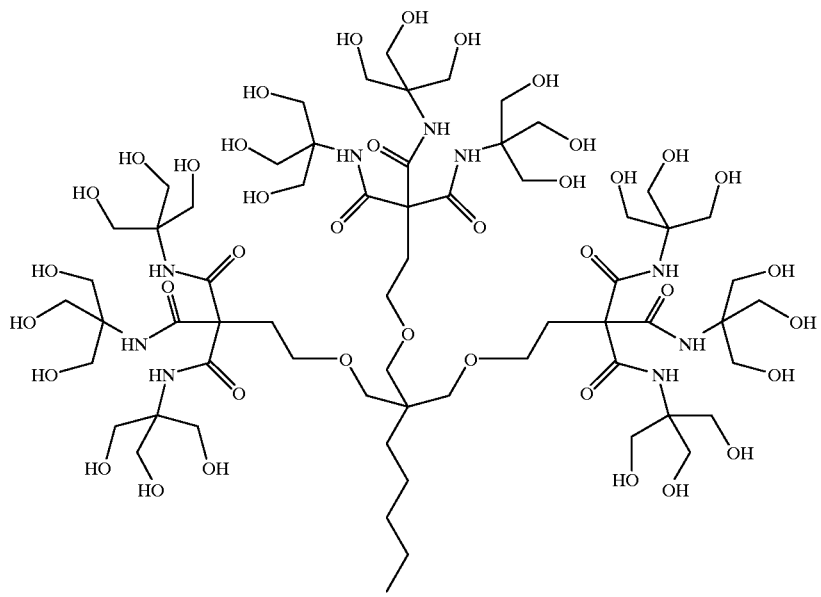

(xiv)

1,19-dihydroxy-N,N',N'',N'''-tetrakis[2-hydroxy-
1,1-bis(hydroxymethyl)ethyl]-10-[[4-[[2-hydroxy-
1,1-bis(hydroxymethyl)ethyl]amino]-3,3-bis[[[2-hydroxy-
1,1-bis(hydroxymethyl)ethyl]amino]carbonyl]-
4-oxobutoxy]methyl]-2,2,18,18-tetrakis(hydroxymethyl)-
4,16-dioxo-10-pentyl-8,12-dioxa-3,17-diazanonadecane-
5,5,15,15-tetracarboxamide

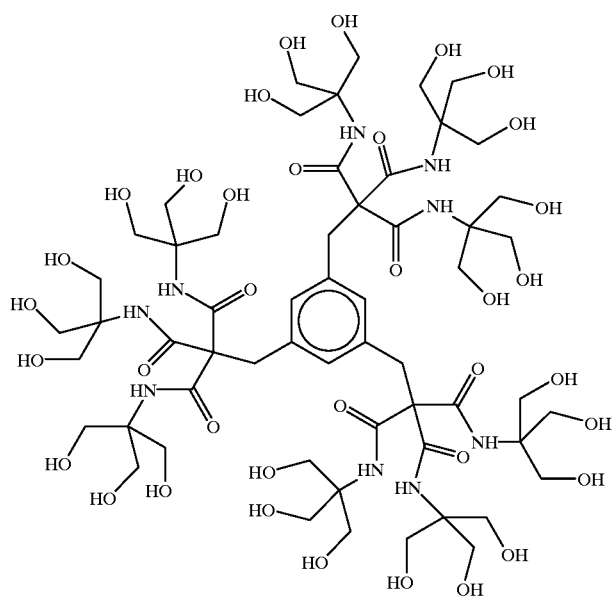

(xv)

N,N',N''-Tris[2-hydroxy-1,1-bis(hydroxymethyl)ethyl]-
α,α,α',α',α'',α''-hexakis[[[2-hydroxy-
1,1-bis(hydroxymethyl)ethyl]amino]carbonyl]-
1,3,5-benzebetripropanamide While the size of the highly regular dendrimer used in the present invention is not specially limited, preferably, dendrimers of first to fifth generations are used, more preferably dendrimers of first to third generations are used, and particularly preferably a dendrimer of first or second generation is used, since a vinyl-group-containing dendorimer and its composition having both a desirable viscosity before curing and desirable physical properties after curing can be obtained.

The above dendrimer of the first or second generation is preferably selected from polyamino dendrimers of the formulae (i) and (ii) which are commercially available from DSM.

While the number average molecular weight of the polyfunctional compound (a) used in the present invention is not specially limited, it is preferably 30 to 50,000, more preferably 50 to 5,000. When the above number average molecular weight is more than 50,000, the polyfunctional compound (a) has a high viscosity or it is a solid, which is undesirable for handling.

While the above dendrimer per se can be used as a polyfunctional compound (a) in the present invention, a vinyl-group-containing dendrimer having a desirable viscosity before curing and curing properties can be obtained by introducing a branch having a proper long chain and a terminal functional group to active-hydrogen-containing groups of the dendrimer. When the active-hydrogen-containing group of the polyfunctional compound (a) is a primary amino group or a hydroxysilyl group, the number of the active-hydrogen-containing groups can be increased by using it as a branching portion.

The method of modifying the polyfunctional compound (a) can be selected depending upon kinds of functional groups and kinds of intended active-hydrogen-containing groups, and it is not specially limited. For instance, the polyfunctional compound (a) being the above polyamino dendrimer having a primary or secondary amino group as an active-hydrogen-containing group can be easily modified by reacting with an active-hydrogen-containing (meth)acrylate compound (a-1) in a Michael addition reaction.

The active-hydrogen-containing (meth)acrylate compound (a-1) in the present invention has at least one hydroxyl group or carboxyl group per molecule, and it includes, for example, a hydroxylalkyl (meth)acrylate compound of the following formula (5), $$CH_2=C(R^6)COO-R^7-OH \qquad (5)$$

wherein $R^6$ is a hydrogen atom or methyl, and $R^7$ is an alkylene group having 2 to 22 carbon atoms, preferably 2 to 6 carbon atoms, a polyalkylene glycol mono(meth)acrylate compound of the following formula (6), $$CH_2=C(R^6)COO(C_xH_{2x}O)_mH \qquad (6)$$

wherein $R^6$ is a hydrogen atom or methyl, x is an integer of 1 to 6, preferably 2 to 4, and m is an integer of 1 to 25, preferably 2 to 16, a polylactone mono(meth)acrylate compound of the following formula (7), $$CH_2=C(R^6)COOC_yH_{2y}O(COC_zH_{2z})_kH \qquad (7)$$

wherein $R^6$ is a hydrogen atom or methyl, y is an integer of 2 to 22, preferably 2 to 16, z is an integer of 2 to 15, preferably 3 to 5, and k is an integer of 1 to 20, preferably 1 to 5, and a urethane mono(meth)acrylate compound of the following formula (8), $$CH_2=C(R^6)COR^7O[CONHR^8NHOR^9O)_hH \qquad (8)$$

wherein $R^6$ is a hydrogen atom or methyl, $R^7$ is an alkyl group having 2 to 22 carbon atoms, preferably 2 to 16 carbon atoms, $R^8$ is an isocyanate residue of any one of the following formula (8-a) to (8-h), $R^9$ is a dihydric alcohol residue represented by $-(C_pH_{2p}O)_{q^-}$ or $-C^pH_{2p}-$ in which p is an integer of 1 to 4 and q is an integer of 1 to 100, and h is an integer of 1 to 10.

(8-a)

(8-b)

(8-c)

(8-d)

(8-e)

(8-f)

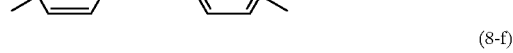
(8-g)

(8-h)

In the present invention, the chain length of the above active-hydrogen-containing (meth)acrylate compound (a-1) is preferably small when a hard cured product is required, and it is large for the purpose of improving flexibility. In the above range, a viscosity tends to decrease with an increase of the chain length in spite of increasing in a molecular weight. When the chain length is larger than the above range, undesirably, the vinyl-group-containing dendrimer has a high viscosity, or it is a solid at room temperature and further, it is poor in curing properties.

More specifically, the hydroxyalkyl (meth)acrylate compound of the general formula (5) includes 2-hydroxyethyl (meth)acrylate, 2-hydroxypropyl (meth)acrylate, 4-hydroxybutyl (meth)acrylate and 2-hydroxybutyl (meth)acrylate.

The alkylene glycol mono(meth)acrylate compound of the general formula (6) includes diethylene glycol mono(meth)acrylate, triethylene glycol mono(meth)acrylate, tetraethylene glycol mono(meth)acrylate, tetrapropylene glycol (meth)acrylate, dipropylene glycol mono(meth)acrylate, tripropylene glycol mono(meth)acrylate, tetrapropylene glycol mono(meth)acrylate and polytetramethylene glycol (meth)acrylate.

The polycaprolactone mono(meth)acrylate compound of the general formula (7) includes 2-(meth)acryloyloxyethylhydrogene caprolactonate, 2-(meth)acryloyloxyethylhydrogene dicaprolactonate, 2-(meth)acryloyloxyethylhydrogene poly (polymerization degree 3 to 5) caprolactonate and 2-(meth)acryloyloxyethyl-2-hdyroxy-6-hexanolactonate.

In addition to the above compounds of the general formulae (5) to (7), the active-hydrogen-containing (meth)acrylate compound (a-1) in the present invention includes 2-(meth)acryloyloxyethyl-2-hydroxypropyl phthalate, 3-chloro-2-hydroxypropyl (meth)acrylate and 2-hydroxy-3-phenoxypropyl (meth)acrylate, and it also includes glycerol mono(meth)acrylate, pentaerythritol mono(meth)acrylate, ethylene-oxide-modified pentaerythritol mono(meth)acrylate, trimethylolpropane mono(meth)acrylate and ethylene-oxide-modified trimethylolpropane mono(meth)acrylate.

The (meth)acrylate compound having a carboxyl group in the molecule includes maleic acid, fumaric acid, itaconic acid, citraconic acid, alkyl or alkenyl monoesters of these, β-(meth)acryloxyethyl isophthalate monoester, β-(meth)acryloxyethyl terephthalate monoester, β-(meth)acryloxyethyl succinate monoester, acrylic acid, methacrylic acid, crotonic acid and cinnamic acid.

The long-chain-containing multi-branched compound (X) in the present invention is obtained by reacting a long-chain-containing compound (b) having a functional group reactive with active hydrogen with the above polyfunctional compound (a). The long-chain-containing multi-branched compound has at least 2, preferably 3 to 60 active-hydrogen-containing functional groups in the terminal and at least 1, preferably 2 to 127, more preferably 4 to 100 active hydrogen atom.

When the above polyfunctional compound (a) has a primary or secondary amino group as a terminal functional group, a non-functional (meth)acrylate compound (b-1) of the following general formula (3) is preferrably used as the above long-chain-containing compound (b), since a long-chain-containing multi-branched compound (X-1) can be obtained by a Michael addition reaction under a moderate condition.

(3)

In the above formula, $R^6$ is a hydrogen atom or methyl and $R^5$ is $—C_nH_{2n+1}$, $—(C_xH_{2x}O)_mR^2$ or $—C_yH_{2y}O(COC_zH_{2z}O)_kR^2$ in which $R^2$ is a phenyl group or an alkyl group having 1 to 22, preferably 1 to 16 carbon atoms, n is an integer of 4 to 25, preferably 4 to 16, x is an integer of 1 to 6, preferably 2 to 4, y is an integer of 2 to 22, preferably 2 to 16, z is an integer of 2 to 15, preferably 3 to 5, m is an integer of 1 to 25, preferably 2 to 16 and k is an integer of 1 to 20, preferably 1 to 5. When n, x, m, y, z or k is outside the corresponding range, undesirably, the long-chain group is liable to undergo crystallization or the molecular weight is made higher than necessary, which results in an increase in viscosity. Further, $R^6$ is preferably a hydrogen atom since it is effective for improving a reaction efficiency.

Specifically, the alkyl (meth)acrylate compound of the above formula (3) in which $R^5$ is $—C_nH_{2n+1}$ includes methyl methacrylate, ethyl methacrylate, butyl (meth)acrylate, pentyl (meth)acrylate, heptyl (meth)acrylate, hexyl (meth)acrylate, octyl (meth)acrylate, 2-ethylhexyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, eicoscyl (meth)acrylate, heneicosyl (meth)acrylate and docosyl (meth)acrylate.

The alkylene glycol (meth)acrylate compound of the above formula (3) in which $R_5$ is $—(C_xH_{2x}O)_mR^2$ includes methoxydiethylene glycol (meth)acrylate, methoxytriethylene glycol (meth)acrylate, phenoxydiethylene glycol (meth)acrylate, phenoxyethylene glycol (meth)acrylate, methoxytetraethylene glycol (meth)acrylate, ethoxytetraethylene glycol (meth)acrylate, propxytetraethylene glycol (meth)acrylate, n-butoxytetraethylene glycol (meth)acrylate, n-pentoxytetraethylene glycol (meth)acrylate, tripropylene glycol (meth)acrylate, tetrapropylene glycol (meth)acrylate, methoxytripropylene goycol (meth)acrylate, methoxytetrapropylene glycol (meth)acrylate, ethoxyetrapropylene glycol (meth)acrylate, propoxytetrapropylene glycol (meth)acrylate, n-butoxytetrapropylene glycol (meth)acrylate, n-pentoxytetrapropylene glycol (meth)acrylate, polytetramethylene glycol (meth)acrylate, methoxypolytetramethylene glycol (meth)acrylate, methoxypolyethylene goycol (meth)acrylate, ethoxypolyethylene glycol (meth)acrylate, phenoxytriethylene glycol (meth)acrylate, phenoxytetraethylene glycol (meth)acrylate, phenoxyhexaethylene glycol (meth)acrylate, phenoxypolyethylene glycol (meth)acrylate, and phenoxytetrapropylene glycol (meth)acrylate.

The polylactone (meth)acrylate compound of the above formula (3) in which $R^5$ is $—C_yH_{2y}O(COC_zH_{2z}O)_kR^2$ includes 2-(meth)acryloyloxyethyl hydrogenmethoxycaprolactonate, 2-(meth)acryloyloxyethyl hydrogenmethoxydicarprolatonate, 2-methacryloyloxy hydrogenmethoxypoly (polymerization degree 3 to 5) caprolactonate, and 2-(meth)acryloyloxyethyl-2-methoxy-6-hexanolactonate.

In the present invention, the long-chain-containing multi-branched compound (X-1) can obtained effectively obtained by reacting the above polyamino dendrimer with a mixture of the active-hydrogen-containing (meth)acrylate compound (a-1) with the non-functional (meth)acrylate compound (b-1) in a Michael addition reaction. The amount of the above mixture of the active-hydrogen-containing (meth)acrylate compound (a-1) with the non-functional (meth)acrylate compound (b-1) is not specially limited so long as at least one of each of the active-hydrogen-containing (meth)acrylate compound (a-1) with the non-functional (meth)acrylate compound (b-1) constitutes an adduct.

However, the amount of the above mixture based on the total amount of active hydrogen atoms derived from the polyamino dendrimer is preferably 10 to 95%, more preferably 50 to 90%. When the above amount is smaller than the above lower limit, undesirably, it is sometimes difficult to obtain a multi-branched structure and it is sometimes difficult to fully reflect the feature of the (a-1) and (b-1)

Further, while the mixing ratio of the active-hydrogen-containing (meth)acrylate compound (a-1) and the non-functional (meth)acrylate compound (b-1) differs depending upon the total number of active hydrogen atoms derived from the polyamino dendorimer, the (a-1):(b-1) mixing ratio is 1:99 to 99:1, preferably 20:80 to 95:5. When the amount of the (b-1) is too large, undesirably, it is sometimes difficult to obtain sufficient curing properties. When it is too small, undesirably, no sufficient effect is obtained.

While the above long-chain-containing polyfunctional compound (X-1) can be obtained by a reaction according to a conventional method, side reactions do not take place much when an alcohol such as methanol or ethanol is used as a solvent. When the solvent is used, the amount of the solvent is preferably 1 to 100 times the amount of the polyamino dendrimer. Further, while the reaction does not require heating, it is preferred to heat a reaction mixture at a temperature in the range of from 30 to 70° C. when the polyamino dendrimer or the (meth)acrylate compound has a high molecular weight. While the reaction time differs depending upon the polyamino dendorimer and a reaction temperature, it is 30 minutes to 72 hours, generally 1 day at room temperature, or 1 to 10 hours under heat at a temperature of 50 to 100° C.

In the present invention, a vinyl group is introduced for imparting the long-chain-containing multi-branched compound (X) with reactivity, and it is not specially limited so long as it has a polymerizable double bond. The vinyl group preferably includes the following.

| | | |
|---|---|---|
| $CH_2=CHCOO—$ | acryl group | (9-1) |
| $CH_2=CH(CH_3)COO—$ | methacryl group | (9-2) |
| $CH_2=CH—$ | vinyl group | (9-3) |
| $CH_2=CH—CH_2—O—$ | allyl group | (9-4) |
| $—CH=CH—$ | dienyl group | (9-5) |
| $CH_2=CH—C_6H_4—$ | phenylvinyl group | (9-6) |
| $CH_2=CH—O—$ | vinylether group | (9-7) |

In view of reactivity in curing with radiation, of the above vinyl groups, an acryl group is preferred for ultraviolet curing, and a methacryl group is preferred from the aspects of reactivty and safety since it shows relatively high curing properties in electron beam curing. It is also preferred to use a combination of a (meth)acryl group with a vinyl ether group.

In the present invention, the chain length of the branch having the vinyl group introduced is defined to be the number of atoms which are linearly connected and are counted from an atom present next to the binding atom of the branching portion to a first-appearing Z—CH=CH— structure (Z is a hydrogen atom or an organic residue). When the chain contains a ring structure such as an aromtic ring, a cyclized ring or hetero ring, the number of the ring structure is counted as two atoms. In the present invention, the chain length of the branch portion having the vinyl group introduced is preferably 2 to 100, more preferably 9 to 70.

In the present invention, the vinyl-group-containing dendrimer is obtained by introducing the vinyl group into the above long-chain-containing multi-branched compound (X), and basically, it is obtained by a reaction between the active-hydrogen-containing functional group of the long-chain-containing multi-branched compound (X) and the vinyl-group-containing compound (c) having a functional group reactive with active hydrogen.

In the present invention, the functional group reactive with active hydrogen is selected depending upon the active-hydrogen-containing functional group of the long-chain-containing multi-branched compound (X). For example, when the active-hydrogen-containing functional group of the long-chain-containing multi-branched compound (X) is a primary or secondary amino group, the above functional group reactive with active hydrogen is preferably an acryl group, a carboxyl group or an epoxy group. When the above active-hydrogen-containing terminal group is a hydroxyl group, the above functional group is preferably an isocyanate group, a glycidyl group or a carboxyl group.

The vinyl-group-containing compound (c) that can be used when the long-chain-containing multi-branched compound (X) has an amino group as the active-hydrogen-containing functional group includes compounds having an acryloyl group and other vinyl group, such as 2-hydroxy-3-acryloyloxypropyl methacrylate. In this case, however, no acryl group can be introduced to the terminal, and it is therefore sometimes difficult to obtain sufficient curing properties as an ultraviolet curable compound in particular.

The vinyl-group-containing compound (c) that can be used when the active-hydrogen-containing functional group is a hydroxyl group includes epoxy-group-containing vinyl compounds such as glycidyl (meth)acrylate, 3,4-epoxycyclohexyl (meth)acrylate, 1-vinyl-3,4-epoxycylcohexane, and (3,4-epoxycyclohexyl-5-hydroxyhexanoic carboxylate) (meth)acrylate.

Further, the isocyanate-group-containing vinyl compound (c-1) having an isocyanate group can be used when the active-hydrogen-containing functional group is a hydroxyl group, a carboxyl group or an amino group. In view of the stability of the terminal vinyl group, particularly, a combination of a hydroxyl group with an isocyanate group is preferred since the reaction proceeds under a moderate condition.

A preferred method of using the above isocyanate-group-containing vinyl compound (c-1) is as follows. A mixture of the active-hydrogen-containing (meth)acrylate compound (a-1) with the non-functional (meth)acrylate compound (b-1) is reacted with the polyamino dendrimer in a Michael addition reaction to obtain the above long-chain-containing multi-branched compound (X-1), and the obtained long-chain-containing multi-branched compound (X-1) is reacted with the isocyanate-group-containing vinyl compound (c-1) in an addition reaction, whereby the vinyl group can be introduced.

The above isocyanate-group-containing vinyl compound (c-1) includes, for example, methacryloyloxyethyl isocyanate (MOI), vinyl isocyanate, allyl isocyanate, (meth)acryloyl isocyanate (MAI) and isopropenyl-α,α-dimethylbenzyl isocyanate (TMI).

In the present invention, further, a compound obtained by reacting equimolar amounts of a diisocyanate compound and a vinyl compound having one functional group reactive with an isocyanate group can be also used as an isocyanate-group-containing vinyl compound (c-1).

The above diisocyanate compound includes hexane 1,6-diisocyanate, isophorone diisocyanate, 4,4'-diphenylmethane diisocyanate, polymeric diphenylmethane diisocyanate, xylylene diisocyanate, tolutoluylene diisocyanate, hexamethylene diisocyanate, 4-methyl-m-phenylene diisocyanate, naphthylene diisocyanate, p-phenylene diisocyanate, tetramethylxylylene diisocyanate, cyclohexylmethane diisocyanate, hydrogenated xylylene diisocyanate, cyclohexyl diisocyanate, 2,2,4-trimethylhexamethylene diisocyanate, 2,4,4-trimethylhexamethylene diisocyanate, m-tetramethylxylylene diisocyanate, p-tetramethylxylylene diisocyanate and dimer acid diisocyanate.

While the vinyl compound having a functional group reactive with an isocyanate group, used in the present invention, includes vinyl compounds having an amino group, a hyrdoxyl group or a carboxyl group, a vinyl compound having a hydroxyl group or a carboxyl group is preferred in view of reactivity with an isocyanate group. As (meth)acrylate compound having a hydroxyl group in the present invention, a compound having one hydroxyl group alone can be used out of the above compounds. A compound having a relatively low molecular weight is preferred in view of reactivity with the diisocyanate, and it includes, for example, 4-hydroxybutyl (meth)acrylate, 2-hydroxyethyl (meth)acrylate and 2-(meth)acryloyloxyethyl hydrogencaprolactonate.

In the present invention, the amount ratio of the introduced vinyl group is not specially limited so long as the vinyl-group-containing dendrimer contains at least one vinyl group. However, the amount ratio of the vinyl group based on the total active hydrogen amount in the long-chain-containing multi-branched compound (X) is preferably 10 to 95%, more preferably 20 to 80%. When the above amount ratio is less than the above lower limit, undesirably, no sufficient curability can be obtained. When it is larger than the above upper limit, undesirably, the obtained vinyl-group-containing dendrimer sometimes has an increased viscosity, shows poor solubility with other component and causes a deterioration in the physical properties of a coating such as adhesion.

The amount of the isocyanate-group-containing compound (c-1) is not specially limited so long as at least one isocyanate group of isocyanate-group-containing compound (c-1) bonds to the functional group of the long-chain-containing multi-branched compound (x). However, the amount of the isocyanate-group-containing compound (c-1) is preferably 10 to 95%, more preferably 20 to 80%, based on the total amount of active hydrogen atoms which are derived from the polyamino dendrimer or derived from the terminal of the active-hydrogen-containing (meth)acrylate compound (a-1) and present in the multi-branched compound or the long-chain-containing multi-branched compound (X-1).

When the above isocyanate-group-containing vinyl compound (c-1) is added, a catalyst may be added as required. The catalyst is selected from tin-containing catalysts used for synthesis of general urethane, such as tin octylate or tin 2-ethylhexanoate. The amount of the catalyst based on the isocyanate-group-containing vinyl compound (c-1) is 1 to 0.01% by weight.

The vinyl-group-containing dendrimer obtained in the present invention is a liquid having a number average molecular weight of 200 to 100,000, preferably 300 to 50,000, more preferably 400 to 40,000 and a viscosity (30° C.) of 100,000 cps or less, preferably 50,000 to 500 cps, more preferably 20,000 to 1,000 cps. When the above molecular weight is lower than the above lower limit, undesirably, shrinking occurs extremely at a curing time. When the above molecular weight is high, it is not a special problem so long as the dendrimer has a viscosity in a range where a coating can be formed. However, when the above molecular weight is greater than the above upper limit, the viscosity increases, and it is undesirable in view of coating properties. Further, when the above viscosity exceeds the above upper limit, it is undesirable in view of its solubility with other component and film-forming properties.

While the vinyl-group-containing dendrimer (A) obtained in the present invention exhibits sufficient film-forming properties when used alone, there may be prepared a composition by mixing it with a polymerizable unsaturated-binding-group-containing compound (B) other than the above vinyl-group-containing dendrimer, for improving the viscosity of a curing composition before curing and the coating properties after curing such as water resistance, hardness and abrasion resistance. The polymerizable unsaturated-binding-group-containing compound (B) includes compounds having at least one unsaturated double bond per molecule, and particularly, it includes (meth)acrylate compounds and vinyl compounds. Of these, it is desirable to use a (meth)acrylate compound in view of safety and easiness in acquisition.

The above (meth)acrylate compounds include, for example, monofunctional (meth)acrylate compounds such as methyl (meth)acrylate, butyl (meth)acrylate, 2-hydroxyethyl (meth)acrylate, phenoxyethyl (meth)acrylate, phenoxymethyl (meth)acrylate, benzyl (meth)acrylate, isobornyl (meth)acrylate, dicyclopentynyl (meth)acrylate and (dicyclopentenyl)oxy(meth)acrylate.

Further, the above (meth)acrylate compound also includes difunctional (meth)acrylate compounds such as ethylene glycol di(meth)acrylate, diethylene glycol di(meth)acrylate, triethylene glycol di(meth)acrylate, polyethylene glycol di(meth)acrylate, tripropylene glycol di(meth)acrylate, polypropylene glycol di(meth)acrylate, 1,3-butylene glycol di(meth)acrylate, 1,6-hexanediol di(meth)acrylate, 2-methyl-1,8-octanediol diacrylate, 1,9-nonanediol di(meth)acrylate, neopentyl glycol di(meth)acrylate, 2,2-bis[4-{(meth)acryloxydiethoxy}phenyl]propane, 2,2-bis[4-{(meth)acryloxyethoxylphenyl}phenyl]propane, 2,2-bis[4-{(meth)acryloxypolyethoxy}phenyl]propane, 2,2-bis[4-{(meth)acryloxydipropoxy}phenyl]propane, 2,2-bis[4-{(meth)acryloxypropoxy}phenyl]propane, 2,2-bis[4-{(meth)acryloxypolypropoxy}phenyl]propane, and tricyclo[$5.2.1.0^{2,6}$]decanyl di(meth)acrylate.

Further, the above (meth)acrylate compound also includes trifunctional or higher (meth)acrylate compounds such as trimethylolpropane tri(meth)acrylate, tetramethylolmethane tri(meth)acrylate, tetramethylolethane tri(meth)acrylate, tetramethylolmethane tetra(meth)acrylate, ethylene-oxide-modified trimethylolpropane tri(meth)acrylate pentaerythrytol tetra(meta)acrylate, pentaerythrytol tri(meta)acrylate and dipentaerythritol hexa(meth)acrylate.

Further, the above vinyl compound includes, for example, methyl vinyl ether, ethyl vinyl ether, propyl vinyl ether, isobutyl vinyl ether, octadecyl vinyl ether, vinyl cyclohexyl ether, vinyl-4-hydroxybutyl ether, butanediol-1,4-divinyl ether, vinylpyrrolidone, vinylcaprolactam, vinyl carbazole, vinyl-1-imidazole, divinylethyleneurea, N-vinylformamide, N-vinylformalin, allyl glycidyl ether and allyl chloride. Further, diene compound, styrene compounds and unsaturated aliphatic compound can be used.

As a reactive diluent for the vinyl-group-containing dendrimer (A) of the above polymerizable unsaturated-group-containing compounds (B), the diluent preferably has an SP value of 8.5 to 12.5, more preferably 9.0 to 11.0. Compounds having an SP value in the above range are excellent in the solubility with the vinyl-group-containing dendrimer (A) or general reactive oligomers, and in the above range, the feature of a dendrimer whose chain does not extend much can be utilized.

In the present invention, the mixing ratio of the vinyl-group-containing dendrimer (A) and the polymerizable unsaturated-group-containing compound (B) [(A):(B)] is referably 5:95 to 99:1, more preferably 20:80 to 80:20. When the ratio of (A) is smaller than the above, undesirably, a shrinkage takes place extremely at a curing time and the curing properties are extremely degraded.

Further, the curable composition obtained in the present invention preferably has a viscosity, before cured, of 10 to 50,000 cps (30° C.), more preferably 20 to 20,000 cps. When it is attempted to obtain a curable composition having a viscosity lower than the above lower limit, undesirably, a larger amount of the polymerizable unsaturated-group-containing compound (B) is required. When the above viscosity is larger than the above upper limit, undesirably, the composition is poor in coating properties.

While the vinyl-group-containing dendrimer (A) per se or the curable composition, obtained in the present invention, can be used as a curable solventless liquid resin and can be used as film-forming materials such as a coating composition and an ink, a molding material and an adhesive, it can be adjusted in viscosity, film formability and performance of a coating by adding a crosslinking agent such as a mono-functional or polyfunctional (meth)acrylate monomer, a polyisocyanate or melamine. For the same reason, a curing agent such as an amino resin or a phenolic resin may be added. Further, for improving the performances of a coating, the curable composition of the present invention may contain known general-use polymers such as a polyamide resin, a cellulose derivative, a vinyl resin, a polyolefin, a natural rubber derivative, an acrylic resin, an epoxy resin, a polyester and a polystyrene, vinyl-group-possessing reactive resins such as a urethane acrylic resin, an epoxy acrylic resin, an alkyd resin, a rosin-modifed alkyd resin and a linseed-oil-modified alkyd resin, and drying oils such as linseed oil, tung oil and soybean oil. However, the amount of each of these preferably does not exceed 40% by weight, more preferably does not exceed 20% by weight. Further, the curable composition of the present invention may contain a solvent, a compatibilizer, a surfactant or a lubricant. The amount of each of these is 20% by weight or less, preferably 10% by weight or less.

The curable composition of the present invention can be used as various printing inks and color coating compositions by adding, as colorants, proper amounts of dyes and pigments such as carbon black, titanium white, phthalocyanine, azo dye and quinacridone, and proper amounts of inorganic fillers such as Si fine particles, mica and calcium carbonate.

For curing the vinyl-group-containing dendorimer and the curable composition by irradiation with radiation, the composition may contain a known photo-polymerization sensitizer or initiator. Further, for improving the curable composition in fluidity, water or an organic solvent may be added.

The composition for forming a coating, containing the vinyl-group-containing dendorimer or the curable composition of the present invention, can be applied to metal plates such as various steel plates and aluminum plates and substrates of plastic films, paper and plastic film laminate paper by a coating method using a roll coater or a knife coater or a printing method such as an offset printing method, a gravure printing method, a letterpress printing method or a silk screen printing method, to form a film or coating having a thickness of 0.1 to 500 μm. And, the above composition can be cured by heating or irradiation with radiation such as electron beam, ultraviolet light, visible light or infrared light.

When the above composition is cured by irradiation with electron beam, there is used an electron beam irradiation apparatus having an energy preferably in the range of 10 to 1,000 kV, more preferably 30 to 300 kV. The dose is preferably 0.1 to 100 Mrad, more preferably 0.5 to 20 Mrad. When the dose is less than the above lower limit, it is difficult to obtain a sufficiently cured product. When the dose is larger than the above upper limit, undesirably, a coating, a film or a substrate is greatly damaged.

In the present invention, forming a film or a coating refers to the formation of a film or a coating having a thickness of 0.1 to 500 μm on a substrate formed of paper, a metal, plastic or ceramic by a printing method or an application method.

EFFECT OF THE INVENTION

The present invention provides a vinyl-group-containing dendorimer, having an active-hydrogen-containing site in the terminal and a non-functional-group-containing site, which has a low viscosity in spite of its high molecular weight and which exhibits excellent adhesion to various substrates, particularly a plastic substrate which has been said to be very difficult to use with a radiation-curing method by using a conventional solvent free curable resin composition. Further, low-molecular-weight compounds which are used in general solventless curable resin compositions and said to have problems in view of safety and physical properties can be decreased in amount or can be replaced, so that working environments can be improved. Further, there is provided a vinyl-group-containing dendorimer and a curable composition which is capable of forming a film (coating) by a conventional coating method using a roll coater or knife coater or by a conventional printing method such as an offset printing method, a gravure printing method, and which can be cured by any one of conventional triggers such as heating, ultraviolet light, infrared light, electron beam and γ ray. In particular, when cured by electron beam or γ ray, the curable resin composition of the present invention contains a vinyl-group-containing dendrimer and a polymerizable unsaturated-group-containing compound and can be cured in the absence of a catalyst or an initiator.

EXAMPLES

The present invention will be explained more in detail with reference to Examples hereinafter, while the present invention shall not be limited thereto.

<Methods of Structural Analysis, Measurement of Number Average Molecular Weight and Measurement of Viscosity>

1) Structural Analysis

Structures of synthesized vinyl-group-containing dendrimers were analyzed by $^1$H-NMR.

2) Number Average Molecular Weight

Gel permeation chromatography (Tosoh Corp SC-8020) A calibration curve of gel permeation chromatograph (GPC) was prepared from several kinds of vinyl-group-containing dendrimers having whose structures were analyzed by $^1$H-NMR, and results obtained by GPC measurement on the basis of the calibration curve were used. Concerning molecular weight distributions (Mw/Mn), values obtained by means of the above measuring apparatus were used.

3) Viscosity

Rheometer (RDS-II, RFS-II, supplied by Rheometrics) A sample was measured for a viscosity with a rheometer RDS-II (for measurement of high viscosity) or RFS-II (for measurement of low viscosity) depending upon the viscosity of the sample, and an obtained viscosity by static method (value at a share rate of 1 to 10/sec) was used.

<Electron Beam Irradiation Apparatus and Conditions of Irradiation>

1) Area beam electron beam irradiation apparatus, Curetron EBC-200-20-30 (Nisshin High Voltage)
Electron beam acceleration rate: 200 kV
A dose was adjusted in a range of 0.5 to 8 Mrad on the basis of an electric current amount.

2) MIN-EB (Supplied by AIT)
Electron beam acceleration rate: 60 kV
A dose was adjusted in a range of 0.5 to 8 Mrad on the basis of the velocity of a belt conveyer.

Compounds used in Examples and Comparative Examples or abbreviations therefore were as follows.

1) Polyfunctional compound (a) DAB4: shown by the structural formula (i) 4-Cascade: 1,4-diaminobutane[4]:propylamine DAB8: shown by the structural formula (ii) 8-Cascade: 1,4-diaminobutane[4]:1-azabutylidene)$^4$propylamine NMP12: shown by the structural formula (xiii) 12-cascade: methane[4]: (nonylidyne): propanol 2) Active-hydrogen-containing (meth)acrylate compound (a-1)
HEA: 2-hydroxyethyl acrylate
4HBA: 4-hydroxybutyl acrylate
PPG6A: polypropylene glycol (polymerization degree of PPG chain=6) acrylate
PEG7A: polyethylene glycol (polymerization degree of PEG chain=7) acrylate
PCL2A: 2-(meth)acryloyloxyethyl hydrogen dicaprolactonate (Praccel FA-2, supplied by Daicel Chemical Industries, Ltd.)

3) Non-functional (meth)acrylate compound (b-1)
BA: butyal acrylate
EHA: 2-ethylhexyl acrylate
LA: lauryl acrylate
MPEG9A: Methoxypolyethylene glycol (polymerization degree of PEG chain=9) acrylate 4) Vinyl-group-containing compound (c) having a functional group reactive with active hydrogen
G201P: 2-hydroxy-3-acryloyloxypropyl methacrylate 5) Isocyanate-group-containing vinyl compound (c-1)
MOI: Methacryloyloxyethyl isocynate
TMI: dimethyl meta-isopropylbenzyl isocyanate
Synthesis products shown in Synthesis Examples 1 to 7

6) Polymerizable-unsaturated-group-containing compound (B)
PEG9DA: Polyethylene glycol diacrylate (Mn=508, η=36.2 cps)
NODA: 1,9-nonanediol diacrylate (Mn=268, η=7.3 cps)
BP4EA: 2,2-bis[4-{acryloxypolyethoxy}phenyl]propane (Mn=560, η=1,700 cps)
TPGDA: tripropylene glycol diacrylate (Mn=300, η=12 cps)
TMPT3EO: ethylene-oxide-modified trimethylopropane triacrylate
NK-ester A-TMPT-3EO supplied by Shin-Nakamura Chemical Industry Co., Ltd. (Mn=428, η=50 cps)
DPHA: dipentaerythritol hexaacrylate(Mn=578, η=5,000 cps)
UV-1700B: a linear urethane acrylate oligomer, supplied by Nippon Gosei Kagaku (Mn=2,000, η=22,500 cps)

Synthesis Example 1

Equimolar Adduct of Tolylene Diisocynate (TDI) with 4HBA

A 1,000 ml four-necked round-bottomed flask having a stirrer, a nitrogen introducing tube, a temperature sensor, a condenser and a dropping funnel charged with a mixture of 144 g of 4HBA and 144 g of ethyl acetate was charged with 174 g of TDI, 174 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 2

Equimolar Adduct of Isophorone Diisocynate (IPDA) with 4HBA

A 1,000 ml four-necked round-bottomed flask having a stirrer, a nitrogen introducing tube, a temperature sensor, a condenser and a dropping funnel charged with a mixture of 144 g of 4HBA and 144 g of ethyl acetate was charged with 222 g of IPDI, 220 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 3

Equimolar Adduct of TDI with HEA

A 1,000 ml four-necked round-bottomed flask having a stirrer, a nitrogen introducing tube, a temperature sensor, a condenser and a dropping funnel charged with a mixture of 116 g of HEA and 120 g of ethyl acetate was charged with 174 g of TDI, 174 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 4

Equimolar Adduct of IPDI with HEA

A 1,000 ml four-necked round-bottomed flask having a stirrer, a nitrogen introducing tube, a temperature sensor, a condenser and a dropping funnel charged with a mixture of 116 g of HEA and 120 g of ethyl acetate was charged with 222 g of IPDI, 220 g of ethyl acetate and 0.1 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 5

Equimolar Adduct of Hexamethylene Diisocynate (HMDI) with HEA

A 1,000 ml four-necked round-bottomed flask having a stirrer, a nitrogen introducing tube, a temperature sensor, a condenser and a dropping funnel charged with a mixture of 116 g of HEA and 120 g of ethyl acetate was charged with 168 g of HMDI, 170 g of ethyl acetate and 0.2 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 6

Equimolar Adduct of HMDI with 4HBA

A 1,000 ml four-necked round-bottomed flask having a stirrer, a nitrogen introducing tube, a temperature sensor, a condenser and a dropping funnel charged with a mixture of 144 g of 4HBA and 140 g of ethyl acetate was charged with 168 g of HMDI, 170 g of ethyl acetate and 0.1 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Synthesis Example 7

Equimolar Adduct of IPDI with PPD6A

A 1,000 ml four-necked round-bottomed flask having a stirrer, a nitrogen introducing tube, a temperature sensor, a condenser and a dropping funnel charged with a mixture of 204 g of PPG6A and 204 g of ethyl acetate was charged with 88 g of IPDI, 88 g of ethyl acetate and 0.1 g of tin 2-ethylhexanoate, and while the mixture in the flask was stirred under heat in a hot water bath at 50° C., the above mixture charged in the dropping funnel was dropwise added over 1 hour. The reaction was terminated when an NCO value by a titration method was found to be a theoretical value or lower.

Example 1

Synthesis of H8M8 (1/10 Mole Scale)

Figure 3:
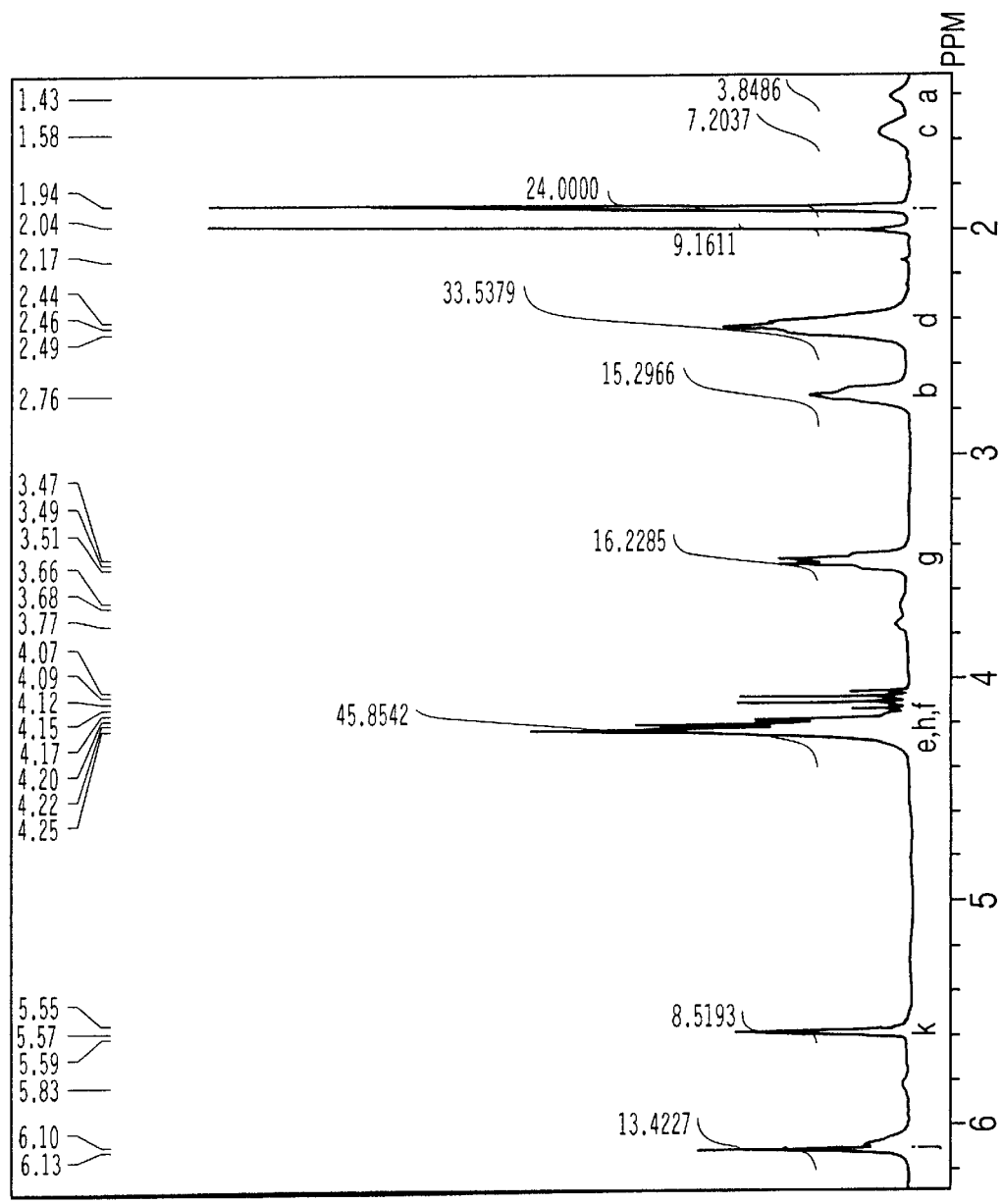
FIG. 3 is ¹H-NMR chart of a multi-branched compound obtained in Example 1.

A 1,000 ml four-necked round-bottomed flask having a stirrer, a nitrogen introducing tube, a temperature sensor and a condenser was charged with 31.6 g of DAB4, 92.8 g of HEA and 125 g of ethyl acetate, and the mixture in the flask was refluxed with a hot water bath at 75° C. for 3 hours. Then, part of the reaction mixture was sampled and measured for $^1$H-NMR. It was confirmed that a proton peak originated from an acryl group had almost disappeared. Then, the hot water bath temperature was decreased to 60° C., and a mixture containing 118 g of MOI and 120 g of ethyl acetate was added. Further, after 10 to 30 minites, 0.6 g of tin 2-ethylhexanoate was added. The mixture was continuously stirred for 3 to 4 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a multi-branched compound as an end product. FIG. 3 shows the $^1$H-NMR chart of the multi-branched compound, and its assignment is shown below. Table 1 also shows the physical property values thereof.

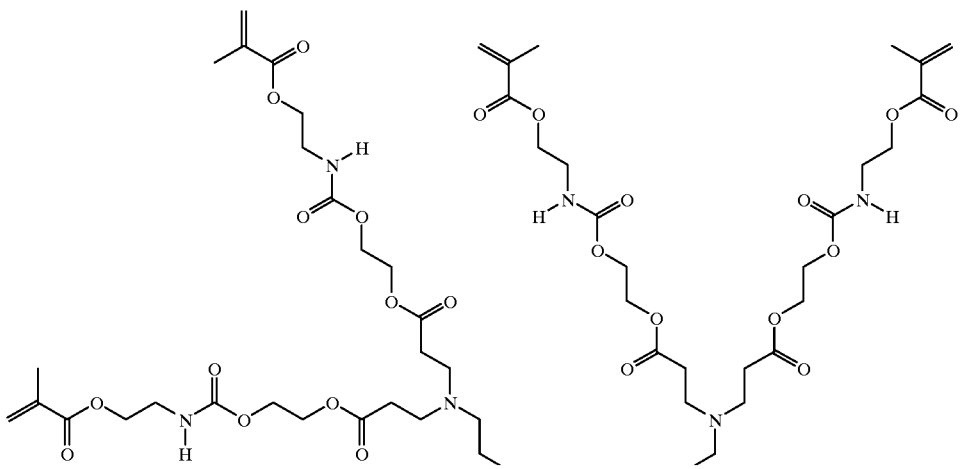

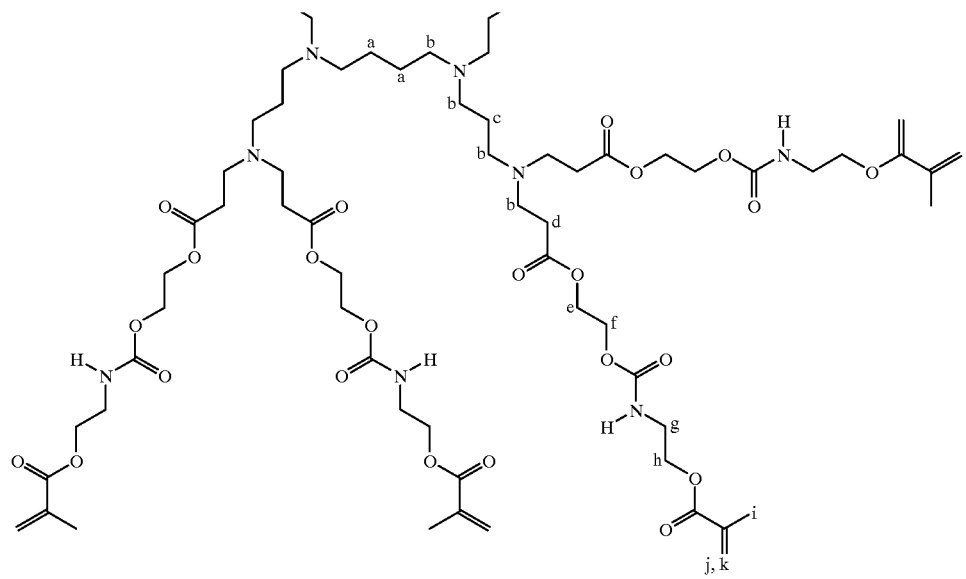

Example 2

Synthesis of B8M8 (1/10 Mole Scale)

Figure 4:
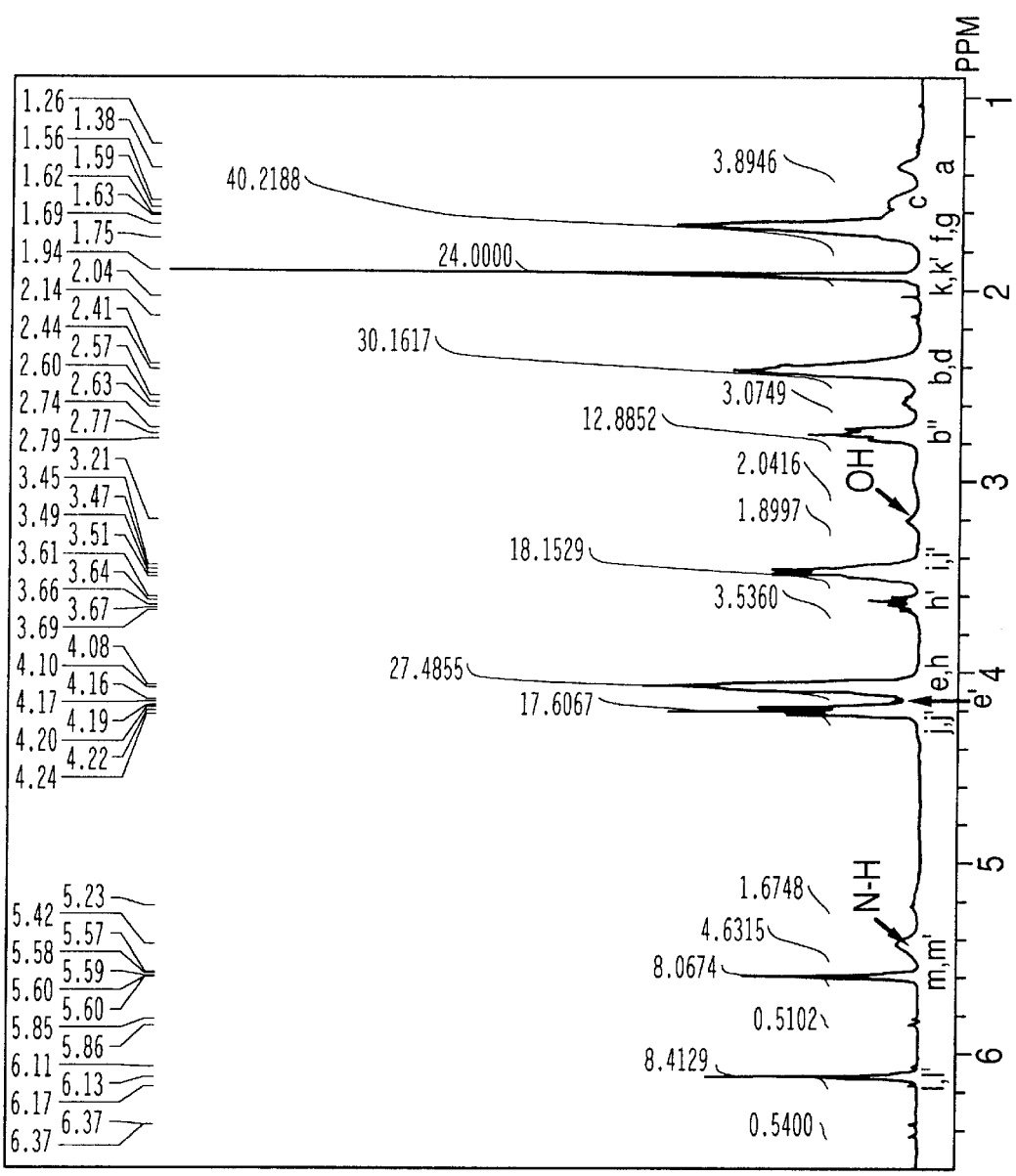
FIG. 4 is ¹H-NMR chart of a multi-branched compound obtained in Example 2.

A 500 ml four-necked round-bottomed flask having a stirrer, a nitrogen introducing tube, a temperature sensor and a condenser was charged with 31.6 g of DAB4, 115 g of 4HBA, 63 g of ethyl acetate and 30 g of methanol, and the mixture was refluxed with a hot water bath at 75° C. for 3 hours. Then, part of the reaction mixture was sampled and measured for $^1$H-NMR. It was confirmed that a proton peak originated from an acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 98%). Then, while the temperature of the hot water bath was kept at 70° C., 115 g of MOI and 260 g of ethyl acetate were added, and further, after 10 minutes, 0.6 g of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a multi-branched compound as an end product. FIG. 4 shows the $^1$H-NMR chart of the multi-branched compound, and its assignment is shown below. Table 1 also shows the physical property values thereof.

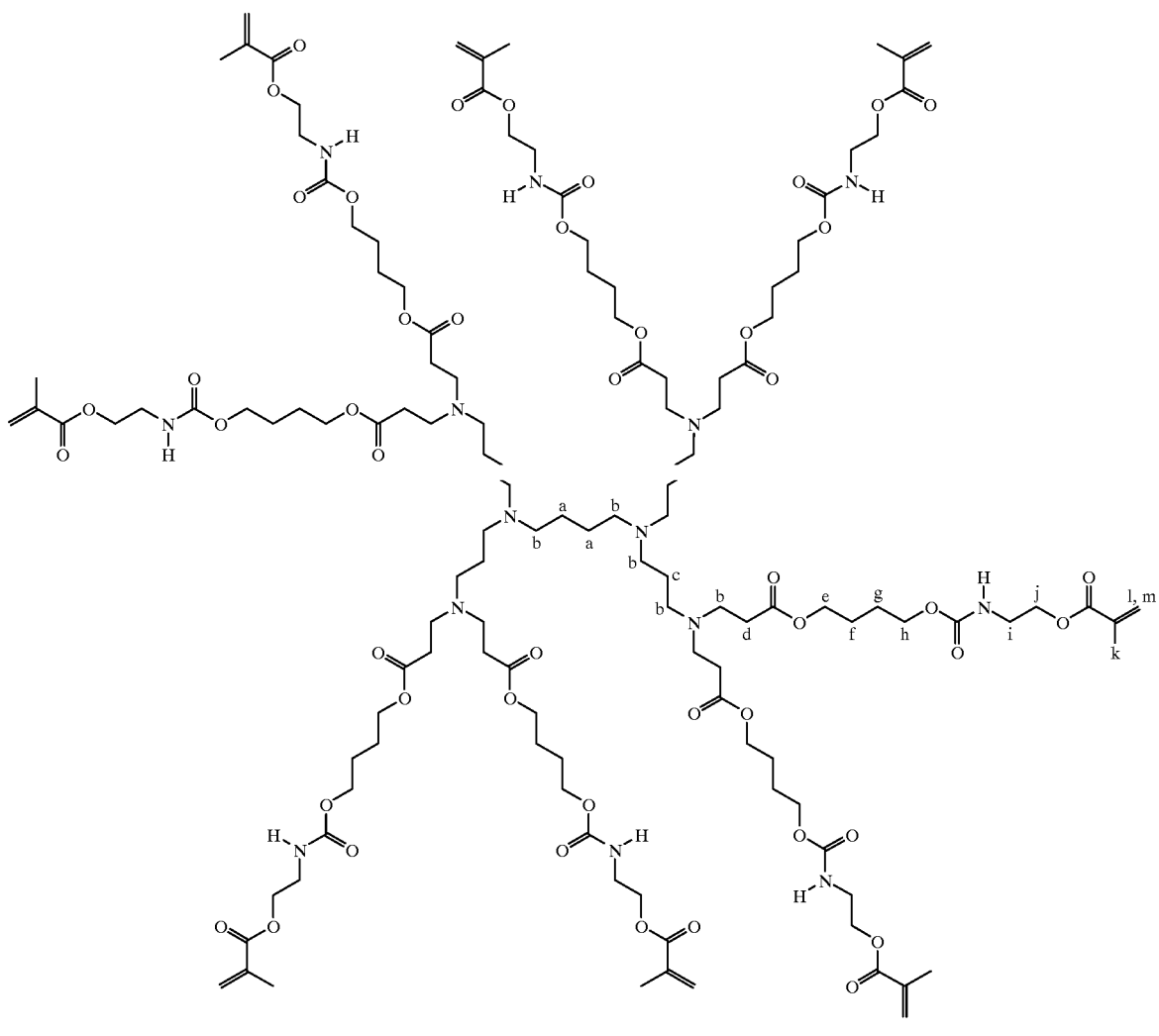
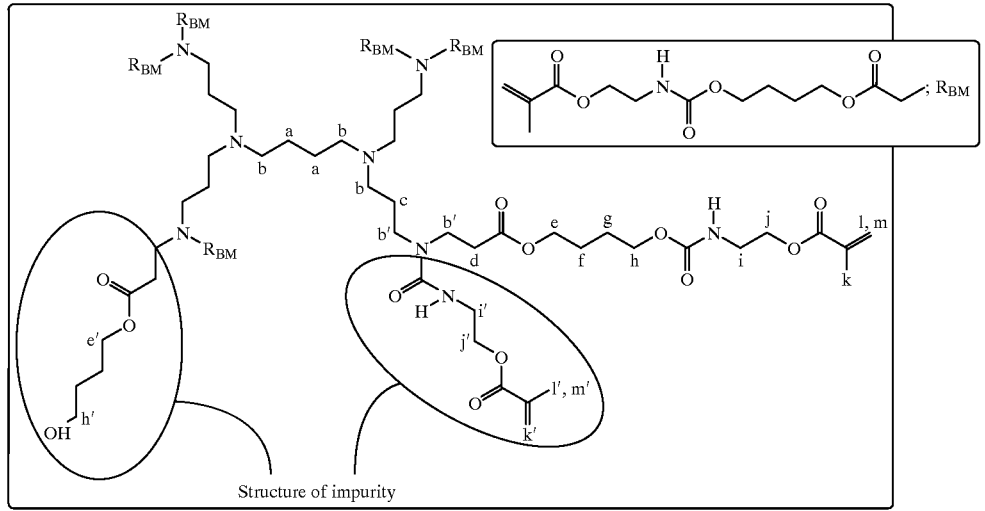
Structure of impurity

Example 3

Synthesis of B16M16 (1/20 Mole Scale)

Figure 5:
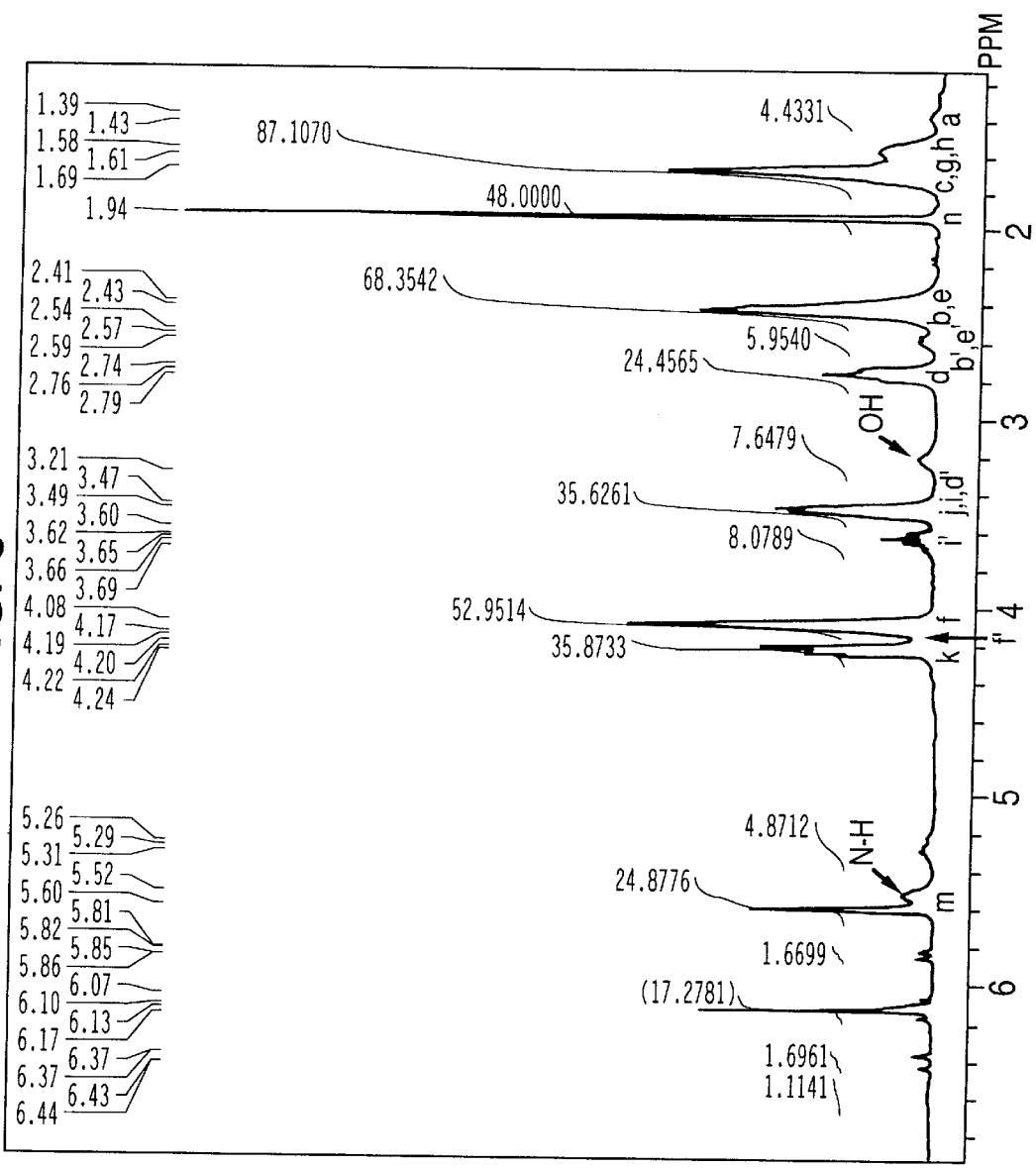
FIG. 5 is ¹H-NMR chart of a multi-branched compound obtained in Example 3.

A 500 ml four-necked round-bottomed flask having a stirrer, a nitrogen introducing tube, a temperature sensor and a condenser was charged with 36.65 g of DAB8, 115 g of 4HBA, 65 g of ethyl acetate and 30 g of methanol, and the mixture was refluxed in a hot water bath at 75° C. for 3 hours. Then, part of the reaction mixture was sampled and measured for $^1$H-NMR. It was confirmed that a proton peak originated from an acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 97%). Then, while the temperature of the hot water bath was kept at 70° C., 114 g of MOI and 265 g of ethyl acetate were added, and further, after 10 minutes, 0.6 g of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a multi-branched compound as an end product. FIG. 5 shows the $^1$H-NMR chart of the multi-branched compound, and its assignment is shown below. Table 1 also shows the physical property values thereof.

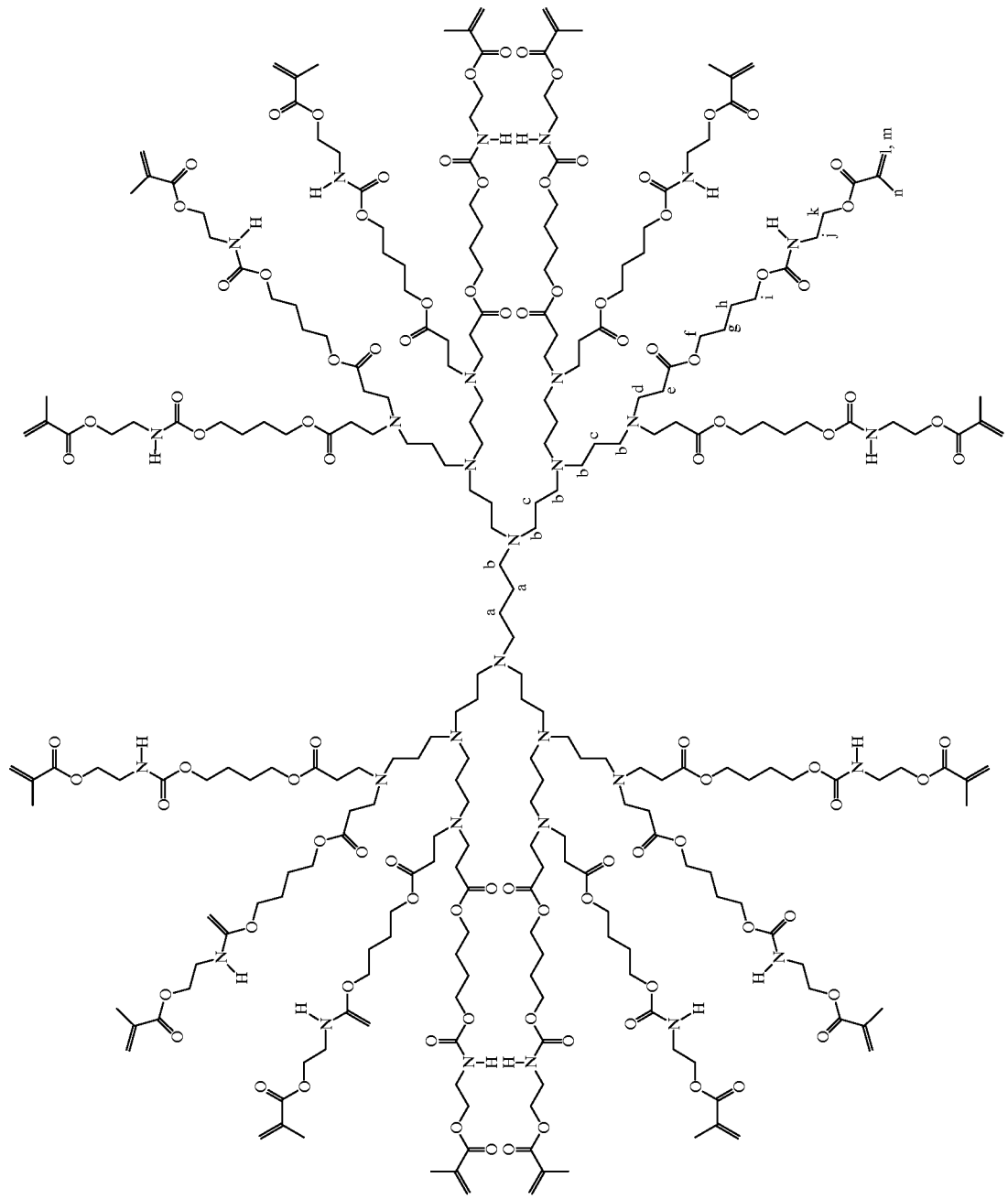

-continued
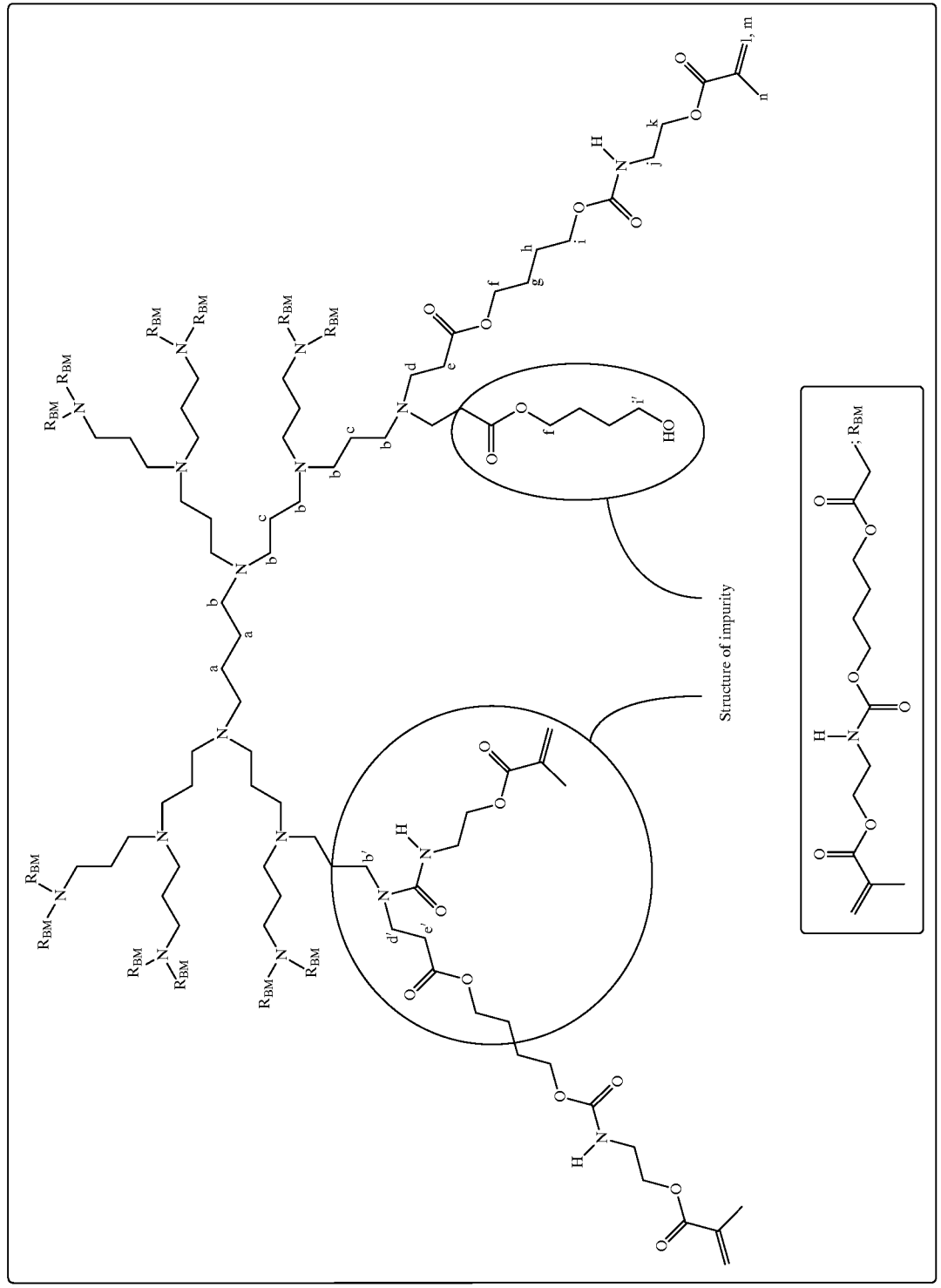

Example 4

Synthesis of P8M8 (1/10 Mole Scale)

Figure 6:
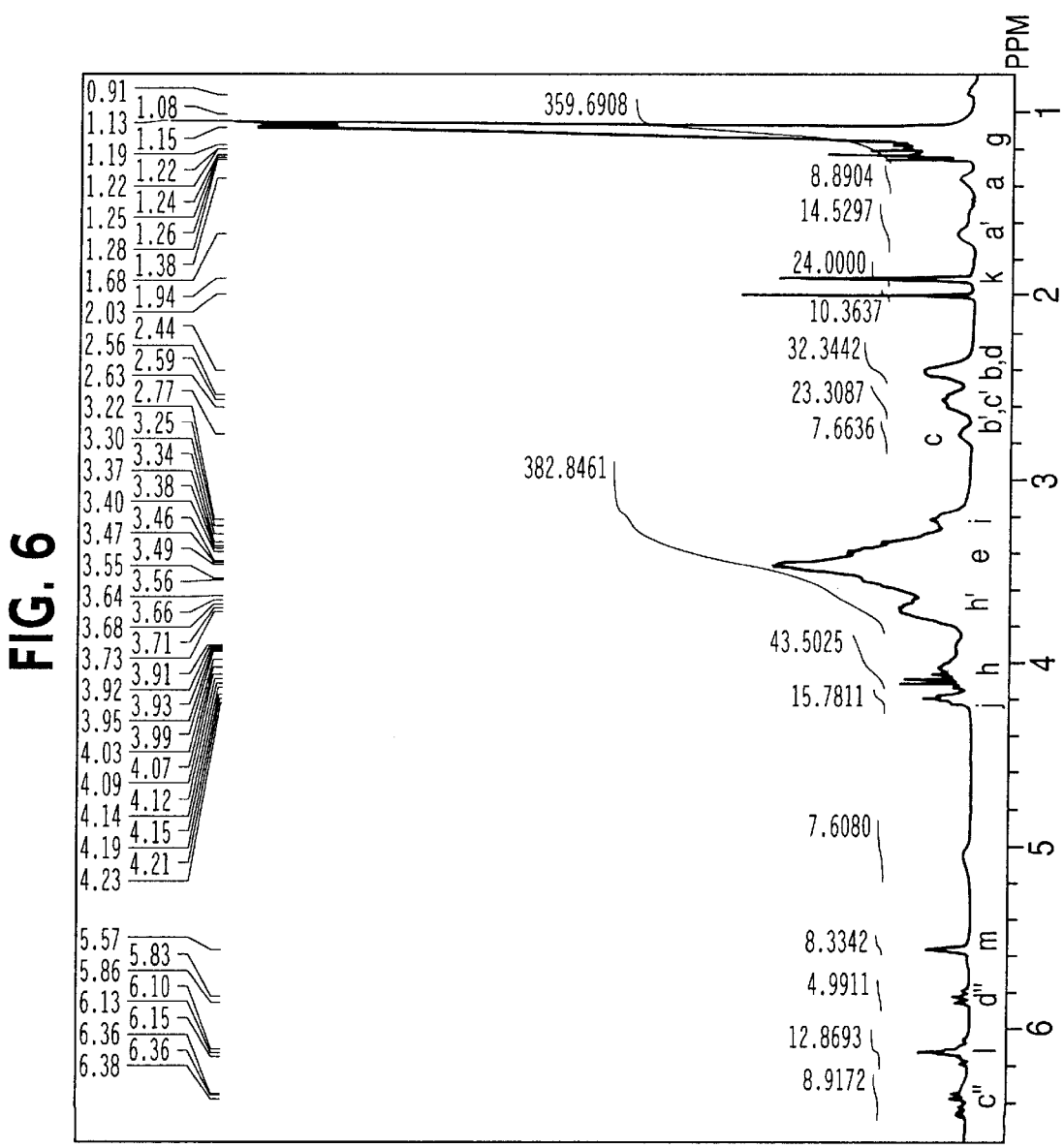
FIG. 6 is ¹H-NMR chart of a multi-branched compound obtained in Example 4.

A 500 ml four-necked round-bottomed flask having a stirrer, a nitrogen introducing tube, a temperature sensor and a condenser was charged with 31.6 g of DAB4, 382 g of PPG6A, 178 g of ethyl acetate and 30 g of methanol, and the mixture was refluxed in a hot water bath at 75° C. for 4 hours. Then, part of the reaction mixture was sampled and measured for $^1$H-NMR. It was confirmed that a proton peak originated from an acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 98%). Then, while the temperature of the hot water bath was kept at 70° C., 115 g of MOI and 530 g of ethyl acetate were added, and further, after 10 minutes, 0.6 g of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a multi-branched compound as an end product. FIG. 6 shows the $^1$H-NMR chart of the multi-branched compound, and its assignment is shown below. Table 1 also shows the physical property values thereof.

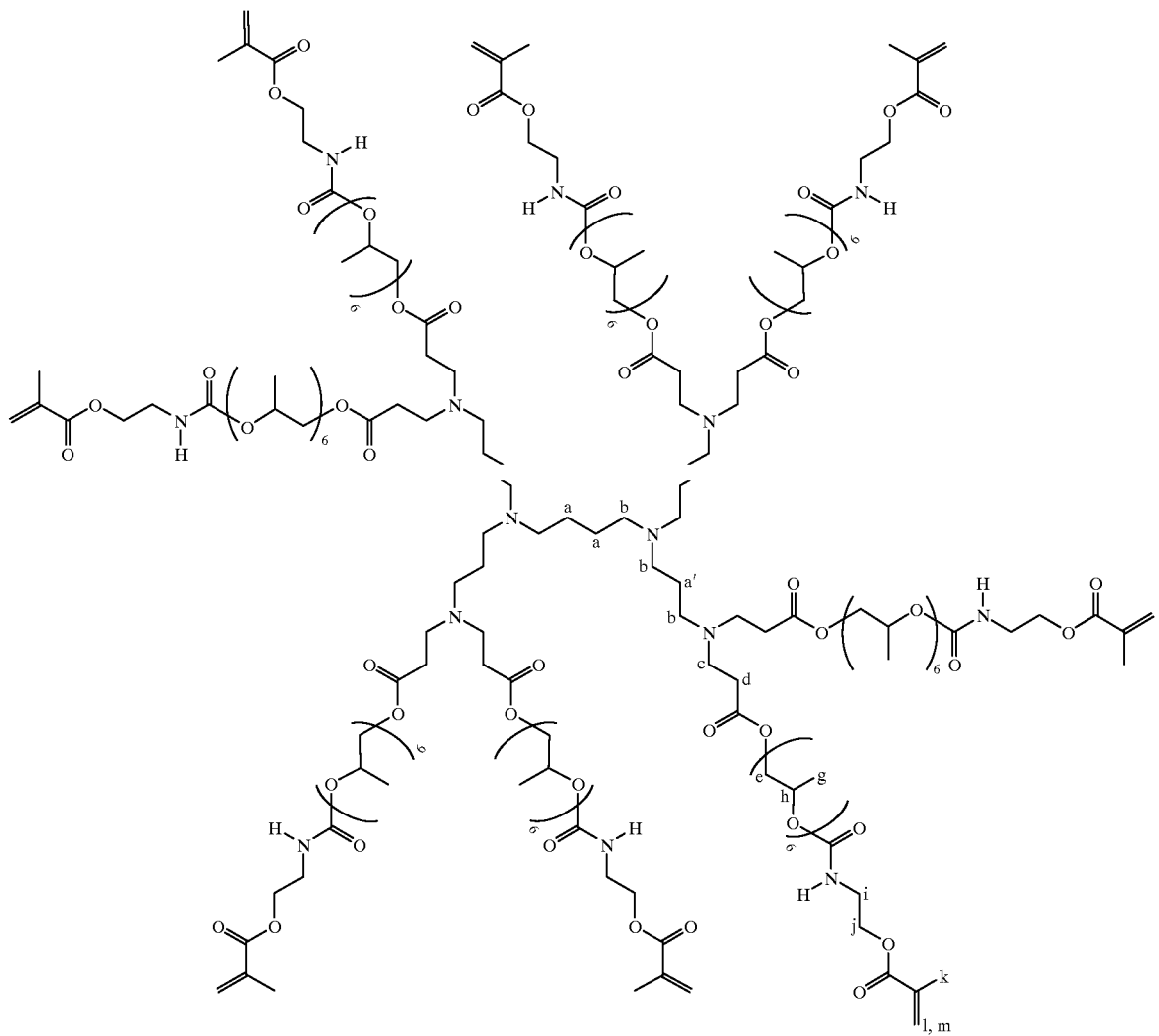

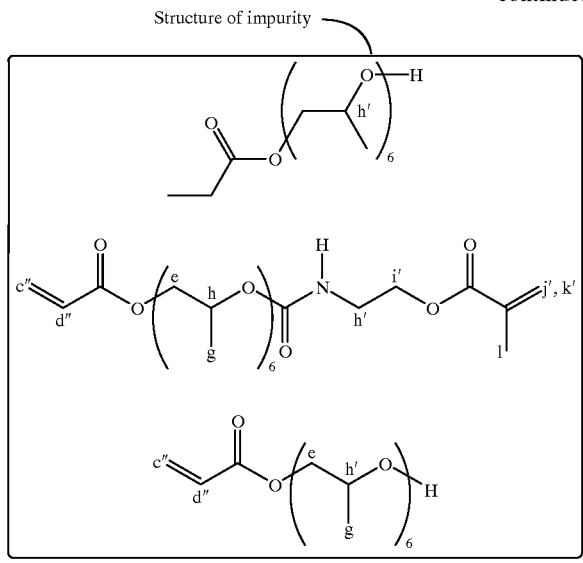

Structure of impurity

Example 5
Synthesis of P4B4M8 (1/10 Mole Scale)

Figure 7:
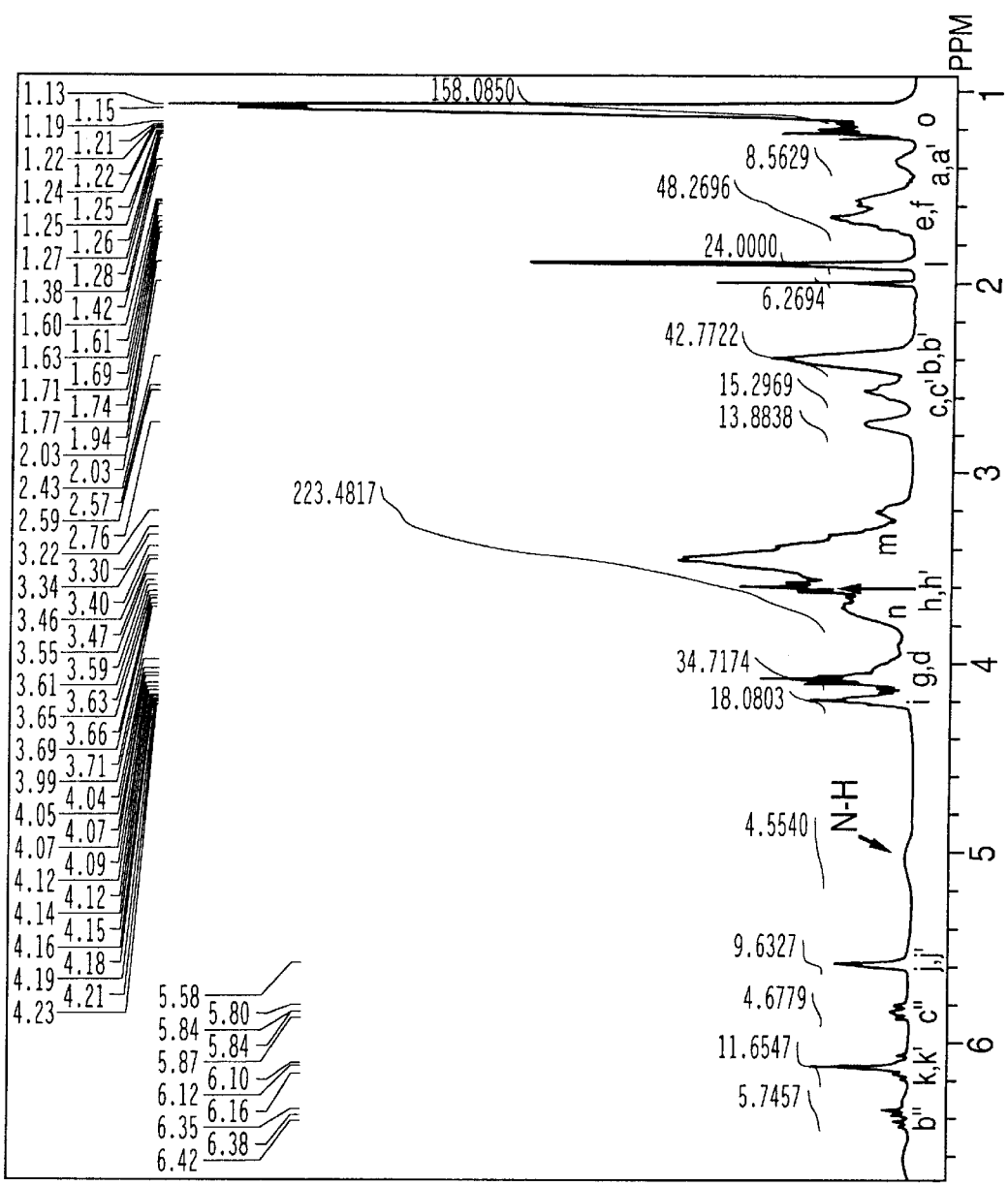
FIG. 7 is ¹H-NMR chart of a multi-branched compound obtained in Example 5.

A 500 ml four-necked round-bottomed flask having a stirrer, a nitrogen introducing tube, a temperature sensor and a condenser was charged with 31.6 g of DAB4, 57.5 g of 4HBA, 191 g of PPG6A, 120 g of ethyl acetate and 30 g of methanol, and the mixture was refluxed in a hot water bath at 75° C. for 4 hours. Then, part of the reaction mixture was sampled and measured for $^1$H-NMR. It was confirmed that a proton peak originated from an acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 98%). Then, while the temperature of the hot water bath was kept at 70° C., 115 g of MOI and 395 g of ethyl acetate were added, and further, after 10 minutes, 0.6 g of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a multi-branched compound as an end product. FIG. 7 shows the $^1$H-NMR chart of the multi-branched compound, and its assignment is shown below. Table 1 also shows the physical property values thereof.

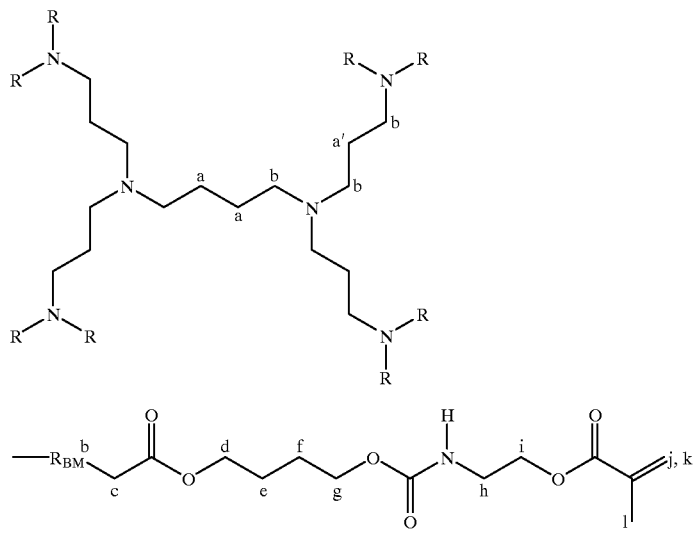

-continued

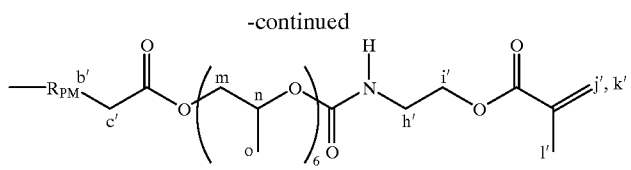

(——R is ——R$_{BM}$ or ——R$_{PM}$, ——R$_{BM}$:——R$_{PM}$ = 1:1 (mol ratio))

Structure of impurity

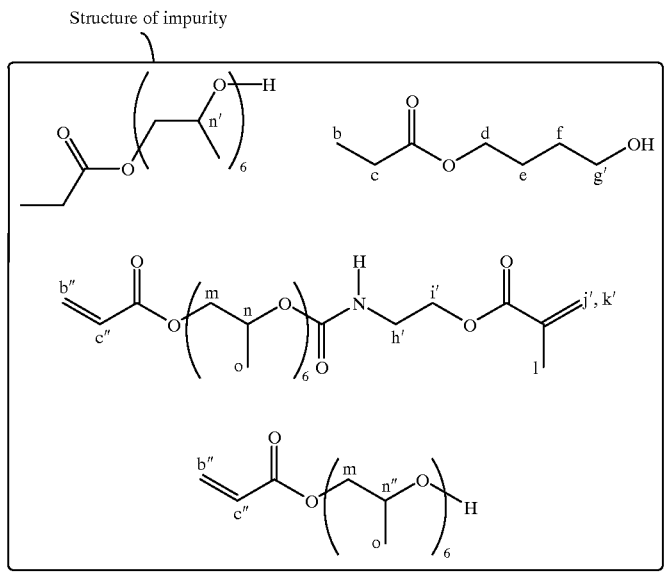

Examples 6–23

A 500 ml four-necked round-bottomed flask having a stirrer, a nitrogen introducing tube, a temperature sensor and a condenser was charged with a polyfunctional compound (a) shown in Table 1 and an equivalent weight of ethyl acetate, and a 75% by weight of an active-hydrogen-containing (meth)acrylate compound (a-1) and non-functional (meth)acrylate compound (b-1) in ethyl acetate was added with stirring.

In cases other than a case where HEA was used as an active-hydrogen-containing compound, methanol in an amount equimolar with the polyfunctional compound (a) was added. The mixture was refluxed in a hot water bath at 75° C. for 4 hours. Then, part of the reaction mixture was sampled and measured for $^1$H-NMR, and a termination point of the reaction was confirmed on the basis of a proton peak originated from an acryl group. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg in the hot water bath which was temperature-decreased to 70° C., to give a viscous liquid resin (yield 98%). Then, while the temperature of the hot water bath was kept at 70° C., ethyl acetate was newly added so as to be an activity of NV 50%, and an isocyanate-group-containing vinyl compound (c-1) was added in a molar amount equivalent to a total molar amount of the active-hydrogen-containing-(meth)acrylate compound (a-1) and the other non-functional (meth)acrylate compound (b-1). Further, the mixture was diluted with ethyl acetate such that the reaction system as a whole had a concentration of 50%. Further, after 10 minutes, 0.5% by weight, based on the isocyanate-group-containing vinyl compound (c-1), of tin 2-ethylhexanoate was added. The mixture was continuously stirred for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a multi-branched compound as an end product. Table 1 shows raw materials used for the synthesis of the multi-branched compound and the properties thereof. Further, for comparison, commercially available dipentaerythritol hexaacrylate (DHPA) and EO-modified pentaerythritol triacrylate (TMPT3EO, TMPT6EO) were evaluated in the same manner, and Table 1 also shows the results.

TABLE 1

|  | Composition of raw materials (a)/(a − 1)and/or/(b − 1)/(c − 1) (Molar ratio) | Number of vinyl groups | Purity (%) | Number average molecular weight (Mn) | Viscosity (30° C., 10−/s) (cps) |
|---|---|---|---|---|---|
| Ex. 1 | DAB4/HEA/MOI = 1/8/8 | 8 | 93 | 2,331 | 4,360 |
| Ex. 2 | DAB4/4HBA/MOI = 1/8/8 | 8 | 89 | 2,446 | 4,440 |
| Ex. 3 | DAB8/4HBA/MOI = 1/16/16 | 16 | 78 | 4,047 | 7,600 |
| Ex. 4 | DAB4/PPG6A/MOI = 1/8/8 | 8 | 70 | 4,146 | 620 |
| Ex. 5 | DAB4/(4HBA/PPG6A)/MOI = 1/(4/4)/8 | 8 | 75 | 3,206 | 1,320 |
| Ex. 6 | DAB8/PPG6A/MOI = 1/16/16 | 16 | 66 | 7,760 | 1,830 |
| Ex. 7 | DAB4/PEG7A/MOI = 1/8/8 | 8 | 68 | 3,747 | 780 |
| Ex. 8 | DAB4/PCL2A/MOI = 1/8/8 | 8 | 70 | 3,167 | 7,200 |
| Ex. 9 | DAB8/PCL2A/MOI = 1/16/16 | 16 | 65 | 5,868 | 6,500 |
| Ex. 10 | DAB8/4HBA/(TMI/MOI) = 1/16/(8/8) | 16 | 79 | 4,747 | 6,820 |
| Ex. 11 | DAB4/HEA/(SyEx. 4) = 1/8/8 | 8 | 90 | 3,599 | 6,230 |
| Ex. 12 | DAB4/4HBA/(SyEx. 4) = 1/8/8 | 8 | 80 | 3,436 | 5,920 |
| Ex. 13 | DAB4/PPG6A/(SyEx. 4) = 1/8/8 | 8 | 73 | 5,412 | 1,520 |
| Ex. 14 | DAB4/(PPG6A/HEA)/ (SyEx. 4) = 1/(4/4)/8 | 8 | 78 | 4,496 | 4,320 |
| Ex. 15 | DAB4/(PPG6A/4HBA)/ (SyEx. 4) = 1/(2/6)/8 | 8 | 68 | 3,607 | 3,960 |
| Ex. 16 | DAB4/4HBA/(SyEx. 5) = 1/8/8 | 8 | 69 | 2,715 | 4,750 |
| Ex. 17 | DAB4/HEA/(SyEx. 6) = 1/8/8 | 8 | 86 | 3,277 | 3,970 |
| Ex. 18 | DAB4/PPG6A/(SyEx. 1) = 1/8/8 | 8 | 67 | 4,923 | 3,260 |
| Ex. 19 | DAB4/PCL2A/(SyEx. 2) = 1/8/8 | 8 | 65 | 4,146 | 7,930 |
| Ex. 20 | DAB4/PPG6A/(SyEx. 3) = 1/8/8 | 8 | 63 | 4,527 | 6,890 |
| Ex. 21 | DAB8/HEA/(SyEx. 6) = 1/16/16 | 16 | 86 | 6,614 | 6,880 |
| Ex. 22 | DAB8/PCL2A/(SyEx. 4) = 1/16/16 | 16 | 74 | 8,824 | 9,650 |
| Ex. 23 | DAB8/4HBA/(SyEx. 4) = 1/16/16 | 16 | 80 | 6,268 | 1,030 |
| Comparative data |  |  |  |  |  |
| DPHA |  | 6 |  | 550 | 5,900 |
| TMPT3EO |  | 3 |  | 430 | 60 |
| TMPT6EO |  | 3 |  | 560 | 75 |

SyEx. = Synthesis Example

Examples 24–46

The multi-branched compounds obtained in Examples 1 to 23 were applied to four kinds of film (substrate size for evaluation; thickness=20 μm, width=5 cm, length=20 cm) with a #6 bar coater, and the resultant coatings were irradiated with electron beam at various doses (5, 20 and 40 kGy). Table 2 shows the used multi-branched compounds, and results of evaluations of curing properties (finger touch test→X=tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated by observation of deformation of substrate film, ○=free of curling, Δ=edges bending, X=film underwent curling) and abrasion resistance of the coatings obtained by the irradiation with electron beam. For reference, Table 2 also shows the evaluation results of commercially available dipentaerythritol and EO-modified pentaerythritol triacrylates (TMPT3EO, TMPT6EO).

TABLE 2

| Ex. | Composition of raw materials (a)/(a − 1)and/or/(b − 1)/(c − 1) (Molar ratio) | Curability DOSE (KGy) 5 | 20 | Adhesion to to substrate DOSE: 20 KGy PE | OPP | NY | PET | AA (%) Substrate: PET, DOSE: 20 KGy | BB | CC |
|---|---|---|---|---|---|---|---|---|---|---|
| Ex. 24 | DAB4/HEA/MOI = 1/8/8 | ○ | ○ | ○ | Δ | Δ | ○ | 100 | Δ | Δ |
| Ex. 25 | DAB4/4HBA/MOI = 1/8/8 | ○ | ○ | ○ | ○ | ○ | ○ | 100 | ○ | ○ |
| Ex. 26 | DAB8/4HBA/MOI = 1/16/16 | ○ | ○ | ○ | ○ | ○ | ○ | 100 | ○ | ○ |
| Ex. 27 | DAB4/PPG6A/MOI = 1/8/8 | Δ | ○ | ○ | ○ | ○ | Δ | 96 | ○ | Δ |
| Ex. 28 | DAB4/(4HBA/PPG6A)/MOI = 1/(4/4)/8 | ○ | ○ | ○ | ○ | ○ | ○ | 97 | ○ | ○ |
| Ex. 29 | DAB8/PPG6A/MOI = 1/16/16 | Δ | ○ | ○ | ○ | ○ | Δ | 97 | ○ | Δ |
| Ex. 30 | DAB4/PEG7A/MOI = 1/8/8 | Δ | ○ | ○ | ○ | ○ | ○ | 98 | ○ | Δ |
| Ex. 31 | DAB4/PCL2A/MOI = 1/8/8/8 | ○ | ○ | ○ | ○ | ○ | ○ | 98 | ○ | ○ |
| Ex. 32 | DAB8/PCL2A/MOI = 1/16/16 | ○ | ○ | ○ | ○ | ○ | ○ | 98 | ○ | ○ |
| Ex. 33 | DAB8/4HBA/(TMI/MOI) = 1/16/(8/8) | Δ | ○ | ○ | ○ | Δ | ○ | 90 | ○ | Δ |
| Ex. 34 | DAB4/HEA/(SyEx. 4) = 1/8/8 | ○ | ○ | ○ | ○ | Δ | ○ | 100 | ○ | ○ |
| Ex. 35 | DAB4/4HBA/(SyEx. 4) = 1/8/8 | ○ | ○ | ○ | ○ | Δ | ○ | 100 | ○ | ○ |
| Ex. 36 | DAB4/PPG6A/(SyEx. 4) = 1/8/8 | ○ | ○ | ○ | ○ | ○ | ○ | 98 | ○ | Δ |
| Ex. 37 | DAB4/(PPG6A/HEA)/(SyEx. 4) = 1/(4/4)/8 | ○ | ○ | ○ | ○ | ○ | ○ | 98 | ○ | Δ |
| Ex. 38 | DAB4/(PPG6A/4HBA)/(SyEx. 4) = 1/(2/6)/8 | ○ | ○ | ○ | ○ | ○ | ○ | 97 | ○ | ○ |
| Ex. 39 | DAB4/4HBA/(SyEx. 5) = 1/8/8 | ○ | ○ | ○ | ○ | ○ | ○ | 100 | ○ | ○ |
| Ex. 40 | DAB4/HEA/(SyEx. 6) = 1/8/8 | ○ | ○ | ○ | ○ | ○ | ○ | 100 | ○ | ○ |
| Ex. 41 | DAB4/PPG6A/(SyEx. 1) = 1/8/8 | ○ | ○ | ○ | ○ | ○ | ○ | 97 | ○ | Δ |
| Ex. 42 | DAB4/PCL2A/(SyEx. 2) = 1/8/8 | ○ | ○ | ○ | ○ | ○ | ○ | 98 | ○ | ○ |
| Ex. 43 | DAB4/PPG6A/(SyEx. 3) = 1/8/8 | ○ | ○ | ○ | ○ | ○ | ○ | 95 | ○ | Δ |
| Ex. 44 | DAB8/HEA/(SyEx. 6) = 1/16/16 | ○ | ○ | ○ | ○ | ○ | ○ | 99 | ○ | ○ |
| Ex. 45 | DAB8/PCL2A/(SyEx. 4) = 1/16/16 | ○ | ○ | ○ | ○ | ○ | ○ | 97 | ○ | ○ |
| Ex. 46 | DAB8/4HBA/(SyEx. 4) = 1/16/16 | ○ | ○ | ○ | ○ | Δ | ○ | 100 | ○ | ○ |
| C. Ex. | | | | | | | | | | |
| DPHA | | ○ | ○ | Δ | X | X | X | 100 | X | ○ |
| TMPT3EO | | ○ | ○ | X | ○ | X | ○ | 100 | X | ○ |
| TMPT6EO | | ○ | ○ | X | X | X | ○ | 98 | Δ | Δ |

AA: Solvent resistance, BB: Curl resistance CC: Abrasion resistance

Example 47

Synthesis of DAB4-H8M4 (1/10 Mole Scale)

A 1,000 ml four-necked round-bottomed flask having a stirrer, a nitrogen introducing tube, a temperature sensor and a condenser was charged with 31.6 g of DAB4, 92.8 g of HEA and 125 g of ethyl acetate, and placed in a hot water bath set at 75° C. for 3 hours to reflux a mixture, and part of a reaction mixture was sampled and measured for $^1$H-NMR. It was confirmed that a proton peak originated from acryl group had almost disappeared. Then, the temperature of the hot water bath was decreased to 60° C., and 62.1 g of MOI and 63 g of ethyl acetate were added. Further, after 10 to 30 minutes, 0.3 g of tin 2-ethylhexanonate was added. The mixture was continuously stirred for 3 to 4 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Example 48

Synthesis of DAB4-B8M4 (1/10 Mole Scale)

A 500 ml four-necked round-bottomed flask having a stirrer, a nitrogen introducing tube, a temperature sensor and a condenser was charged with 31.6 g of DAB4, 115 g of 4HBA, 63 g of ethyl acetate and 30 g of methanol and placed in a hot water bath set at 75° C. for 3 hours to reflux a mixture, and part of a reaction mixture was sampled and measured for $^1$H-NMR. It was confirmed that a proton peak originated from acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg or lower in the hot water bath which was temperature-decreased to 70° C., to give a viscous liquid resin (yield 98%). Then, while the temperature of the hot water bath was kept at 70° C., 60.9 g of MOI and 210 g of ethyl acetate were added, and further, after 10 minutes, 0.3 g of tin 2-ethylhexanoate was added. The mixture was continuously stirred under heat for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Example 49

Synthesis of DAB4-P4B4M4 (1/10 Mole Scale)

A 500 ml four-necked round-bottomed flask having a stirrer, a nitrogen introducing tube, a temperature sensor and a condenser was charged with 31.6 g of DAB4, 57.5 g of 4HBA, 191 g of PPG6A, 120 g of ethyl acetate and 30 g of methanol and placed in a hot water bath set at 75° C. for 4 hours to reflux a mixture, and part of a reaction mixture was sampled and measured for $^1$H-NMR. It was confirmed that a proton peak originated from acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg or lower in the hot water bath which was temperature-decreased to 70° C., to give a viscous liquid resin (yield 98%). Then, while the temperature of the hot water bath was kept at 70° C., 60.9 g of MOI and 345 g of ethyl acetate were added, and further, after 10 minutes, 0.3 g of tin 2-ethylhexanoate was added. The mixture was continuously stirred under heat for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Example 50

Synthesis of DAB4-P8M4 (1/10 Mole Scale)

A 500 ml four-necked round-bottomed flask having a stirrer, a nitrogen introducing tube, a temperature sensor and a condenser was charged with 31.6 g of DAB4, 382 g of PPG6A, 178 g of ethyl acetate and 30 g of methanol and placed in a hot water bath set at 75° C. for 4 hours to reflux a mixture, and part of a reaction mixture was sampled and measured for $^1$H-NMR. It was confirmed that a proton peak originated from acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg or lower in the hot water bath which was temperature-decreased to 70° C., to give a viscous liquid resin (yield 98%). Then, while the temperature of the hot water bath was kept at 70° C., 60.9 g of MOI and 480 g of ethyl acetate were added, and further, after 10 minutes, 0.3 g of tin 2-ethylhexanoate was added. The mixture was continuously stirred under heat for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Example 51

Synthesis of DAB8-B16M8 (1/20 Mole Scale)

A 500 ml four-necked round-bottomed flask having a stirrer, a nitrogen introducing tube, a temperature sensor and a condenser was charged with 36.7 g of DAB8, 115 g of 4HBA, 65 g of ethyl acetate and 30 g of methanol and placed in a hot water bath set at 75° C. for 3 hours to reflux a mixture, and part of a reaction mixture was sampled and measured for $^1$H-NMR. It was confirmed that a proton peak originated from acryl group had almost disappeared. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg or lower in the hot water bath which was temperature-decreased to 70° C., to give a viscous liquid resin (yield 97%). Then, while the temperature of the hot water bath was kept at 70° C., 60.2 g of MOI and 215 g of ethyl acetate were added, and further, after 10 minutes, 0.3 g of tin 2-ethylhexanoate was added. The mixture was continuously stirred under heat for 4 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Example 52

Synthesis of DAB4-B4G4 (1/10 Mole Scale)

A 500 ml four-necked round-bottomed flask having a stirrer, a nitrogen introducing tube, a temperature sensor and a condenser was charged with 31.6 g of DAB4, 85.7 g of G201P, 57.7 g of 4HBA, 87 g of ethyl acetate and 30 g of methanol and placed in a hot water bath set at 75° C. for 5 hours to reflux a mixture, and part of a reaction mixture was sampled and measured for $^1$H-NMR. It was confirmed that a proton peak originated from acryl group had almost disappeared. Further, the ethyl acetate used as a solvent was removed with an evaporator, to give a vinyl-group-containing dendrimer as an end product.

Example 53

Synthesis of MNP12-M6 (1/20 Mole Scale)

A 500 ml four-necked round-bottomed flask having a stirrer, a nitrogen introducing tube, a temperature sensor and a condenser was charged with 60.8 g of MNP12, 46.5 g of MOI and 108 g of ethyl acetate, and a mixture was stirred at a hot water bath temperature of 70° C. Further, after 10 minutes, 0.22 g of tin 2-ethylhexanoate was added. A mixture was continuously stirred for 3 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Examples 54–65

A four-necked round-bottomed flask having a stirrer, a nitrogen introducing tube, a temperature sensor and a condenser was charged with a polyfunctional compound (a) shown in Table 3 and an equivalent weight of ethyl acetate, and a solution of 75% by weight of an active-hydrogen-containing (meth)acrylate compound (a-1) in ethyl acetate was added with stirring. In cases other than a case where HEA is used as a active-hydrogen-containing (meth)acrylate compound (a-1), further, methanol in a molar amount equivalent to that of the polyfunctional compound (a) was added. The thus-prepared mixture was refluxed with a hot water bath at 75° C. for 4 hours, and part of a reaction mixture was sampled and measured for $^1$H-NMR to confirm the termination point of the reaction on the basis of a proton peak originated from acryl group. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg or lower in the hot water bath which was temperature-decreased to 70° C., to give a viscous liquid resin. Then, while the temperature of the hot water bath was kept at 70° C., ethyl acetate was newly added so as to be NV 50%, and an isocyanate-group-containing vinyl compound (c-1) was added in a molar amount equivalent a total molar amount of the (meth)acrylate compound (b). Further, the mixture was diluted with ethyl acetate such that the reaction system as a whole had a concentration of 50%. Further, after 10 minutes, 0.5% by weight, based on the isocyanate-group-containing vinyl compound (c), of tin 2-ethylhexanoate was added. The mixture was continuously stirred for 3 hours or more, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product. Table 3 shows the composition of raw materials used for the synthesis of the vinyl-group-containing dendrimer and the properties thereof. Further, for comparison, a dendrimer having no terminal functional group containing active hydrogen (Comparative Example 1), a commercially available linear urethane acrylate UV-1700B (Comparative Example 2) and dipentaerytyritol hexaacrylate (DHPA) (Comparative Example 3) were evaluated in the same manner, and Table 3 also shows the results.

TABLE 3

|  | Composition of raw materials (a)/(a − 1)/(c − 1) (Molar ratio) | Number of vinyl groups | purity % | Average Molecular weight (Mn) | Viscostiy (30° C., cps) |
|---|---|---|---|---|---|
| Ex. 47 | DAB4/HEA/MOI = 1/8/4 | 4 | 93 | 1,1773 | 2,510 |
| Ex. 48 | DAB4/4HBA/MOI = 1/8/4 | 4 | 90 | 1,879 | 1,550 |
| Ex. 49 | DAB4/(4HBA/PPG6A)MOI = 1/(4/4)/4 | 4 | 86 | 2,952 | 830 |
| Ex. 50 | DAB4/PPG6A/MOI = 1/8/4 | 4 | 75 | 3,582 | 420 |
| Ex. 51 | DAB8/4HBA/MOI = 1/16/8 | 8 | 81 | 3,497 | 2,750 |
| Ex. 52 | DAB4/4HBA/G2O1P = 1/4/4 | 4 | 83 | 1,451 | 2,360 |
| Ex. 53 | MNP12/—/MOI = 1/0/6 | 6 | 95 | 2,039 | 1,210 |
| Ex. 54 | DAB4/4HBA/MOI = 1/8/2 | 2 | 92 | 1,636 | 910 |
| Ex. 55 | DAB4/4HBA/MOI = 1/8/6 | 6 | 88 | 2,110 | 3,660 |
| Ex. 56 | DAB4/PEG7A/MOI = 1/8/4 | 4 | 72 | 3,093 | 1,120 |
| Ex. 57 | DAB4/PCL2A/MOI = 1/8/4 | 4 | 86 | 3,172 | 2,820 |
| Ex. 58 | DAB4/4HBA/(SyEx. 1) = 1/8/3 | 3 | 89 | 2,193 | 4,430 |
| Ex. 59 | DAB4/4HBA/(SyEx. 2) = 1/8/4 | 4 | 85 | 2,492 | 2,630 |
| Ex. 60 | DAB4/4HBA/(SyEx. 4) = 1/8/4 | 4 | 89 | 2,510 | 3,120 |
| Ex. 61 | DAB4/4HBA/(SyEx. 5) = 1/8/4 | 4 | 82 | 2,135 | 2,450 |
| Ex. 62 | DAB4/(HEA/4HBA/PCL1A)/MOI = 1/(2/3/3)/4 | 6 | 84 | 2,063 | 2,120 |
| Ex. 63 | DAB8/4HBA/MOI = 1/16/8 | 3 | 83 | 2,940 | 1,860 |
| Ex. 64 | DAB8/4HBA/MOI = 1/16/12 | 12 | 76 | 3,752 | 4,520 |
| Ex. 65 | DAB8/PPG6A/MOI = 1/16/4 | 8 | 70 | 6,785 | 1,050 |
| CEx. 1 | DAB4/HEA/MOI = 1/8/8 | 8 | 92 | 2,309 | 4,460 |
| CEx. 2 | Linear urethane acrylate UV-1700B | 2 | — | 2,000 | 22,500 |
| CEx. 3 | DPHA | 6 | — | 550 | 5,000 |

Ex. = Example, CEx. = Comparative Example

Examples 66–84

The vinyl-group-containing dendrimers obtained in Examples 66 to 84 were applied to four kinds of film (substrate size for evaluation; thickness=20 μm, width=5 cm, length=20 cm) with a #6 bar coater, and the resultant coatings were irradiated with electron beam at various doses (5, 20 and 40 kGy). Table 4 shows the used multi-branched compounds, and results of evaluations of curing properties (finger touch test→X=tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated by observation of deformation of substrate film, ○=free of curling, Δ=edges bending, X=film underwent curling) and abrasion resistance of the coatings obtained by the irradiation with electron beam. For reference, a dendrimer having no terminal functional group containing active hydrogen (Comparative Example 4), a commercially available linear urethane acrylate UV-1700B (Comparative Example 5) and dipentaerythritol hexaacrylate (DHPA) (Comparative Example 6) were evaluated in the same manner as above, and Table 4 also shows the results.

TABLE 4

| Ex. | Composition of raw materials (a)/(a − 1)/(c − 1) (Molar ratio) | Curability DOSE (KGy) 5 | 20 | Adhesion to substrate DOSE: 20 KGy PE | OPP | NY | PET | AA (%) Substrate: PET, DOSE: 20 KGy | BB | CC |
|---|---|---|---|---|---|---|---|---|---|---|
| Ex. 66 | DAB4/HEA/MOI = 1/8/4 | ○ | ○ | ○ | ○ | ○ | ○ | 98 | ○ | ○ |
| Ex. 67 | DAB4/4HBA/MOI = 1/8/4 | ○ | ○ | ○ | ○ | ○ | ○ | 96 | ○ | ○ |
| Ex. 68 | DAB4/(4HBA/PPG6A)MOI = 1/(4/4)/4 | ○ | ○ | ○ | ○ | ○ | ○ | 92 | ○ | ○ |
| Ex. 69 | DAB4/PPG6A/MOI = 1/8/4 | Δ | ○ | ○ | ○ | ○ | ○ | 90 | ○ | Δ |
| Ex. 70 | DAB8/4HBA/MOI = 1/16/8 | ○ | ○ | ○ | ○ | ○ | ○ | 88 | ○ | ○ |
| Ex. 71 | DAB4/4HBA/G201P = 1/4/4 | ○ | ○ | ○ | ○ | ○ | ○ | 90 | ○ | ○ |
| Ex. 72 | MNP12/—/MOI = 1/0/6 | ○ | ○ | ○ | ○ | ○ | ○ | 96 | ○ | ○ |
| Ex. 73 | DAB4/4HBA/MOI = 1/8/2 | Δ | ○ | ○ | ○ | ○ | ○ | 85 | ○ | Δ |
| Ex. 74 | DAB4/4HBA/MOI = 1/8/6 | ○ | ○ | ○ | Δ | Δ | ○ | 100 | ○ | ○ |
| Ex. 75 | DAB4/PEG7A/MOI = 1/8/4 | Δ | ○ | ○ | ○ | ○ | ○ | 88 | ○ | Δ |
| Ex. 76 | DAB4/PCL2A/MOI = 1/8/4 | ○ | ○ | ○ | ○ | ○ | ○ | 94 | ○ | ○ |
| Ex. 77 | DAB4/4HBA/(SyEx. 1) = 1/8/3 | ○ | ○ | ○ | ○ | ○ | ○ | 91 | ○ | ○ |
| Ex. 78 | DAB4/4HBA/(SyEx. 2) = 1/8/4 | ○ | ○ | ○ | ○ | ○ | ○ | 95 | ○ | ○ |
| Ex. 79 | DAB4/4HBA/(SyEx. 4) = 1/8/4 | ○ | ○ | ○ | ○ | ○ | ○ | 96 | ○ | ○ |
| Ex. 80 | DAB4/4HBA/(SyEx. 5) = 1/8/4 | ○ | ○ | ○ | ○ | ○ | ○ | 94 | ○ | ○ |
| Ex. 81 | DAB4/(HEA/4HBA/PCL1A)/MOI = 1/(2/3/3)/4 | ○ | ○ | ○ | Δ | Δ | ○ | 100 | ○ | ○ |
| Ex. 82 | DAB8/4HBA/MOI = 1/16/3 | Δ | ○ | ○ | ○ | ○ | ○ | 88 | ○ | Δ |
| Ex. 83 | DAB8/4HBA/MOI = 1/16/12 | ○ | ○ | ○ | Δ | Δ | ○ | 97 | ○ | ○ |
| Ex. 84 | DAB8/PPGGA/MOI = 1/16/8 | ○ | ○ | ○ | ○ | ○ | ○ | 92 | ○ | Δ |
| CEx. 4 | DAB4/HEA/MOI = 1/8/8 | ○ | ○ | ○ | Δ | Δ | ○ | 100 | Δ | Δ |
| CEx. 5 | Linear urethane acrylate UV-1700B | ○ | ○ | ○ | ○ | ○ | ○ | 97 | Δ | Δ |
| CEx. 6 | DPHA | ○ | ○ | X | X | X | X | 100 | X | X |

Ex. = Example, CEx. = Comparative Example
AA: Solvent resistance, BB = Curl resistance, CC: Abrasion = resistance

Examples 85–115

A curable composition was prepared from one of the vinyl-group-containing dendrimers (A) obtained in Examples 47 to 65 and a polymerizable unsaturated-group-containing compound (B), and Table 5 shows viscosity of each of the so-prepared curable compositions. Further, the above curable compositions were applied to four kinds of films (substrate size for evaluation; thickness=20 μm, width=5 cm, length=20 cm) with a #6 bar coater, and the resultant coatings were irradiated with electron beam at various doses (5, 20 and 40 kGy). Table 5 shows the used multi-branched compounds, and results of evaluations of curing properties (finger touch test→X=tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated on the basis of functional test of deformation of substrate film, ○=free of curling, Δ=edges bending, X=film underwent curling) and abrasion resistance of the coatings obtained by the irradiation with electron beam. For reference, a dendrimer having no terminal functional group containing active hydrogen (Comparative Example 7), a commercially available linear urethane acrylate UV-1700B (Comparative Example 8) and dipentaerythritol hexaacrylate (DHPA) (Comparative Example 9) were evaluated in the same manner as above, and Table 5 also shows the results.

continuously stirred under heat for 3 to 4 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Example 117
Synthesis of DAB4/HEA/LA/MOI (1/10 Mole Scale)

A 1,000 ml four-necked round-bottomed flask having a stirrer, a nitrogen introducing tube, a temperature sensor and a condenser was charged with 32 g of DAB4, 46 g of HEA,

TABLE 5

| Ex. | Composition ratio A/B (weight ratio) | Viscosity (cps) (30° C.) | Curability DOSE (KGy) 5 | 20 | Adhesion to substrate DOSE: 20 KGy PE | OPP | NY | PET | AA (%) Substrate: PET, DOSE: 20 KGy | BB | CC |
|---|---|---|---|---|---|---|---|---|---|---|---|
| Ex. 85 | Ex. 48/TPGDA = 1/9 | 20.3 | ○ | ○ | Δ | Δ | Δ | Δ | 91 | Δ | Δ |
| Ex. 86 | Ex. 48/TPGDA = 3/7 | 50.1 | ○ | ○ | ○ | ○ | ○ | ○ | 93 | ○ | ○ |
| Ex. 87 | Ex. 48/TPGDA = 5/5 | 127.0 | ○ | ○ | ○ | ○ | ○ | ○ | 96 | ○ | ○ |
| Ex. 88 | Ex. 48/TPGDA = 7/3 | 347.0 | ○ | ○ | ○ | ○ | ○ | ○ | 98 | ○ | ○ |
| Ex. 89 | Ex. 51/TPGDA = 3/7 | 60.6 | ○ | ○ | ○ | ○ | ○ | ○ | 94 | ○ | ○ |
| Ex. 90 | Ex. 51/TPGDA = 6/4 | 297.0 | ○ | ○ | ○ | ○ | ○ | ○ | 98 | ○ | ○ |
| Ex. 91 | Ex. 48/NODA = 7/3 | 33.7 | Δ | ○ | Δ | Δ | Δ | Δ | 86 | ○ | Δ |
| Ex. 92 | Ex. 48/NDOA = 7/3 | 301.0 | ○ | ○ | ○ | Δ | Δ | ○ | 91 | ○ | ○ |
| Ex. 93 | Ex. 48/TMPT3EO = 3/7 | 137.0 | ○ | ○ | ○ | ○ | ○ | ○ | 95 | ○ | ○ |
| Ex. 94 | Ex. 48/TMPT3EO = 7/3 | 528.0 | ○ | ○ | ○ | ○ | ○ | ○ | 97 | ○ | ○ |
| Ex. 95 | Ex. 48/DPHA = 3/7 | 3,488.0 | ○ | ○ | Δ | Δ | Δ | Δ | 99 | Δ | ○ |
| Ex. 96 | Ex. 48/DPHA = 7/3 | 2,123.0 | ○ | ○ | ○ | Δ | Δ | ○ | 100 | ○ | ○ |
| Ex. 97 | Ex. 48/DPHA/TPGDA = 3/3/4 | 304.0 | ○ | ○ | ○ | Δ | Δ | ○ | 97 | ○ | ○ |
| Ex. 98 | Ex. 48/BP4EA/TPGDA = 3/3/4 | 168.0 | ○ | ○ | ○ | ○ | ○ | ○ | 92 | ○ | ○ |
| Ex. 99 | Ex. 47/TPGDA = 3/7 | 58.2 | ○ | ○ | ○ | ○ | ○ | ○ | 95 | ○ | ○ |
| Ex. 100 | Ex. 49/TPGDA = 3/7 | 41.2 | ○ | ○ | ○ | ○ | ○ | ○ | 89 | ○ | ○ |
| Ex. 101 | Ex. 50/TPGDA = 3/7 | 34.1 | ○ | ○ | ○ | ○ | ○ | ○ | 87 | ○ | Δ |
| Ex. 102 | Ex. 51/TPGDA = 3/7 | 57.8 | ○ | ○ | ○ | ○ | ○ | ○ | 86 | ○ | ○ |
| Ex. 103 | Ex. 52/TPGDA = 3/7 | 47.2 | ○ | ○ | ○ | ○ | ○ | ○ | 93 | ○ | ○ |
| Ex. 104 | Ex. 53/TPGDA = 3/7 | 43.3 | ○ | ○ | ○ | ○ | ○ | ○ | 83 | ○ | Δ |
| Ex. 105 | Ex. 54/TPGDA = 3/7 | 65.8 | ○ | ○ | ○ | Δ | Δ | ○ | 98 | ○ | ○ |
| Ex. 106 | Ex. 55/TPGDA = 3/7 | 45.9 | ○ | ○ | ○ | ○ | ○ | ○ | 86 | ○ | Δ |
| Ex. 107 | Ex. 56/TPGDA = 3/7 | 60.9 | ○ | ○ | ○ | ○ | ○ | ○ | 91 | ○ | ○ |
| Ex. 108 | Ex. 57/TPGDA = 3/7 | 70.1 | ○ | ○ | ○ | ○ | ○ | ○ | 88 | ○ | ○ |
| Ex. 109 | Ex. 58/TPGDA = 3/7 | 59.5 | ○ | ○ | ○ | ○ | ○ | ○ | 92 | ○ | ○ |
| Ex. 110 | Ex. 59/TPGDA = 3/7 | 62.7 | ○ | ○ | ○ | ○ | ○ | ○ | 93 | ○ | ○ |
| Ex. 111 | Ex. 60/TPGDA = 3/7 | 58.6 | ○ | ○ | ○ | ○ | ○ | ○ | 92 | ○ | ○ |
| Ex. 112 | Ex. 61/TPGDA = 3/7 | 55.6 | ○ | ○ | ○ | Δ | Δ | ○ | 98 | ○ | ○ |
| Ex. 113 | Ex. 62/TPGDA = 3/7 | 53.8 | ○ | ○ | ○ | ○ | ○ | ○ | 86 | ○ | Δ |
| Ex. 114 | Ex. 63/TPGDA = 3/7 | 70.5 | ○ | ○ | ○ | Δ | Δ | ○ | 94 | ○ | ○ |
| Ex. 115 | Ex. 64/TPGDA = 3/7 | 44.3 | ○ | ○ | ○ | ○ | ○ | ○ | 90 | ○ | Δ |
| CEx. 7 | CEx. 1/TPGDA = 3/7 | 70.2 | ○ | ○ | ○ | Δ | Δ | ○ | 98 | Δ | Δ |
| CEx. 8 | CEx. 2/TPGDA = 3/7 | 343.0 | ○ | ○ | ○ | ○ | ○ | ○ | 95 | Δ | Δ |
| CEx. 9 | CEx. 3/TPGDA = 3/7 | 73.3 | ○ | ○ | X | X | X | X | 98 | X | X |

Ex. = Example, CEx. = Comparative Example
AA: Solvent resistance, BB = Curl resistance, CC: Abrasion resistance Example 116
Synthesis of DAB4/HEA/LA/MOI (1/10 Mole Scale)

A 1,000 ml four-necked round-bottomed flask having a stirrer, a nitrogen introducing tube, a temperature sensor and a condenser was charged with 32 g of DAB4, 23 g of HEA, 144 g of LA and 199 g of ethyl acetate and placed in a hot water bath set at 75° C. for 3 hours to reflux a mixture, and part of a reaction mixture was sampled and measured for $^1$H-NMR. It was confirmed that a proton peak originated from acryl group had almost disappeared. Then, the temperature of the hot water bath was decreased to 60° C., and a mixture containing 31 g of MOI and 31 g of ethyl acetate was added, and further, after 10 to 30 minutes, 0.02 g of tin 2-ethylhexanoate was added. The reaction mixture was 96 g of LA and 174 g of ethyl acetate and placed in a hot water bath set at 75° C. for 3 hours to reflux a mixture, and part of a reaction mixture was sampled and measured for $^1$H-NMR. It was confirmed that a proton peak originated from acryl group had almost disappeared. Then, the temperature of the hot water bath was decreased to 60° C., and a mixture containing 62 g of MOI and 62 g of ethyl acetate was added, and further, after 10 to 30 minutes, 0.03 g of tin 2-ethylhexanoate was added. The reaction mixture was continuously stirred under heat for 3 to 4 hours, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product.

Examples 118–138

A four-necked round-bottomed flask having a stirrer, a nitrogen introducing tube, a temperature sensor and a condenser was charged with a polyfunctional compound (a) shown in Table 6 and an equivalent weight of ethyl acetate, and a solution of 50% by weight of an active-hydrogen-containing (meth)acrylate compound (a-1) in ethyl acetate and a solution of 50% by weight of a non-functional (meth)acrylate compound (b-1) in ethyl acetate were added with stirring. In cases other than a case where HEA is used as a active-hydrogen-containing (meth)acrylate compound (a-1), further, methanol in a molar amount equivalent to that of the polyfunctional compound (a) was added. The thus-prepared mixture was refluxed with a hot water bath at 75° C. for 4 hours, and part of a reaction mixture was sampled and measured for $^1$H-NMR to confirm the termination point of the reaction on the basis of a proton peak originated from acryl group. Then, a fractionating column was set between the reactor and the condenser, and while the reaction mixture was heated and stirred in a hot water bath at 80° C. under atmospheric pressure, the solvent was distilled off. Further, a vacuum line was connected through a top portion of the condenser, and the ethyl acetate and methanol were completely distilled off by pressure-decreasing the reaction mixture to 40 mmHg or lower in the hot water bath which was temperature-decreased to 70° C., to give a viscous liquid resin. Then, while the temperature of the hot water bath was kept at 70° C., ethyl acetate was newly added so as to be NV 50%, and an isocyanate-group-containing vinyl compound (c-1) was added in a molar amount equivalent to a total molar amount of the (meth)acrylate compound (a-1) and the non-functional (meth)acrylate compound (b-1). Further, the mixture was diluted with ethyl acetate such that the reaction system as a whole had a concentration of 50%. Further, after 10 minutes, 0.5% by weight, based on the isocyanate-group-containing vinyl compound (c-1), of tin 2-ethylhexanoate was added. The mixture was continuously stirred for 3 hours or more, and a point of time when the NCO group characteristic absorption (2,270 cm$^{-1}$) in an IR chart disappeared was taken as a termination point of the reaction. Further, the ethyl acetate used as a solvent was removed with an evaporator, to give a vinyl-group-containing dendrimer as an end product. Table 6 shows the composition of raw materials used for the synthesis of the vinyl-group-containing dendrimer and the properties thereof. Further, Table 6 also shows measurement results of Comparative Example 10 (ED/HEA/MOI=1/4/4) and Comparative Example 11 (a commercially available linear urethane acrylate UV-1700B) which were evaluated in the same manner.

TABLE 6

| | Composition of raw materials a/a – 1/b – 1/c (Molar ratio) | Number of vinyl groups | purity % | Average Molecular weight (Mn) | Viscostiy (30° C., cps) |
|---|---|---|---|---|---|
| Ex. 116 | DAB4/HEA/LA/MOI = 1/2/6/2 | 2 | 94 | 2,180 | 1,340 |
| Ex. 117 | DAB4/HEA/LA/MOI = 1/4/4/4 | 4 | 95 | 2,259 | 2,460 |
| Ex. 118 | DAB4/4HBA/LA/MOI = 1/4/4/4 | 4 | 93 | 2,323 | 1,485 |
| Ex. 119 | DAB4/4HBA/LA/MOI = 1/6/2/6 | 6 | 94 | 2,456 | 2,890 |
| Ex. 120 | DAB4/HEA/LA/SyEx. 4 = 1/4/4/4 | 4 | 88 | 2,780 | 2,360 |
| Ex. 121 | DAB4/4HBA/LA/SyEx. 6 = 1/4/4/4 | 4 | 86 | 2,732 | 1,250 |
| Ex. 122 | DAB4/4HBA/LA/SyEx. 6 = 1/6/2/6 | 6 | 86 | 3,103 | 3,460 |
| Ex. 123 | DAB4/4HBA/MPEG9A/SyEx. 4 = 1/6/2/6 | 6 | 78 | 3,362 | 3,080 |
| Ex. 124 | DAB4/HEA/MPEG9A/SyEx. 6 = 1/6/2/6 | 6 | 85 | 3,337 | 3,900 |
| Ex. 125 | DAB4/LA/MOI = 1/6/2 | 2 | 94 | 1,954 | 1,510 |
| Ex. 126 | DAB4/PPG6A/BA/MOI = 1/4/4/4 | 4 | 86 | 2,774 | 430 |
| Ex. 127 | DAB4/PPG6A/EHA/SyEx. 7 = 1/5/3/5 | 5 | 76 | 5,317 | 490 |
| Ex. 128 | DAB4/BA/G201P = 1/6/2 | 2 | 98 | 1,488 | 1,990 |
| Ex. 129 | DAB4/HEA/BA/G201P = 1/4/4/2 | 2 | 96 | 1,666 | 2,140 |
| Ex. 130 | DAB4/PPG6A/LA/MOI = 1/6/2/6 | 6 | 76 | 3,369 | 2,880 |
| Ex. 131 | DAB4/HEA/BA/LA/MOI = 1/4/2/2/3 | 3 | 97 | 1,575 | 1,035 |
| Ex. 132 | DAB8/HEA/LA/MOI = 1/4/12/4 | 4 | 77 | 3,714 | 1,830 |
| Ex. 133 | DAB8/HEA/MPEG9A/MOI = 1/4/12/4 | 4 | 74 | 5,731 | 1,260 |
| Ex. 134 | DAB8/HEA/MPEG9A/MOI = 1/8/8/8 | 8 | 90 | 2,676 | 1,420 |

TABLE 6-continued

| | Composition of raw materials a/a – 1/b – 1/c (Molar ratio) | Number of vinyl groups | purity % | Average Molecular weight (Mn) | Viscostiy (30° C., cps) |
|---|---|---|---|---|---|
| Ex. 135 | DAB8/4HBA/BA/SyEx. 4 = 1/8/8/8 | 8 | 79 | 4,569 | 3,080 |
| Ex. 136 | DAB8/EHA/G201P = 1/8/8 | 8 | 81 | 3,249 | 2,300 |
| Ex. 137 | DAB8/PPG6A/MPEG9A/SyEx. 7 = 1/12/4/12 | 12 | 71 | 12,073 | 2,120 |
| Ex. 138 | DAB8/HEA/BA/LA/MOI = 1/8/4/4/6 | 6 | 91 | 2,668 | 1,823 |
| CEx. 10 | DAB4/HEA/MOI = 1/8/8 | 8 | 92 | 2,309 | 4,460 |
| CEx. 11 | Linear urethane acrylate UV-1700B | — | — | 2,000 | 22,500 |

Ex. = Example, SyEx. = Synthesis Example, CEx. = Comparative Example

Examples 139–161

The vinyl-group-containing dendrimers obtained in Examples 116 to 138 were applied to four kinds of films (substrate size for evaluation; thickness=20 μm, width=5 cm, length=20 cm) with a #6 bar coater, and the resultant coatings were irradiated with electron beam at various doses (5, 20 and 40 kGy). Table 7 shows the used multi-branched compounds, and results of evaluations of curing properties (finger touch test→X=tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated by observation of deformation of substrate film, ○=free of curling, Δ=edges bending, X=film underwent curling) and abrasion resistance of the coatings obtained by the irradiation with electron beam. For reference, a dendrimer having no terminal functional group containing active hydrogen (Comparative Example 12) and a commercially available linear urethane acrylate UV-1700B (Comparative Example 13) were evaluated in the same manner as above, and Table 7 also shows the results.

TABLE 7

| Ex. | Composition of raw materials a/a – 1/b – 1/c (Molar ratio) | Curability DOSE (KGy) | | Adhesion to substrate DOSE: 20 KGy | | | | AA (%) Substrate: PET, DOSE: 20 KGy | BB | CC |
|---|---|---|---|---|---|---|---|---|---|---|
| | | 5 | 20 | PE | OPP | NY | PET | | | |
| Ex. 139 | DAB4/HEA/LA/MOI = 1/2/6/2 | Δ | ○ | ○ | Δ | ○ | ○ | 96 | ○ | Δ |
| Ex. 140 | DAB4/HEA/LA/MOI = 1/4/4/4 | ○ | ○ | ○ | ○ | ○ | ○ | 96 | ○ | ○ |
| Ex. 141 | DAB4/4HBA/LA/MO = 1/4/4/4 | ○ | ○ | ○ | ○ | ○ | ○ | 93 | ○ | ○ |
| Ex. 142 | DAB4/4HBA/LA/MOI = 1/6/2/6 | ○ | ○ | ○ | ○ | ○ | ○ | 100 | ○ | ○ |
| Ex. 143 | DAB4/HEA/LA/SyEx. 4 = 1/4/4/4 | ○ | ○ | ○ | ○ | ○ | ○ | 97 | ○ | ○ |
| Ex. 144 | DAB4/4HBA/LA/SyEx. 6 = 1/4/4/4 | ○ | ○ | ○ | ○ | ○ | ○ | 98 | ○ | ○ |
| Ex. 145 | DAB4/4HBA/LA/SyEx. 6 = 1/6/2/6 | ○ | ○ | ○ | ○ | ○ | ○ | 100 | ○ | ○ |
| Ex. 146 | DAB4/4HBA/MFEG9A/SyEx. 4 = 1/6/2/6 | ○ | ○ | ○ | ○ | ○ | ○ | 94 | ○ | Δ |
| Ex. 147 | DAB4/HEA/MPEG9A/SyEx. 6 = 1/6/2/6 | ○ | ○ | ○ | ○ | Δ | ○ | 95 | ○ | ○ |
| Ex. 148 | DAB4/LA/MOI = 1/6/2 | Δ | ○ | ○ | ○ | ○ | Δ | 96 | ○ | Δ |
| Ex. 149 | DAB4/PPG6A/BA/MOI = 1/4/4/4 | Δ | ○ | ○ | Δ | Δ | ○ | 94 | ○ | Δ |
| Ex. 150 | DAB4/PPG6A/EHA/SyEx. 7 = 1/5/3/5 | ○ | ○ | ○ | Δ | ○ | ○ | 97 | ○ | ○ |
| Ex. 151 | DAB4/BA/G201P = 1/6/2 | Δ | ○ | ○ | Δ | ○ | ○ | 92 | ○ | Δ |
| Ex. 152 | DAB4/HEA/BA/G201P = 1/4/4/2 | Δ | ○ | ○ | ○ | ○ | ○ | 97 | ○ | Δ |
| Ex. 153 | DAB4/PPG6A/LA/MOI = 1/6/2/6 | ○ | ○ | ○ | Δ | Δ | ○ | 92 | Δ | Δ |
| Ex. 154 | DAB4/HEA/BA/LA/MOI = 1/4/2/2/3 | ○ | ○ | ○ | Δ | ○ | ○ | 94 | ○ | Δ |
| Ex. 155 | DAB8/HEA/LA/MOI = 1/4/12/4 | Δ | ○ | ○ | ○ | ○ | ○ | 95 | ○ | ○ |
| Ex. 156 | DAB8/HEA/MPEG9A/MOI = 1/4/12/4 | Δ | ○ | ○ | Δ | ○ | ○ | 96 | ○ | Δ |
| Ex. 157 | DAB8/HEA/MPEG9A/MOI = 1/8/8/8 | ○ | ○ | ○ | ○ | ○ | ○ | 94 | ○ | ○ |
| Ex. 158 | DAB8/4HBA/BA/SyEx. 4 = 1/8/8/8 | ○ | ○ | ○ | ○ | ○ | ○ | 100 | ○ | ○ |
| Ex. 159 | DAB8/EHA/G2O1P = 1/8/8 | Δ | ○ | ○ | ○ | ○ | ○ | 98 | ○ | Δ |
| Ex. 160 | DAB8/PPG6A/MPEG9A/SyEx. 7 = 1/12/4/12 | ○ | ○ | ○ | ○ | ○ | ○ | 100 | ○ | ○ |
| Ex. 161 | DAB8/HEA/BA/LA/MOI = 1/8/4/4/6 | ○ | ○ | ○ | ○ | ○ | ○ | 90 | ○ | ○ |
| CEx. 12 | DAB4/HEA/MOI = 1/8/8 | ○ | ○ | ○ | Δ | Δ | ○ | 100 | Δ | ○ |
| CEx. 13 | Linear urethane acrylate UV-1700B | ○ | ○ | ○ | Δ | ○ | ○ | 94 | Δ | Δ |

Ex. = Example, SyEX. = Synthesis Example, AA: Solvent resistance, BB = Curl resistance, CC: Abrasion resistance

Examples 162–191

A curable resin composition was prepared from one of the vinyl-group-containing dendrimers (A) obtained in Examples 116 to 138 and a polymerizable unsaturated-group-containing compound (B), and Table 8 shows viscosity of each of the so-prepared curable resin compositions. Further, the above curable resin compositions were applied to four kinds of films (substrate size for evaluation; thickness=20 μm, width=5 cm, length=20 cm) with a #6 bar coater, and the resultant coatings were irradiated with electron beam at various doses (5, 20 and 40 kGy). Table 9 shows the used multi-branched compounds, and results of evaluations of curing properties (finger touch test→X= tacking, Δ=no tacking but scratched with a finger nail, ○=no tacking and free of scratching with a finger nail), properties of adhesion to substrate (ratio of non-peeling in Cellophane tape peeling test), solvent resistance (remaining ratio determined on the basis of a change in weights before and after a rubbing test with MEK was carried out 50 times), curl resistance (evaluated by observation of deformation of substrate film, ○=free of curling, Δ=edges bending, X=film underwent curling) and abrasion resistance of the coatings obtained by the irradiation with electron beam. For reference, Tables 8 and 9 also show measurement results of Comparative Examples 14 and 15 (composition containing DAB4/HEA/MOI=1/8/8) and Comparative Examples 16 and 17 (composition containing linear urethane acrylate UV-1700B) which were evaluated in the same manner.

TABLE 8

|  | Dendrimer (A) | Compound (B) | A/B Weight ratio | Viscosity 30° C., 10-/s |
|---|---|---|---|---|
| Ex. 162 | Ex. 116 | TPGDA | 3/7 | 49.4 |
| Ex. 163 | Ex. 117 | PEG9DA | 3/7 | 128.3 |
| Ex. 164 | Ex. 117 | NODA | 3/7 | 41.8 |
| Ex. 165 | Ex. 117 | TPGDA | 3/7 | 59.3 |
| Ex. 166 | Ex. 117 | BP4EA | 3/7 | 1,899.3 |
| Ex. 167 | Ex. 117 | TMPT3EO | 3/7 | 160.9 |
| Ex. 168 | Ex. 117 | DPHA | 3/7 | 4,041.7 |
| Ex. 169 | Ex. 118 | TPGDA | 3/7 | 50.9 |
| Ex. 170 | Ex. 119 | TPGDA | 3/7 | 62.2 |
| Ex. 171 | Ex. 119 | TPGDA | 5/5 | 186.2 |
| Ex. 172 | Ex. 119 | TPGDA | 7/3 | 557.7 |
| Ex. 173 | Ex. 120 | TPGDA | 3/7 | 58.5 |
| Ex. 174 | Ex. 121 | TPGDA | 3/7 | 48.4 |
| Ex. 175 | Ex. 122 | TPGDA | 3/7 | 65.6 |
| Ex. 176 | Ex. 123 | TPGDA | 3/7 | 63.4 |
| Ex. 177 | Ex. 124 | TPGDA | 3/7 | 68.0 |
| Ex. 178 | Ex. 125 | TPGDA | 3/7 | 51.2 |
| Ex. 179 | Ex. 126 | TPGDA | 3/7 | 35.1 |
| Ex. 180 | Ex. 127 | TPGDA | 3/7 | 36.5 |
| Ex. 181 | Ex. 128 | TPGDA | 3/7 | 55.6 |
| Ex. 182 | Ex. 129 | TPGDA | 3/7 | 56.8 |
| Ex. 183 | Ex. 130 | TPGDA | 3/7 | 62.1 |
| Ex. 184 | Ex. 131 | TPGDA | 3/7 | 45.7 |
| Ex. 185 | Ex. 132 | TPGDA | 3/7 | 54.2 |
| Ex. 186 | Ex. 133 | TPGDA | 3/7 | 48.5 |
| Ex. 187 | Ex. 134 | TPGDA | 3/7 | 50.2 |
| Ex. 188 | Ex. 135 | TPGDA | 3/7 | 63.4 |
| Ex. 189 | Ex. 136 | TPGDA | 3/7 | 58.1 |
| Ex. 190 | Ex. 137 | TPGDA | 3/7 | 56.7 |
| Ex. 191 | Ex. 138 | TPGDA | 3/7 | 54.2 |
| CEx. 14 | CEx. 10 | TPGDA | 3/7 | 70.8 |
| CEx. 15 | CEx. 11 | TPGDA | 3/7 | 575.5 |
| CEx. 16 | CEx. 10 | PEG9DA | 3/7 | 153.4 |
| CEx. 17 | CEx. 11 | PEG9DA | 3/7 | 1,246.5 |

Ex. = Example,
CEx. = Comparative Example

TABLE 9

|  | Dendrimer (A)/Compound (B) Composition | A/B Weight ratio | Curability (KGy) | | Adhesion to substrate | | | | AA | BB |
|---|---|---|---|---|---|---|---|---|---|---|
|  |  |  | 5 | 20 | PE | OPP | NY | PET |  |  |
| Ex. 162 | Ex. 116/TPGDA | 3/7 | Δ | ○ | ○ | ○ | ○ | ○ | 91 | Δ |
| Ex. 163 | Ex. 117/PEG9DA | 3/7 | ○ | ○ | ○ | ○ | ○ | ○ | 99 | ○ |
| Ex. 164 | Ex. 117/NODA | 3/7 | ○ | ○ | ○ | ○ | ○ | ○ | 96 | ○ |
| Ex. 165 | Ex. 117/TPGDA | 3/7 | ○ | ○ | ○ | ○ | ○ | ○ | 98 | ○ |
| Ex. 166 | Ex. 117/BP4EA | 3/7 | ○ | ○ | ○ | ○ | ○ | ○ | 94 | Δ |
| Ex. 167 | Ex. 117/TMPT3EO | 3/7 | ○ | ○ | ○ | ○ | ○ | ○ | 91 | ○ |
| Ex. 168 | Ex. 117DPHA | 3/7 | ○ | ○ | ○ | ○ | Δ | ○ | 100 | ○ |
| Ex. 169 | Ex. 118/TPGDA | 3/7 | ○ | ○ | ○ | ○ | ○ | ○ | 95 | ○ |
| Ex. 170 | Ex. 119/TPGDA | 3/7 | ○ | ○ | ○ | ○ | ○ | ○ | 97 | ○ |
| Ex. 171 | Ex. 119/TPGDA | 5/5 | ○ | ○ | ○ | ○ | ○ | ○ | 99 | ○ |
| Ex. 172 | Ex. 119/TPGDA | 7/3 | ○ | ○ | ○ | ○ | ○ | ○ | 98 | ○ |
| Ex. 173 | Ex. 120/TPGDA | 3/7 | ○ | ○ | ○ | Δ | ○ | ○ | 92 | ○ |
| Ex. 174 | Ex. 121/TPGDA | 3/7 | ○ | ○ | ○ | ○ | ○ | ○ | 91 | ○ |
| Ex. 175 | Ex. 122/TPGDA | 3/7 | ○ | ○ | ○ | ○ | ○ | ○ | 90 | ○ |
| Ex. 176 | Ex. 123/TPGDA | 3/7 | ○ | ○ | ○ | ○ | ○ | ○ | 94 | ○ |
| Ex. 177 | Ex. 124/TPGDA | 3/7 | ○ | ○ | ○ | Δ | ○ | ○ | 95 | ○ |
| Ex. 178 | Ex. 125/TPGDA | 3/7 | Δ | ○ | ○ | ○ | ○ | ○ | 90 | ○ |
| Ex. 179 | Ex. 126/TPGDA | 3/7 | ○ | ○ | ○ | ○ | ○ | ○ | 98 | ○ |
| Ex. 180 | Ex. 127/TPGDA | 3/7 | ○ | ○ | ○ | ○ | ○ | ○ | 95 | ○ |
| Ex. 181 | Ex. 128/TPGDA | 3/7 | ○ | ○ | ○ | ○ | Δ | ○ | 95 | ○ |
| Ex. 182 | Ex. 129/TPGDA | 3/7 | Δ | ○ | ○ | ○ | ○ | ○ | 89 | Δ |
| Ex. 183 | Ex. 130/TPGDA | 3/7 | ○ | ○ | ○ | ○ | ○ | ○ | 92 | ○ |
| Ex. 184 | Ex. 131/TPGDA | 3/7 | Δ | ○ | ○ | Δ | ○ | ○ | 90 | ○ |
| Ex. 185 | Ex. 132/TPGDA | 3/7 | ○ | ○ | ○ | ○ | ○ | ○ | 91 | ○ |
| Ex. 186 | Ex. 133/TPGDA | 3/7 | ○ | ○ | ○ | ○ | ○ | ○ | 90 | ○ |
| Ex. 187 | Ex. 134/TPGDA | 3/7 | ○ | ○ | ○ | ○ | ○ | ○ | 95 | ○ |
| Ex. 188 | Ex. 135/TPGDA | 3/7 | ○ | ○ | ○ | ○ | ○ | ○ | 100 | ○ |
| Ex. 189 | Ex. 136/TPGDA | 3/7 | ○ | ○ | ○ | ○ | Δ | ○ | 99 | ○ |
| Ex. 190 | Ex. 137/TPGDA | 3/7 | ○ | ○ | ○ | ○ | ○ | ○ | 98 | ○ |

TABLE 9-continued

| Dendrimer (A)/Compound (B) Composition | A/B Weight ratio | Curability (KGy) 5 | 20 | Adhesion to substrate PE | OPP | NY | PET | AA | BB |
|---|---|---|---|---|---|---|---|---|---|
| Ex. 191 Ex. 138/TPGDA | 3/7 | ○ | ○ | ○ | ○ | ○ | ○ | 98 | ○ |
| CEx. 14 CEx. 10/TPGDA | 3/7 | ○ | ○ | ○ | Δ | Δ | ○ | 99 | ○ |
| CEx. 15 CEx. 11/TPGDA | 3/7 | ○ | ○ | ○ | ○ | Δ | ○ | 91 | Δ |
| CEx. 16 CEx. 10/PEG9DA | 3/7 | ○ | ○ | ○ | Δ | Δ | ○ | 100 | ○ |
| CEx. 17 CEx. 11/PEG9DA | 3/7 | ○ | ○ | ○ | ○ | Δ | ○ | 92 | Δ |

What is claimed is:

1. A vinyl-group-containing dendrimer comprising a core portion, branching portions, branches and at least 4 terminal portions, and containing, as the terminal portions, at least one long-chain group selected from the group consisting of the following formulae (1-1), (1-2) and (1-3), $$—C_nH_{2n}R^1 \quad (1\text{-}1)$$

$$(C_xH_{2x}O)_mR^2 \quad (1\text{-}2)$$

$$—C_yH_{2y}O(COC_zH_{2z}O)_kR^2 \quad (1\text{-}3)$$

wherein $R^1$ is a phenyl group or a hydrogen atom, n is an integer of 4 to 25, x is an integer of 1 to 6, $R^2$ is a phenyl group or an alkyl group having 1 to 22 carbon atoms, y is an integer of 2 to 22, z is an integer of 2 to 15, m is an integer of 1 to 25 and k is an integer of 1 to 20, or at least one hydrogen-containing group selected from the group consisting of the following formulae (2-1) to (2-5), $$—NHR^3 \quad (2\text{-}1)$$

wherein $R^3$ is a hydrogen atom or an alkyl group having 1 to 3 carbon atoms, $$—COOH \quad (2\text{-}2)$$

$$—OH \quad (2\text{-}3)$$

$$—Si(OR^4)_{3-h}(OH)_h \quad (2\text{-}4)$$

wherein $R^4$ is an alkyl group having 1 to 8 carbon atoms or a phenyl group and h is an integer of 1 to 3, $$—P=O(OH)_2$$

and at least one vinyl group, and wherein the dendrimer is in a liquid state and has a number average molecular weight of 200 to 100,000 and a viscosity, measured at 30° C., or 100,000 or less.

2. The vinyl-group-containing dendrimer according to claim 1, wherein the dendrimer is obtained by reacting a polyfunctional compound (a) having at least three active-hydrogen-containing groups in a terminal per molecule and having at least five active hydrogen atoms per molecule with a long-chain-group-containing compound (b) having a functional group reactive with an active hydrogen atom so as to leave part of the active hydrogen atoms, thereby obtaining a long-chain-group-containing multi-branched compound (X), and reacting the long-chain-containing multi-branched compound (X) with a vinyl-group-containing compound (c) having a functional group reactive with an active hydrogen atom.

3. The vinyl-group-containing dendrimer according to claim 2, wherein the dendrimer is obtained by reacting the vinyl-group-containing compound (c) having a functional group reactive with an active hydrogen atom with at least one but not more than 95% of the total of the active hydrogen atoms of the long-chain-group-containing multi-branched compound (X).

4. The vinyl-group-containing dendrimer according to claim 3, wherein the polyfunctional compound (a) is a dendrimer having 6 to 128 active hydrogen atoms derived from the active-hydrogen-containing groups.

5. The vinyl-group-containing dendrimer according to claim 4, wherein the polyfunctional compound (a) is a polyamino dendrimer containing a primary or secondary amino group.

6. The vinyl-group-containing dendrimer according to claim 5, wherein the dendrimer is obtained by reacting a polyaimino dendrimer with a mixture of an active-hydrogen-containing (meth)acrylate compound (a-1) with a non-functional (meth)acrylate compound (b-1) of the general formula (3) in Michael addition reaction to form a long-chain-containing multi-branched compound (X-1) and reacting the long-chain-containing multi-branched compound (X-1) with an isocyanate-group-containing vinyl compound (c-1), $$CH_2=C(R^6)COO—R^5 \quad (3)$$

wherein $R^6$ is a hydrogen atom or methyl, $R^5$ is $—C_nH_{2n+1}$, $—(C_xH_{2x}O)_mR_2$ or $—C_yH_{2y}O(COC_zH_{2z}O)_kR^2$, $R^2$ is a phenyl group or an alkyl group having 1 to 22 carbon atoms, n is an integer of 4 to 25, x is an integer of 1 to 6, y is an integer of 2 to 22, z is an integer of 2 to 15, m is an integer of 1 to 25, and k is an integer of 1 to 20.

7. The vinyl-group-containing dendrimer according to claim 6, wherein the dendrimer is obtained by reacting the active-hydrogen-containing (meth)acrylate compound (a-1) with the non-functional (meth)acrylate compound (b-1) in a (a-1):(b-1) molar ratio of from 1:99 to 99:1 and reacting the resultant long-chain-containing multi-branched compound (X-1) with the above isocyanate-group-containing vinyl compound (c-1).

8. The vinyl-group-containing dendrimer according to claim 5, wherein the polyfunctional compound (a) is a polyamino dendrimer of the formula (i) or (ii),

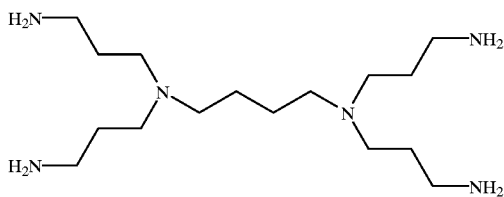

4-Cascade:1,4-Diaminobutane[4]:propylamine (i)

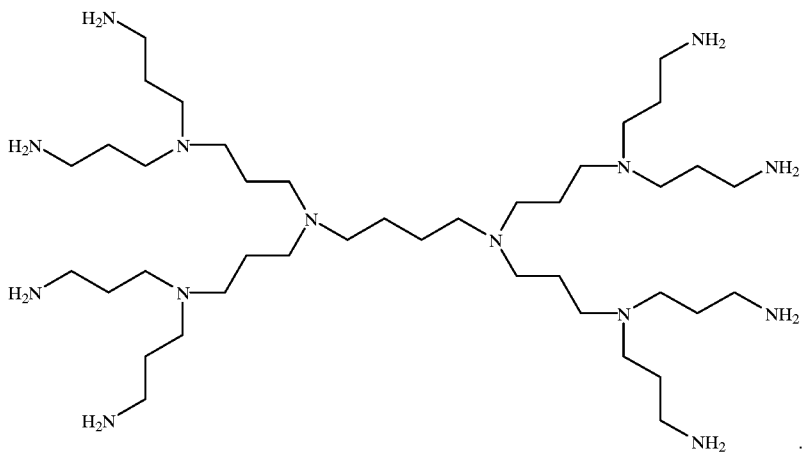

8-Cascade:1,4-Diaminobutane[4]:(1-azabutylidene)⁴propylamine (ii)

9. The vinyl-group-containing dendrimer according to claim 2, wherein the dendrimer is obtained by reacting the vinyl-group-containing compound (c) having a functional group reactive with an active hydrogen atom with at least one but not more than 95% of the total of the active hydrogen atoms of the polyfunctional compound (a).

10. The vinyl-group-containing dendrimer according to claim 9, wherein the polyfunctional compound (a) is a dendrimer having 6 to 128 active hydrogen atoms derived from the active-hydrogen-containing groups.

11. The vinyl-group-containing dendrimer according to claim 9, wherein the polyfunctional compound (a) is a polyamino dendrimer having a primary or secondary amino group.

12. The vinyl-group-containing dendrimer according to claim 11, wherein the polyfunctional compound (a) is an amino dendrimer of the formula (i) or (ii),

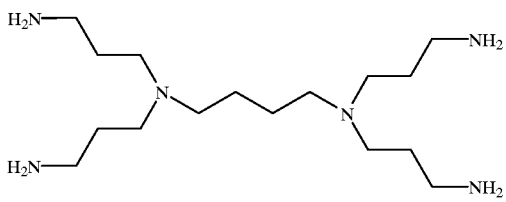

4-Cascade:1,4-Diaminobutane[4]:propylamine (i)

(ii)

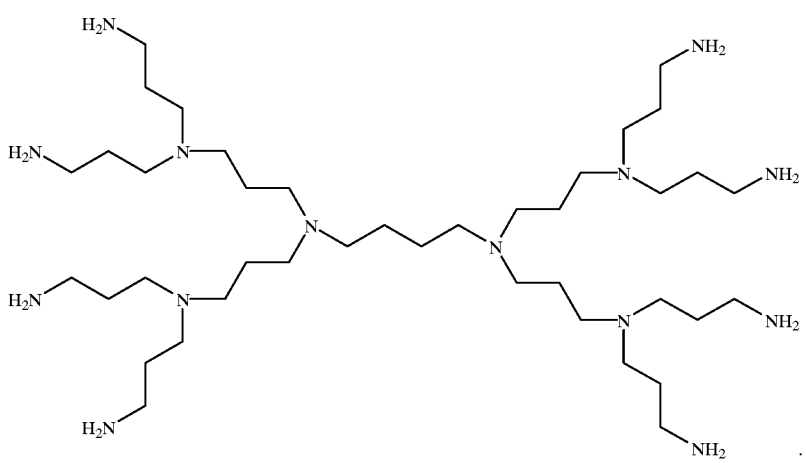

8-Cascade:1,4-Diaminobutane[4]:(1-azabutylidene)$^4$propylamine

13. The vinyl-group-containing dendrimer according to claim 1, wherein the dendrimer is in a liquid state and has a number average molecular weight of 200 to 100,000 and a viscosity, measured at 30° C., of 100,000 or less.

14. A curable composition containing 5 or 99% by weight of the vinyl-group-containing dendrimer (A) comprising a core portion, branching portions branches and at least 4 terminal portions, and containing, as the terminal portions, at least one long-chain group selected from the group consisting of the following formulae (1-1), (1-2) and (1-3), $$—C_nH_{2n}R^1 \quad (1\text{-}1)$$

$$(C_xH_{2x}O)_mR^2 \quad (1\text{-}2)$$

$$—C_yH_{2y}O(COC_zH_{2z}O)_kR^2 \quad (1\text{-}3)$$

wherein $R^1$ is a phenyl group or a hydrogen atom, n is an integer of 4 to 25, x is an integer of 1 to 6, $R^2$ is a phenyl group or an alkyl group having 1 to 22 carbon atoms, y is an integer of 2 to 22, z is an integer of 2 to 15, m is an integer of 1 to 25 and k is an integer of 1 to 20, or at least one hydrogen-containing group selected from the group consisting of the following formulae (2-1) to (2-5), $$—NHR^3 \quad (2\text{-}1)$$

wherein $R^3$ is a hydrogen atom or an alkyl group having 1 to 3 carbon atoms, $$—COOH \quad (2\text{-}2)$$

$$—OH \quad (2\text{-}3)$$

$$—Is(OR^4)_{3-h}(OH)_h \quad (2\text{-}4)$$

wherein $R^4$ is an alkyl group having 1 to 8 carbon atoms or a phenyl group and h is an integer of 1 to 3, $$—P=O(OH)_2$$

and at least one vinyl group, and 1 to 95% by weight of a polymerizable unsaturated-group-containing compound (B), which is at least one vinyl compound selected from the group consisting of methyl vinyl ether, ethyl vinyl ether, propyl vinyl ether, isobutyl vinyl ether, octadecyl vinyl ether, vinyl cyclohexyl ether, vinyl-4-hydroxybutyl ether, butanediol-1,4-divinyl ether, vinylpyrrolidone, vinylcaprolactam, vinyl carbazole, vinyl-1-imidazole, divinylethyleneurea, N-vinylformamide, N-vinylformalin, allyl glycidyl ether, and allyl chloride, (meth)acrylate compound, diene compound, styrene compound or unsaturated aliphatic compound.

15. The composition according to claim 14, wherein the polymerizable unsaturated-group-containing compound (B) is a (meth)acrylate compound.

16. The composition according to claim 14, wherein the polymerizable unsaturated-group-containing compound (B) has a viscosity, measured at 30° C., of 10,000 cps or less and a number average molecular weight of 2,000 or less.

17. The composition according to claim 14, wherein the composition has a viscosity, measured at 30° C., of 10 to 50,000 cps.

18. The composition according to claim 14, wherein the composition is radiation-curable.

19. A curable ink containing the curable resin composition recited in claim 18.

20. A coating composition containing the curable composition recited in claim 18.

* * * * *